United States Patent [19]

Seipp

[11] 4,200,916
[45] Apr. 29, 1980

[54] PROGRAMMABLE CONTROLLER USING MICROPROCESSOR

[75] Inventor: William H. Seipp, Bettendorf, Iowa

[73] Assignee: Gulf & Western Industries, Inc., New York, N.Y.

[21] Appl. No.: 914,807

[22] Filed: Jun. 12, 1978

Related U.S. Application Data

[62] Division of Ser. No. 701,858, Jul. 1, 1976, Pat. No. 4,107,785.

[51] Int. Cl.² .............................................. G05B 11/01
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,729,713 | 4/1973 | Irwin | 364/900 |
| 3,753,246 | 8/1973 | Kiffmeyer et al. | 364/900 |
| 3,969,703 | 7/1976 | Kwiatkowski | 364/900 |
| 4,028,538 | 6/1977 | Olander, Jr. et al. | 364/900 |
| 4,062,061 | 12/1977 | Batchelor et al. | 364/900 |
| 4,078,259 | 3/1978 | Soulsby et al. | 364/900 |

*Primary Examiner*—Gareth D. Shaw
*Assistant Examiner*—C. T. Bartz
*Attorney, Agent, or Firm*—Meyer, Tilberry & Body

[57] ABSTRACT

There is provided a programmable controller comprising a standard microprocessor having output address terminals and input/output bi-directional data terminals and means for providing a binary code on the data terminals indicative of the status of the machine cycle to be processed by the microprocessor. This programmable controller includes a logic decoder means for producing a selected signal in response to logic signals on selected address terminals and in the status binary code of the data terminals. In addition, the programmable controller includes means for programming the HOLD state for the microprocessor. There is also provided an arrangement for expanding the number of interrupt conditions which can affect the INTERRUPT state of the microprocessor in the programmable controller.

6 Claims, 28 Drawing Figures

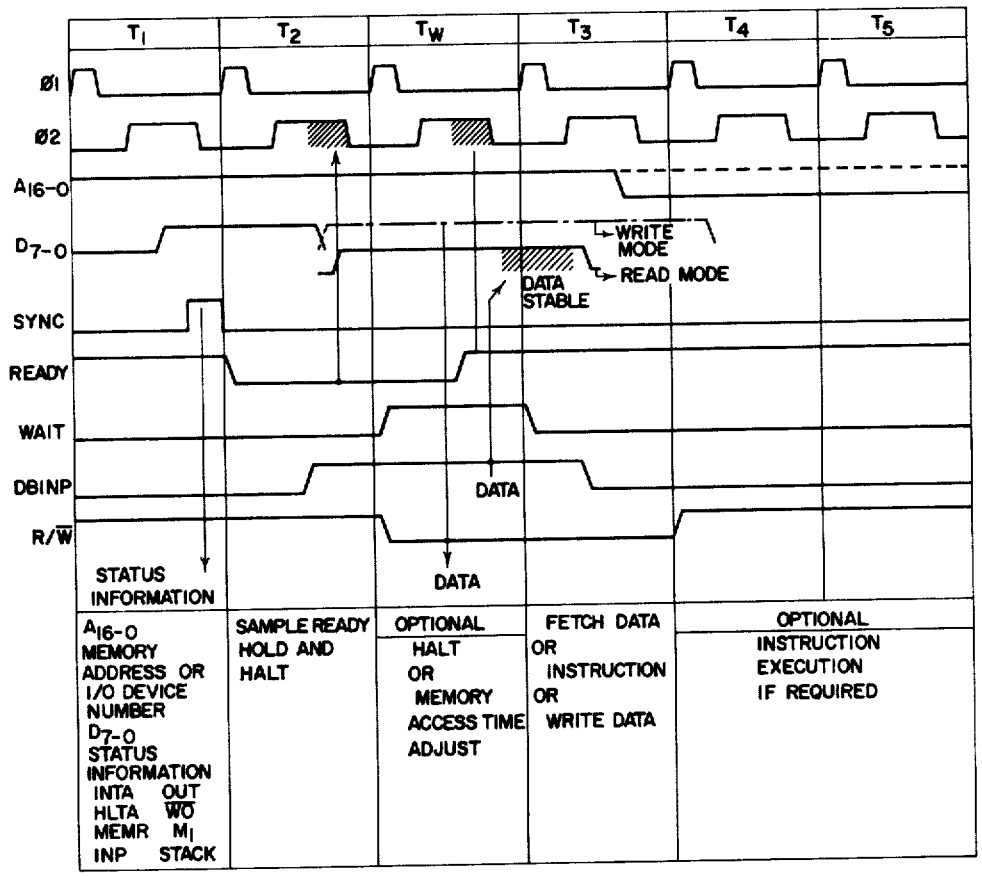

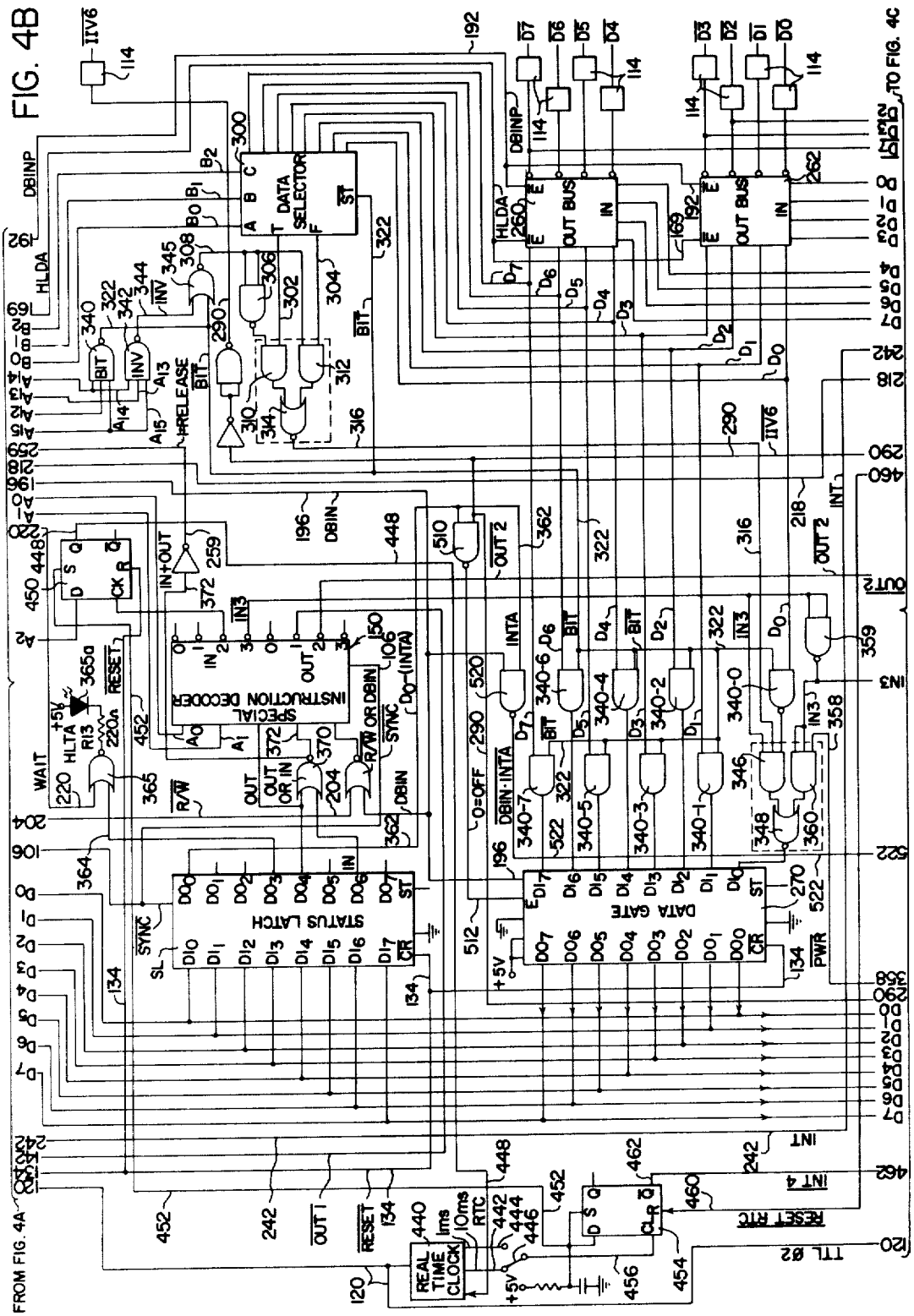

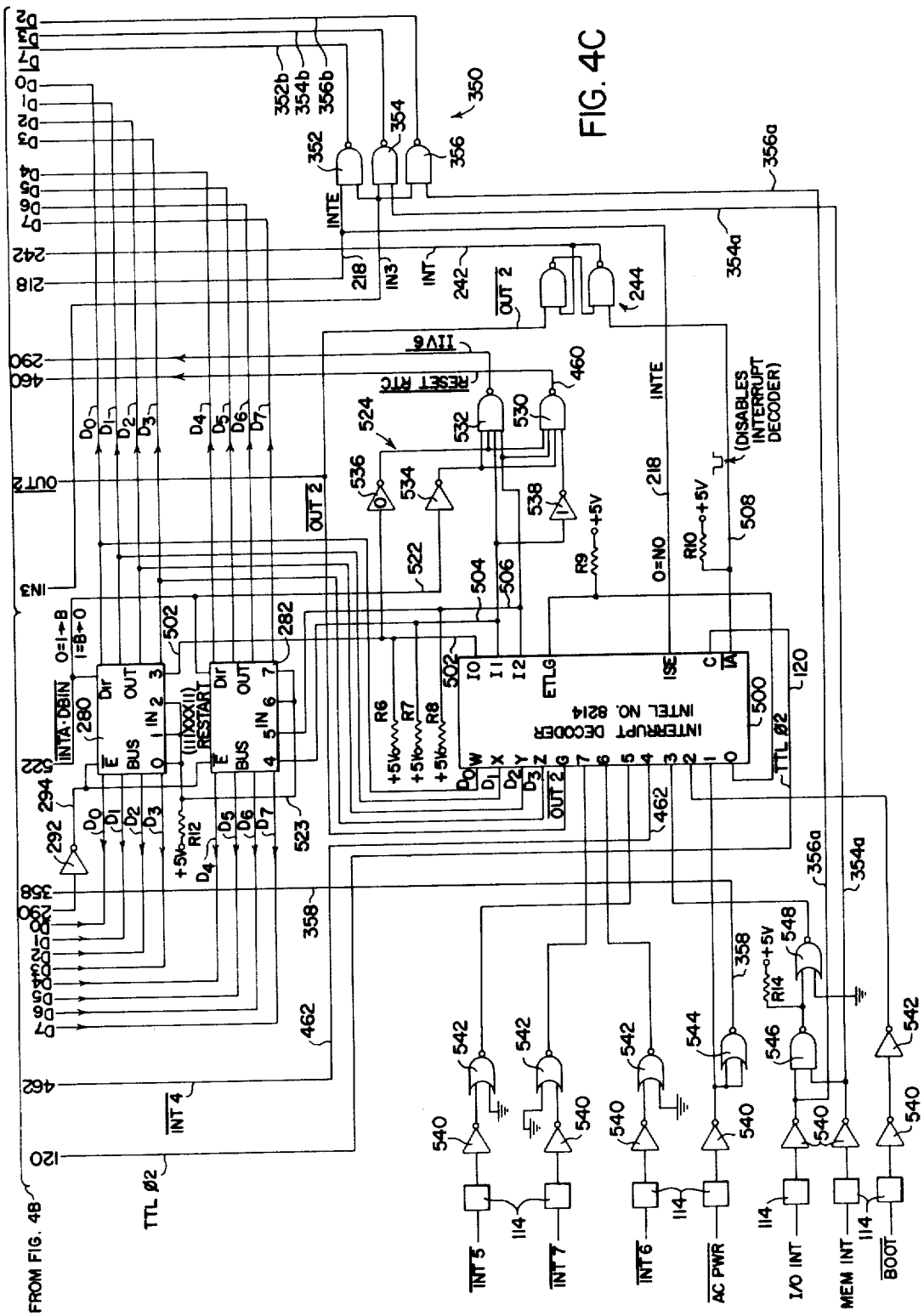

BREAK (SUBROUTINE)
PUSH A
PUSH BC
PUSH DE
PUSH HL
HL 0
DAD SP
MSHL STK PNT
IN I
NOP
POP HL
POP DE
POP BC
POP A
RET

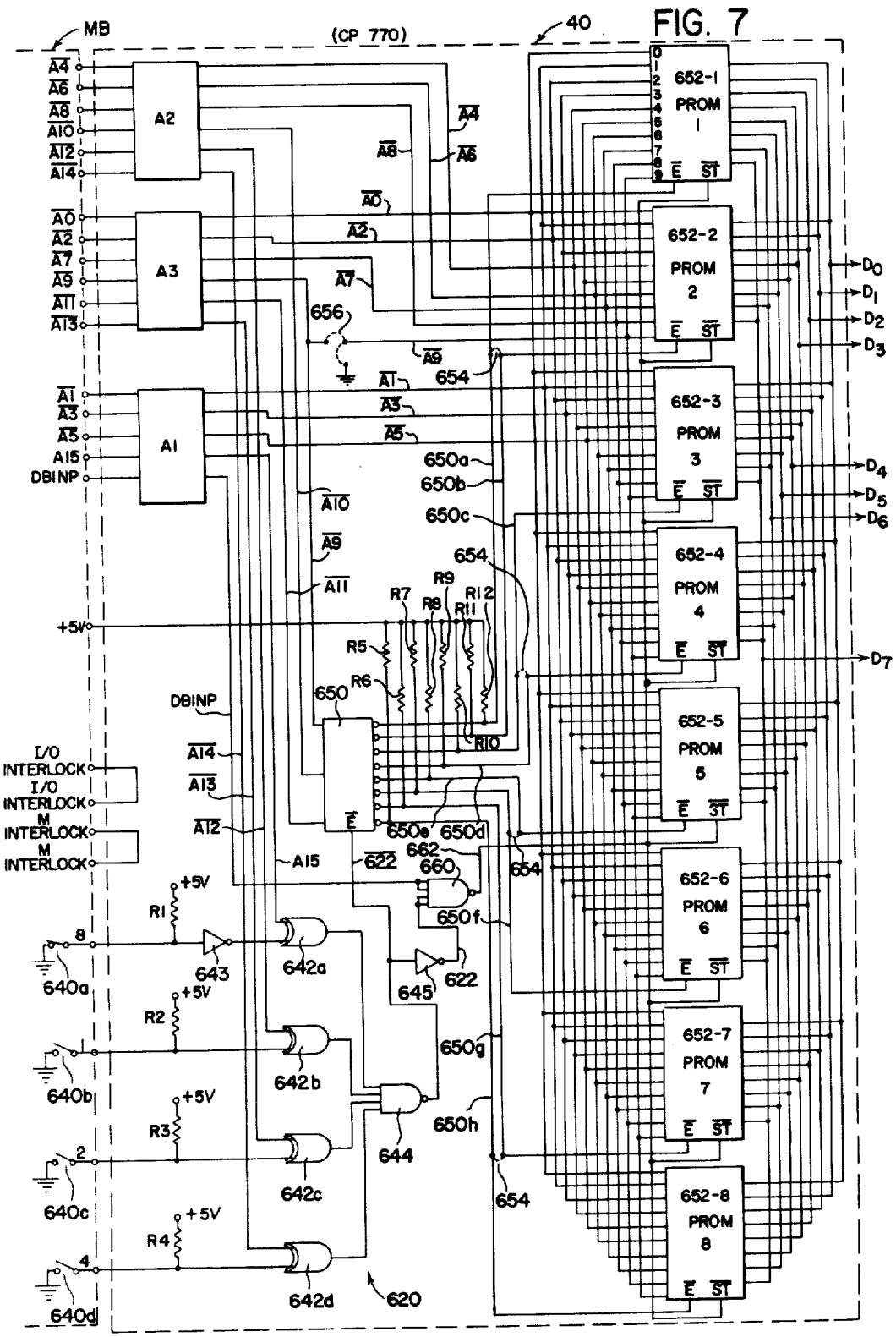

\* OPEN COLLECTOR

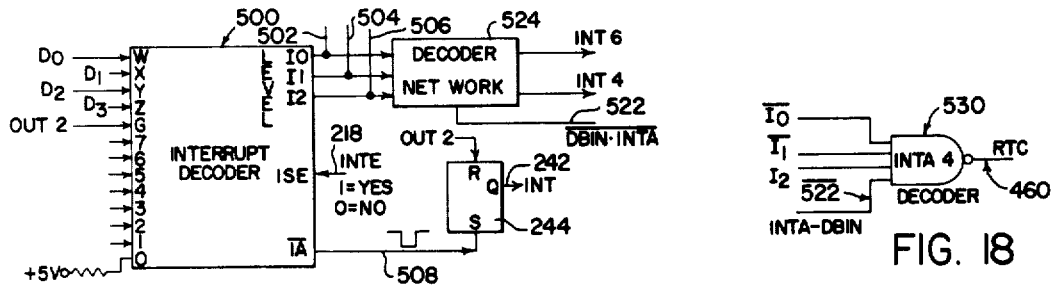
FIG. 17
FIG. 18
| OCTAL INST. CODE | | D7 | D6 | D5 | D4 | D3 | D2 | D1 | D0 | OCTAL ADDRESS |
|---|---|---|---|---|---|---|---|---|---|---|
| | | | | (BINARY) | | | | | | |
| RST 0 | 307 | 1 | 1 | 0 | 0 | 0 | 1 | 1 | 1 | 000 |
| RST 1 | 317 | do | | 0 | 0 | 1 | do | | | 010 |
| RST 2 | 327 | do | | 0 | 1 | 0 | do | | | 020 |
| RST 3 | 337 | do | | 0 | 1 | 1 | do | | | 030 |
| RST 4 | 347 | do | | 1 | 0 | 0 | do | | | 040 |
| RST 5 | 357 | do | | 1 | 0 | 1 | do | | | 050 |
| RST 6 | 367 | do | | 1 | 1 | 0 | do | | | 060 |
| RST 7 | 377 | do | | 1 | 1 | 1 | do | | | 070 |
FIG. 17A
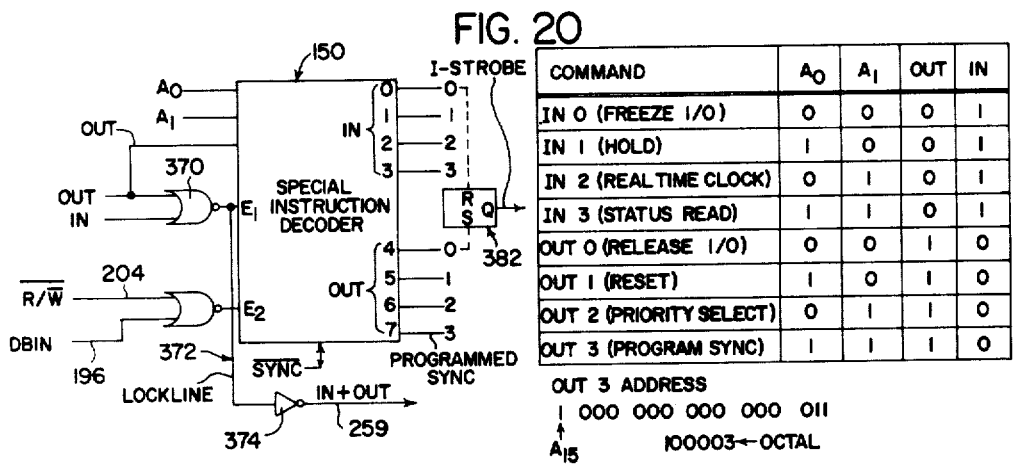
FIG. 20
FIG. 19

PROGRAMMABLE CONTROLLER USING MICROPROCESSOR

This is a division, of application Ser. No. 701,858, now U.S. Pat. No. 4,107,785, filed July 1, 1976.

The present invention relates to the art of programmable controllers and more particularly to a programmable controller utilizing a standard microprocessor.

The invention is particularly applicable as a programmable controller to control a machine tool, or other mechanical system of the type generally controlled by input information and output conditions and it will be described with particular reference thereto; however, it should be appreciated that the invention has much broader applications and may be used in various types of installations wherein input and output information or conditions are to be processed digitally in accordance with a preselected program or in accordance with standard relay logic, logic diagrams or Boolean equations.

INCORPORATION BY REFERENCE

Incorporated by reference herein is prior U.S. Letters Pat. No. 3,827,030 which discloses a programmable controller utilizing a random access memory to process input and output information in accordance with standard logic or relay terminology. Also incorporated by reference herein is prior United States application Ser. No. 632,257, filed Nov. 17, 1975, by the present inventor and related to a self-addressing feature for output modules of the type contemplated by the present invention, now U.S. Pat. No. 4,050,098.

BACKGROUND OF INVENTION

In the last few years, a very advanced data processing device has become commercially available. This device, known as a microprocessor, is sold by various companies and generally includes a plurality of address terminals, several bi-directional data terminals and internal control circuitry for determining several types of machine cycles to be performed. These microprocessors are produced in accordance with integrated circuit technology of the PMOS and NMOS type. The versatility of these microprocessors or "microprocessing chips", as they are known, is well known in the art of controlling machine operation. A variety of attempts has been made to utilize the standard microprocessor, as the heart of a programmable controller which can control machines and logic systems. However, generally the attempts to use the microprocessor for a controller function have resulted in complex software requirements. The microprocessor has relatively limited capabilities. Four or eight bit data bus are generally available and only sixteen address lines. In addition, the internal processing by the microprocessor is somewhat limited so that a substantial number of software steps or program steps must be generated to perform even somewhat simple logic operations. It is often difficult to debug a system employing a microprocessor because there is a distinct inability to step the microprocessor at a selected position and then read the internal condition of the internal registers and modify these registers without complicated software. Also, the ability to interrupt the microprocessor for jumping to a subroutine by external stimuli is limited by the circuitry or locations available for this purpose. It is desirable to provide a large number of interrupt call conditions, wherein the general or executive program can be temporarily stopped and a standard preset subroutine program processed. This is very beneficial in reading or writing by the controller at certain isolated locations. In other words, it is sometimes desirable to ignore several inputs until there is a change in their state, at which time a separate subroutine can be processed. Consequently, the subroutines are processed only when required. In order to do this, it is necessary to provide a great number of separate and distinct interrupt call conditions. An inexpensive simple arrangement for expanding the number of interrupt call conditions is not now available in the technology of microprocessors.

Since a standard microprocessor includes four or eight data terminals, it is extremely difficult to process single bit information of the type contemplated in prior U.S. Pat. No. 3,827,030. Such single bit information requires extensive software for masking of data lines and for shifting data between lines. This again makes the use of a microprocessor somewhat complicated, especially for relatively simple logic conditions such as AND, OR, COR, CAND, INVERT, etc. Microprocessing technology also has limitations regarding debugging of output or input terminals. In many instances, the terminal must actually be connected and operated before the system may be debugged. This is a substantial disadvantage in use of a microprocessor for any machine or system control function.

The present invention relates to a programmable controller using a microprocessor and novel external hardwired circuitry to overcome distinct disadvantages of prior attempts to use a standard microprocessor chip for a machine or system control function. In the past, the use of a microprocessor for control functions has required acceptance of the severe limitation of the microprocessor and have, therefore, utilized extensive and complex software for processing the desired input and output information. Thus, a relatively large number of memory locations were required for storing the extensive software program to employ a microprocessor as a controlling system. The present invention has overcome this disadvantage and has provided unique, novel external hardwired circuitry for allowing the use of a microprocessor, with all its standard limitations, in a programmable controller which can process eight bit data words and single bit data without extensive complex software. Thus, softward needed to convert the microprocessor chip to a viable control system is substantially reduced, with the resultant substantial reduction in the cost of programming and the probability of unavoidable error. Consequently, the present invention relates to an improved programmable controller which employs a standard microprossor. This is distinguished from prior attempts which essentially programmed a microprocessor for a control function. In those systems, all of the components were standard shelf items that are put together in known form to produce a control function under the auspices of a complex software program. This is the antithesis of the present invention, wherein a standard microprocessor is a component, which is used with additional circuitry to produce a total programmable controller that requires a minimum of software and still produces desired control functions necessary for controlling even complex machinery and systems.

SUMMARY OF THE INVENTION

In accordance with the present invention, there is provided a programmable controller comprising a microprocessor having output address terminals and input/output bid-directional data terminals wherein the address terminals, in accordance with normal practice, have a nominal high order impedance. There is provided a plurality of output address bus lines having an integrated circuit for connecting the bus lines to the address terminals of the microprocessor. In accordance with this aspect of the invention, the output bus terminals of the integrated circuit connecting means have a low order impedance with a value less than about 1% of the high order impedance of the microprocessor address terminals. In this manner, the normal address lines extending throughout the controller system have a lesser tendency to be affected by extraneous fields and electromagnetic noise.

In accordance with another aspect of the present invention, there is provided a programmable controller using a microprocessor having a plurality of bi-directional data terminals and a plurality of address terminals upon which binary coded addresses appear, data lines for receiving a byte of data having a number of bits corresponding to the number of data terminals, a first logic network for selecting one of said bits of a byte on said data lines and a second logic network for applying said selected bit to a selected one of said data terminals. In this manner, a byte of information can be converted to a bit for internal processing by the micrprocessor. Consequently, a single bit of information from an eight bit word or byte can be processed by a single location in the microprocessor. Standard logic functions can be performed without complex masking or shifting. For instance, if bit No. 5 of one eight bit word or byte is to be ANDed with bit No. 2 of another eight bit word, the fifth bit of the first word can be externally shifted to a selected data terminal and then loaded into the accumulator of the microprocessor. Thereafter, the second bit of the next word can be shifted to the same data terminal and ANDed with the accumulated information. The output on the selected single line is then directed to an addressed position, either in memory or at an output terminal. This inventive aspect provides an arrangement whereby bit information can be processed by the microprocessor even though the microprocessor has been expanded to include several bi-directional data terminals. The expansion of microprocessors to include several data lines is considered an advance and is an advance when processing large words, such as eight bit or sixteen bit words. However, this capability is a distinct hinderance when attempting to logic function two individual terminals of the system. By using the present invention, this disadvantage of an expanded, larger capability microprocessor is overcome by selecting one bi-directional data terminal as a single bit processor. In this fashion, the internal accumulator is, in effect, a one bit accumulator for bit processing.

In accordance with another aspect of the present invention, there is provided a programmable controller of the type using a standard microprocessor which includes means for providing a binary status code on the data terminals indicative of the status of the machine cycle to be processed by the microprocessor. In accordance with this aspect of the invention, a logic decoder is used for producing a selected signal output in response to the logic signals on selected address terminals and in the binary status code on the data terminals. In other words, the status code created at the beginning of a machine cycle is read and compared with certain addresses to produce a signal. The created signal can be used internally of the controller for hardwired functions. The provision of an internal circuit which is controlled by the status code of a microprocessor together with a selected address to produce a hardwired external signal which can perform a variety of logic functions during the normal operation of the programmable controller is not available on other microprocessor or control systems.

In accordance with a further aspect of the present invention, there is provided a programmable controller including a microprocessor and using the binary status code on the data terminals indicative of the status of a machine cycle to be processed by the microprocessor. In this system, there is provided a means responsive to the binary status code for latching the address lines to a logic true condition in the more significant bits of the address lines. In this manner, when processing information based upon the status code, the more significant address lines are connected to high level locations in external memory circuits. These memory locations are generally unused locations or little used locations and do not require continuous writing and rewriting which may affect the actual program steps stored in memory. The program is generally written in lower level memory addresses. This address increasing arrangement is used to assure that writing of random information into memory during certain functions of the programmable controller is at the seldom used high address levels.

In accordance with another aspect of the present invention, there is provided a manner by the microprocessor can be shifted into the HOLD state by a software command. This is accomplished by providing a hardwired circuit responsive to one data line of the microprocessor and a selected address terminal of the microprocessor. In this manner, a HOLD command can be inserted at any software position for debugging the programmable controller without placing the microprocessor in a HALT state which is not desired and difficult to vacate.

In accordance with another aspect of the present invention, the programmable controller is provided with a real time clock for producing an output pulse for shifting the controller to a subroutine at a preselected time interval. A logic decoding means produces a selected signal in response to the logic at selected ones of the address terminals and the logic in the binary status code which appears at the data terminals. Means are provided for disabling the real time clock upon production of this selected signal. In this manner, the real time clock may be disabled by a software command by using the binary status code appearing at the first of the machine cycle in a microprocessor.

In accordance with another aspect of the present invention, there is provided a programmable controller using a microprocessor. The microprocessor includes the standard actuatable terminal means for shifting the microprocessor from a program being processed to a selected subroutine program at a memory location having a binary coded address received by the microprocessor at the data terminals. In this improved programmable controller system, there is provided a plurality of input devices each of which has an assigned subroutine with a given memory address code for processing by the microprocessor when each of the input devices is actuated, a first set of data lines connected to the data terminals, a second set of data lines connected to the external devices, data transfer means interconnecting the first and second sets of data lines, means for creating an INTERRUPT signal upon actuation of one of the input devices, interrupt means responsive to said INTERRUPT signal for actuating the actuatable terminal means, isolation means responsive to the INTERRUPT signal for isolating the second set of data lines from the first set of data lines, and decoding means for identifying the actuated input device and for producing a selected partial memory address code corresponding thereto. This partial address code has fewer bits than a full memory address for a stored subroutine. There is also provided address input means for applying the selected partial memory address code and a fixed binary code to the first set of data lines for selection of a subroutine corresponding to the actuated input device. In accordance with this aspect of the invention, a partial address is created during a selected interrupt cycle. This partial address is combined with a fixed binary address code to locate the memory address of the subroutine to be processed for a selected interrupt condition or call. Consequently, a very minor code can be used for determining the location of the subroutine corresponding to various predetermined interrupt requests.

In accordance with another aspect of the present invention, there is provided an external means for storing a number of separate and distinct memory addresses corresponding to external interrupt request inputs. When one of the external interrupt request inputs is actuated, the microprocessor chip is shifted into a preselected priority interrupt level. Thereafter, a separate and distinct memory address is applied to the data bus for location of the subroutine to be processed for the actuated external interrupt request. In this manner, a large number of separate interrupts can be used without requiring complex circuits. By using this aspect of the invention, a selected one of a small number of interrupt levels can be used to accommodate a large number of external interrupt requests. After actuation, a binary coded call to a given subroutine is directed through data bus to the microprocessor. This call includes a memory stored subroutine, without employing the normal hardware selected restart call of a subroutine used in a standard microprocessor, such as an Intel 8080 unit. Indeed, the restart subroutine selecting circuit can be deactuated when the selected one of the interrupt levels is actuated to process a large number of add-on interrupt requests. This interrupt expansion at a selected priority level provides a simple means for using interrupt processing instead of repetitive review of external conditions by the executive program.

Still further aspects of the present invention will be appreciated from a consideration of the preferred embodiment of the present invention taken together with the description of the embodiments and the components and advantages relating to the various features of the preferred embodiment.

The primary object of the present invention is the provision of a programmable controller, which programmable controller can employ a standard microprocessor without requiring the complex software generally associated with microprocessors.

Another object of the present invention is the provision of a programmable controller, as defined above, which controller employs external circuitry for reducing the software requirements of the microprocessor in controlling a machine or system.

Yet another object of the present invention is the provision of a programmable controller, as defined above, which controller includes an arrangement for reducing the impedance of external conductors used for addressing various external components.

Another object of the present invention is the provision of a programmable controller, as defined above, which controller utilizes the binary status code of a standard microprocessor for developing hardwired signals to process information in the controller.

Another object of the present invention is the provision of a programmable controller, as described above, which controller can shift from a byte mode of operation to a bit mode of operation for individual processing steps.

Still a further object of the present invention is the provision of a programmable controller as defined above, which controller provides an arrangement for software addressing of specific signals, such as a real time clock inhibit instruction.

Still a further object of the present invention is the provision of a programmable controller, as defined above, which programmable controller includes an arrangement for substantial expansion of the interrupt capabilities generally associated with the microprocessor.

BRIEF DESCRIPTION OF DRAWINGS

The above objects and advantages will become apparent from the following description taken together with the accompanying drawings in which:

FIG. 2 is a status chart indicating the data line status coding at the status conditions of each machine cycle;

FIG. 3 is a pulse chart for timing functions of the standard 8080 Intel microprocessor as adapted for use in the preferred embodiment of the invention;

FIG. 7 is a schematic wiring diagram illustrating a PROM module employed in the preferred embodiment of the present invention;

FIG. 17 is a simplified view showing one feature from FIG. 4 used in the INTERRUPT processing mode;

FIG. 17A is a chart indicating the restart code appearing on the data lines after interrupt conditions have been acknowledged by the microprocessor;

FIG. 18 is a simplified view showing one gate employed during the INTERRUPT feature of the circuitry shown in FIG. 4;

FIG. 19 is a simple program employed in one of the INTERRUPT states of the microprocessor shown in FIG. 4; and FIG. 20 is a combined logic view and output graph for the device employed in the preferred embodiment of the invention to create hardwired signals in response to the binary status code appearing at the initial portion of the machine cycle in the microprocessor employed in the programmable controller.

GENERAL SYSTEM

Figure 1:
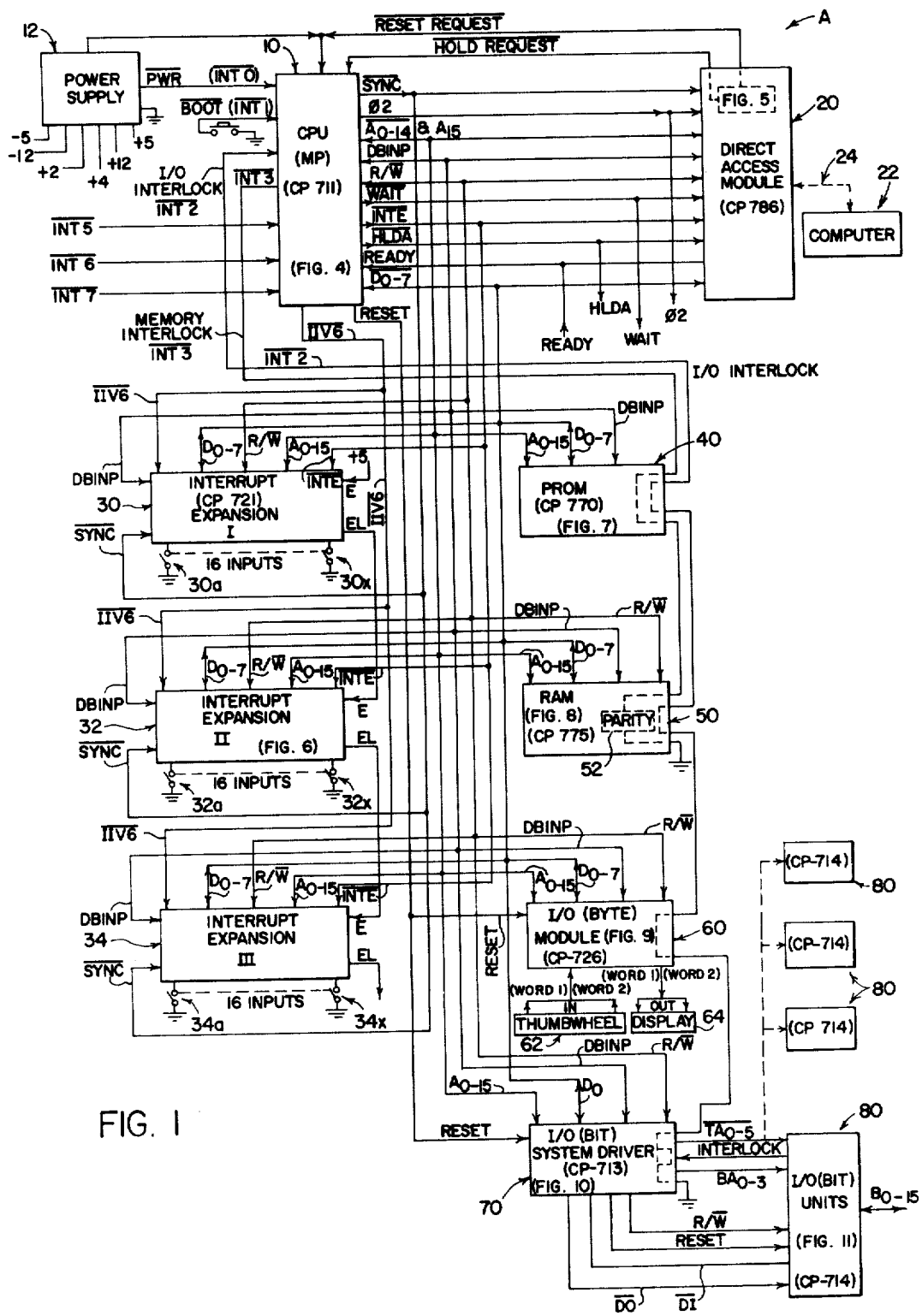
FIG. 1 is a schematic view setting forth a preferred embodiment of the invention and various modules employed therein.

Referring now to the drawings wherein the showings are for the purpose of illustrating the preferred embodiment of the invention and not for the purpose of limiting same, FIG. 1 shows a programmable controller A for controlling machines, processes and other systems in response to input information from inputs and existing conditions or other parameters. The inputs, conditions and parameters are directed to the controller A from various external terminals and locations which are capable of providing binary information as single bit or multiple bits, i.e. bytes. These external terminals may be switches, decoded thumbwheels, lights, decoded analog data and binary coded conditions. In accordance with normal practice the controller includes memory locations and is processed in accordance with a program stored as a plurality of steps or instructions in such system memory. Certain random access memories are provided for storing intermediate information or data. This memory can also be used for some program storage although a program read only memory is generally used for storage of the program information or steps.

As illustrated in FIG. 1, programmable controller A is a digital processing system including a plurality of separate and distinct plug-in modules interconnected by a plurality of control lines, which are generally in a mother-board connecting system, except for remote input/output modules. The basic modules and control lines therefor are schematically illustrated in FIG. 1 wherein a central processing unit module (CPU) 10 or module CP711 employs a standard microprocessor as its central control unit. The central processing unit is shown in FIG. 4. This microprocessor is a known MOS integrated circuit chip which includes internal registers, counters, pointers and associated logic circuitry well known in the art. The microprocessor, which is shown in more detail in FIG. 4, has a number of output address terminals, a number of bi-directional data terminals, means for setting the chip into various known states and means for providing a status code on the data lines at the start of each separate command. Although a variety of microprocessors having these standard capabilities could be used, the preferred embodiment of the present invention involves the use of an Intel 8080 microprocessor which has sixteen address terminals and eight bi-directional data terminals. The controller A incorporates the various inventions relating to the use of a microprocessor for processing input and output information to control a preprogrammed series of events of a machine, process, etc. The input information in the preferred embodiment of the present invention is digital information both at the input and output; however, converters for conversion between analog and digital could be used to interface between the system shown in FIG. 1 and various analog inputs and/or outputs. The CPU module 10 is communicated with the other modules to process input and output information on lines $D_0$-$D_7$. A brief description of the separate modules will be sufficient to illustrate their intended use with the CPU module 10 and the overall operation of programmable controller A.

To initially program and debug the controller A, there is provided a direct access module 20 which takes over control of several control lines connected to CPU module 10. Thus, it is possible to directly program the memories in controller or system A by an external device, such as a schematically represented digital computer 22. In the illustrated embodiment, the computer is connected to direct access module 20 by schematically represented lines 24. When a HOLD REQUEST signal is directed from module 20 to CPU module 10, computer 22, or other external control devices, obtains control over the address lines, the input designation line DBINP, the READ/$\overline{\text{WRITE}}$ line, and the $D_0$-$D_7$ data lines, and other lines shown by the arrows in FIG. 1. When this happens, the CPU module is essentially disconnected from the rest of the controller and computer 22 can load memories, i.e. to program the controller, and actually operate the controller, as in debugging and troubleshooting. The direct access module is used to load all memories of system A with the desired logic, set inputs and outputs to the desired conditions, selectively read the contents of the memory or the various input and output circuits, reset controller A, provide intermediate stop and run operations for the controller A, and check the status of all the memory positions and registers of controller A including the registers of the microprocessor MP in CPU module 10. The direct access module is used for flow of data to and from system A under the control of an external unit such as a computer, external tape reading devices, teletype, etc.

In order to accomplish transfer of control to module 20, microprocessor MP of module 10 is placed into the HOLD state, which will be explained later. The external programmer, such as a computer or tape reader, sends data to and from controller A through data lines $D_0$–$D_7$ and the location of the data is controlled by address lines $A_0$–$A_{15}$. By placing the microprocessor of module 10 in the HOLD condition or state, instead of the HALT state, the functions of the microprocessor can be taken over by a programmed signal or request from module 20 in a manner to be explained in connection with FIG. 5. Also, control by the microprocessor can be reestablished by a simple command without complex programming required when the microprocessor shifts to a HALT state. It is not necessary to provide an initiation pulse for again obtaining control over system A by module 10. As soon as the HOLD condition is released, the CPU module 10 again assumes control over the lines illustrated in FIG. 1. This provides a convenient manner for giving direct access to the controller A for programming and debugging and then for releasing the controller for control, which is isolated from module 20.

As will be explained later, CPU module 10 may be interrupted by external conditions to interrupt the program and shift control over the microprocessor to a memory stored subroutine. This is a standard INTERRUPT feature of most eight bit microprocessors; however, in accordance with one aspect of the invention, controller A includes a plurality of separate interrupt expansion modules, three of which are schematically illustrated as interrupt expansion modules I, II, III, or 30, 32 or 34, respectively. Module 32 is schematically illustrated in more detail in FIG. 6, which showing is representative of an interrupt expansion module connected to and controlled through the first interrupt expansion module 30. The difference between the first expansion module and subsequent expansion modules is that the enabled terminal E of module 30 is tied to a logic 1, which in practice is five volts throughout controller or system A. The subsequent modules 32, 34, and any additional modules, include an input enable logic at terminal E which is controlled by the condition of preceding interrupt expansion modules. This connection arrangement provides a priority level system wherein the interrupt inputs of module 30 have a priority over the interrupt inputs of subsequent interconnected expansion modules 32, 34, etc. In each of the interrupt expansion modules, in the illustrated embodiment, there are provided sixteen separate interrupt inputs which are schematically illustrated as a plurality of single pole, grounded switches $30a$–$30x$, $32a$–$32x$ and $34a$–$34x$. These interrupt inputs can be logic inputs which contain information requesting a shift of module 10 into the interrupt state for processing of a selected subroutine. Thus, actuation of an input will cause the microprocessor MP of module 10 to interrupt and shift into the subroutine which is to be processed. Then control is returned to the executive program of controller or system A. By using this interrupt expansion arrangement, a great number of selectable subroutines can be provided and called by providing an interrupt request at one of the several schematically represented logic inputs. The executive program of system A requires the processing of a "look" command or sequence for those data or logic inputs and outputs under interrupt control only when an interrupt request is received indicating that a certain terminal or terminals should be scanned and/or updated.

When an interrupt request is received by the CPU module from a terminal of an expansion module, the microprocessor shifts to an interrupt state and data from the expansion module selects or "calls" a given subroutine by an address on lines $D_0$–$D_7$. Then the calling input or output will be processed according to the desired and requested interrupt subroutine. Thereafter the subroutine will shift command back to the main program. As will become more apparent when discussing in detail the interrupt features of the present invention, the various interrupt requests will have a certain preselected priority order which will determine whether or not a called subroutine is interrupted by a subsequently called subroutine. If there is no interrupt request, then the executive program is processed repeatedly without processing the interrupt subroutines. Consequently, the subroutines are called and processed only when needed. The number of expansion terminals of modules 30–34 can be increased to larger values. The only practical limitations are the memory capacity which can be expanded to various capacities and the time available for processing interrupt subroutines.

By providing the interrupt expansion modules, the microprocessor of system or controller A can be interrupted a substantially greater number of times than is available on known microprocessors. Thus, the normal microprocessor interrupt concept of priority evaluation and jumping to a subroutine called by a particular interrupt can be used for many separate inputs or conditions. This saves programming time and allows the use of subroutines which may be stored into the memories of system A for only periodic use. The versatility of system A is thereby greatly expanded while still using a readily available, relatively inexpensive microprocessor.

Module 40 which will be discussed in more detail with respect to FIG. 7 is a programmable read only memory (PROM) module. This PROM module is used in system A for the purpose of retaining permanent logic at various addressed locations determined by the logic on lines $A_0$–$A_{15}$. In practice, the executive program and the various subroutines are generally, permanently stored at various addressed locations within PROM module 40. This memory module is used for long term or permanent storage of the program and employs MOS memory chips that are erasable upon exposure to ultra violet light and are programmable by means, such as computer 22 or a tape reading device through direct access module 20. In practice, the PROM module has a capacity of 4,096 eight bit words. The number of words available in the read only memory module 40 may vary according to the desired capacity of system A. In practice, the memory technology used in module 40 is static silicon gate MOS erasable and electrically reprogrammable read only memory chips.

During normal operation of controller A, data is directed from module 40 on lines $D_0$–$D_7$. The parallel transmission of binary data on these lines provides an eight bit word which is addressed by the logic on lines $A_0$–$A_{15}$. In FIG. 1, it is indicated that the data lines $D_0$–$D_7$ are bi-directional at PROM module 40. This is only for the purposes of loading the memory during the programming and debugging operation through direct access module 20. The memory chips of module 40, in practice, are not erasable under normal circumstances; therefore, continuous application of power to this particular module is not required for the purpose of retaining the stored logic. Of course, a variety of different types of read only memories could be used for storing the program information for system A without departing from the intended spirit and scope of the invention as schematically illustrated in FIG. 1.

Referring now more particularly to the random access memory (RAM) module 50, this memory module can be updated periodically during use of system or controller A. Various random access memory modules could be used in system A; however, the basic features of the RAM contemplated in the illustrated embodiment of the invention is shown somewhat in detail in FIG. 8 and will be described later. The random access memory module 50 includes a somewhat standard parity checking circuit 52 schematically illustrated in FIG. 1. In this manner, information to and from the random access memory chips will be checked for parity in accordance with standard practice to determine an error. In practice, module 50 employs random access solid state memory chips with a capacity of 4,096 eight bit words. In this module, an external battery supply is used for retaining the information or data at the several locations on module 50, until the information or data is changed intentionally by operation of controller A in a manner to be described later. The semiconductor memory technology used in module 50 is static N-MOS random access technology. The module 50 is addressable for both reading and writing by the logic on lines $A_0$–$A_{15}$, which address selects the desired address of the RAM module and directs the eight bit word from that location in parallel onto data lines $D_0$–$D_7$. The DBINP logic and the R/$\overline{W}$ logic determines whether or not the data is being inserted or read from module 50. Operation of a random access memory in conjunction with a microprocessor or other type of digital programmable controller is known and various systems could be employed.

In addition to the PROM module 40 and the RAM module 50, it is possible to provide additional memory which may be in the form of PROM and/or RAM. The parity circuit 52, in practice, is of the type which provides a nine bit word and circuitry necessary to generate and check one bit of odd parity for each word. When an eight bit word is written into the memory, parity generator tests the word and generates a ninth bit which will be either a logic 1 or a logic 0 such that the resulting nine bit word will always contain an odd number of logic 1 conditions. When a word is read from the memory, a parity check circuitry checks to be certain that the word still contains an odd number of logic 1 signals. If the check circuit encounters an even number of logic 1 signals, the processor is interrupted in accordance with standard microprocessor practice. Other parity checking circuits or systems could be employed so that errors in the accessed information can be detected.

Figure 9:
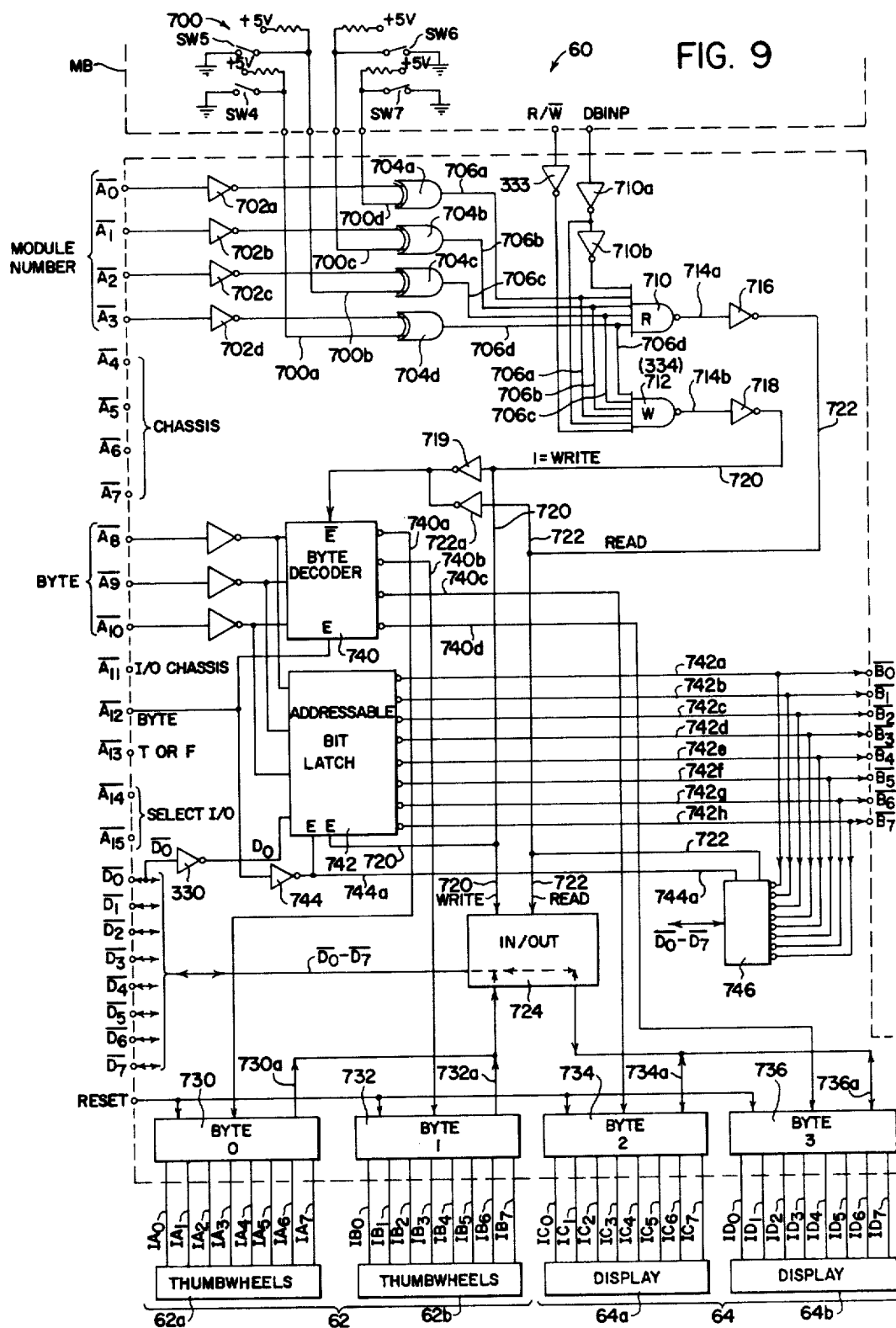
FIG. 9 is a logic diagram showing the features employed in a byte module and certain circuitry used for converting a byte module to a bit output unit.

Programmable controller A employs a standard microprocessor which has eight data terminals and sixteen address terminals. In this manner, an eight bit word or byte can be serviced simultaneously by the microprocessor. This capacity provides distinct advantages with respect to a reading of several inputs and writing into several outputs. However, the logic processing of a single bit in an eight bit word such as ANDing, ORing, or INVERTing, presents substantial difficulty. A substantial amount of software programming is required to logic process a single bit of an eight bit word or byte. This requires memory space and extensive programming. This disadvantage is even more serious in controlling machines and process because a great number of simple logic functions are required. In duplicating a standard relay logic diagram or ladder diagram much of the processing is logic processing of single bit information. Thus, to process this single bit information with an eight bit data capacity drastically increases program storage space and control complexity. For instance, when a single input is to be compared with a single output, the use of eight bit input information is a disadvantage. When memory addresses or binary coded data is being transferred or processed, then the large number of data lines is beneficial. To overcome logic processing disadvantages caused by increasing the capacity of the microprocessor, the present invention provides circuitry for obtaining one bit information which can be logic processed on a preselected data line, such as line $D_0$, in a manner similar to a single bit data processor. Thus, it is a relatively simple process to AND, OR and INVERT logic at various inputs and outputs to provide logic functions which are rendered more complex with the advent of the expanded eight bit microprocessor. To illustrate the use of both the byte and bit modes of operation, there is illustrated a byte input and output module 60 and a bit input and output module 70. Module 60 has a series of input words each of which has eight data bits. These words are created by various inputs, such as thumbwheel network 62, which is illustrated in FIG. 9 as thumbwheel units 62$a$, 62$b$. In a like manner, the output words from module 60 are illustrated as display signals in a display unit 64, which in FIG. 9 is illustrated as two output or display units 64$a$, 64$b$. Thus, module 60 is used to input and output a byte of information as an eight bit word into various input or output locations.

A single bit of information is inputted or outputted from the system driver or module 70 on a single data line $D_0$. Thus, when a bit mode of operation is selected by circuitry, constructed in accordance with the present invention, the logic of line $D_0$ only is processed. The logic on the other bidirectional data lines is ignored. To determine whether or not there is a single bit of information directed to the output units 80 through system driver 70, the system driver is controlled by the logic on the input line DBINP and the READ/WRITE line R/$\overline{W}$. The details of this structure will be illustrated in connection with a detailed description of FIGS. 10 and 11. A power supply 12 provides five volts D.C. for operation of the logic in system A and twelve volts D.C. for the operation of certain other components. The 2 volt and 4 volt lines from the power supply 12 are used for retaining the logic of the RAM when power is inadvertently interrupted. These two lines are controlled by rechargeable batteries. Of course, a variety of other power supplies could be provided in accordance with the desired power requirements of programmable controller A.

CONTROL LINE DEFINITIONS

Referring again to FIG. 1, a number of control lines are illustrated as communicating between CPU module 10 and the various other modules comprising the programmable controller system A. These control lines are external of the CPU module; however, in many instances they correspond to or are logically associated with certain communicating terminals on the 8080 Intel microprocessor used in the preferred embodiment of the present invention and as better illustrated in FIG. 4. To appreciate the general operation of the preferred embodiment of the invention, the basic function of each of the lines illustrated in FIG. 1 will be described separately. Throughout the specification the inverted form of a line designation indicates that a low logic condition, whether pulse or continuous, is the true or "yes" condition. For instance, the READ/WRITE line labeled R/$\overline{W}$ indicates that the read condition is a logic 1 and the write condition is a logic 0. This convention is used in most equipment employing microprocessors and similar digitally controlled numerical processing devices.

The synchronizing signal line $\overline{SYNC}$ consists of a 100ns negative or low logic pulse indicating the beginning of each 8080 machine cycle. This pulse is not programmable and is used to latch the status word in each component or module which requires status information from the CPU for use during a total machine cycle which may contain one or more words.

The external clock pulse $\phi 2$ is created by the CPU internal clocking generator and can be used to synchronize the operation of the various modules. The signal may also be used as an accurate time base. In practice, this clock has either a 2.0 MHz or a 3.0 MHz frequency.

The address lines $A_0$-$A_{15}$ are all logic 0 true, except for $A_{15}$. The logic on these lines is used to provide the address to all memories and I/O modules for controller system A. These address lines are generally output lines from module 10; however, when using the direct access module 20, they are bi-directional and allow input of addresses to module 10. $A_0$ is the least significant address bit in the addressing lines.

The DBINP line indicates the direction of communication of the data lines $D_0$-$D_7$. This control line is used to gate data onto the data bus lines from each of the modules of system A.

The R/$\overline{W}$ line is used in system A to gate data on the data buses to the addressed locations. In view of the similarity between the DBINP line and the R/$\overline{W}$ line, they are generally used together. The DBINP line is used to determine the direction of data flow and to gate the data onto the data buses. The READ/WRITE line R/$\overline{W}$ is used to determine whether this data is written or read. By providing these two control lines, the data on the data bus or lines $D_0$-$D_7$ is stable during the reading and writing pulse on the R/$\overline{W}$ line.

The $\overline{WAIT}$ line is used in connection with the READY line. These lines are communicated with the microprocessor, which allows an additional amount of time for reading slower memory or I/O (input/output) locations. If during an addressed output, the module 10 does not receive a logic 1 condition on the READY line, the microprocessor will enter a WAIT state as long as the READY line is at a low logic. In this state, a logic 0 is created on the $\overline{WAIT}$ line. As soon as the READY input is received, the microprocessor passes out of the WAIT state and a logic 1 appears on the $\overline{WAIT}$ line. This feature is clearly illustrated in FIG. 3 which relates to the operation of the 8080 Intel microprocessor.

The $\overline{INTE}$ output indicates the content of an internal interrupt enable flip-flop 242a on the 8080 microprocessor chip. This internal flip-flop may be set or reset by enable and disable interrupt instructions and inhibits subsequent interrupt calls from being accepted by the microprocessor when the flip-flop is in the reset condition. The internal flip-flop which is produced on the chip itself is automatically reset to disable further interrupts at the time $T_1$ of an Instruction Fetch cycle $M_1$ and when an interrupt has been accepted by the microprocessor. This feature will be discussed in connection with the novel interrupt sequencing of system A in connection with FIGS. 4, 6 and 6A.

The $\overline{HLDA}$ line is the Hold Acknowledge line. This line shifts to a logic 0 when a HOLD REQUEST is acknowledged by the microprocessor MP. This HOLD REQUEST is from the line HOLD REQUEST, as shown in FIG. 1. The HOLD condition or stage of the microprocessor shifts the address and data terminals of the microprocessor to a high impedance state so that these terminals release control over the address lines $A_0$-$A_{15}$ and the data lines $D_0$-$D_7$. These lines can be controlled by the access module 20 during programming and debugging. The signal on the $\overline{HLDA}$ line begins at time $T_3$ for a read memory or input cycle. For a write in memory or an output cycle or operation, the $\overline{HLDA}$ line is shifted at the clock period following the $T_3$ clocking period. In practice and for the purpose of understanding the present invention, it is known that the signal on the $\overline{HLDA}$ line appears after a rising edge of the high impedance on the address lines and data lines occurs after the following edge of $\phi 2$. The HOLD REQUEST line indicates that there has been an external request to shift the CPU, and more particularly the microprocessing chip, into the HOLD condition or state. In this HOLD condition or state, external devices can control the address and data lines as soon as the CPU module has completed its use of these lines for processing the existing or current machine cycle. Control is also relinquished by the CPU module over the DBINP line and the R/$\overline{W}$ line. In other words, these lines may be controlled by the direct access module 20 for programming or other external control functions. In summary, when a HOLD state is requested, the microprocessor shifts into the HOLD condition or state and gives an output signal on the $\overline{HLDA}$ line to indicate this HOLD condition. This condition occurs after a certain amount of clean-up during a machine cycle being processed. The HOLD condition or state comes into being at the next machine cycle and holds the existing internal logic or register conditions of the microprocessor chip.

A similar arrangement is used for the reset operation. A Reset Request is created by the power supply 12 or by the direct access module 20 on the RESET REQUEST line. When this request is received by module 10, the microprocessor is reset. In this condition, the content of the internal program counter of the 8080 microprocessor is cleared. After the reset pulse, the program will start at a location word zero in the memory. The internal INTE and HLDA flip-flops of the microprocessor chip are also reset. The internal accumulator, stack pointer, and registers are not cleared. When the reset condition is entered, the logic on the RESET line is shifted to reset the various flip-flops and other logics throughout system A. This arrangement is used for starting controller system A into operation.

The bi-directional data buses or lines $\overline{D_0}$-$\overline{D_7}$ provide eight bit data communication to and from CPU module 10. In addition, these lines are communicated with the various memory modules and I/O modules. The modules which perform only bit functions, as opposed to byte functions, utilize only one of these lines, at least for outputting data. In the preferred embodiment this line is $D_0$. During the first clock cycle of each machine cycle of the microprocessor, the CPU module outputs a status word on the data line or bus $D_0$–$D_7$. This status word is an eight bit word which describes the current machine cycle. In this status word, the $D_0$ line, in the preferred embodiment, is the least significant bit. The present invention relates to a microprocessor of the type utilizing eight bits of data; however, a different number of data bits can be employed without departing from the intended scope of the invention. With an eight data bit microprocessor the status word can have eight bits generated by the microprocessor according to the instruction or command received from the program.

In one aspect of the invention, a byte of information or data may be processed, or selectively, a single bit may be processed upon a selected one of the multiple, bi-directional data lines or buses.

In microprocessors now available, there is an INTERRUPT capability which is briefly described above. An INTERRUPT capability of the microprocessor allows it to store its present position in a program, jump to a called subroutine, process the subroutine and then jump back to the proper location in the program that was being previously processed. To perform this function, the microprocessor has an INT input and module 10 has several interrupt request terminals INT 0-INT 7. Logic on the INT terminal shifts the microprocessor into the interrupt state. At that time, the INTE terminal ($\overline{INTE}$ line) is energized to prevent subsequent interrupts, until the selected subroutine has reset the INTE terminal at the proper time. A higher priority interrupt can take over operation of the controller before a lower level priority interrupt subroutine is completed, if the INTE has been reset by the processed subroutine. In the past, processing systems utilizing the microprocessor have involved the capability of receiving only a finite, relatively limited number of interrupt requests. This limitation has been dictated by the limitations of the various codes available for subroutine selection or "call". The present invention employs a system which includes eight interrupt inputs which will shift the microprocessor into the interrupt state. In FIG. 1, interrupts INT 0-INT 3 and INT 5-INT 7 are illustrated. In practice, these interrupts are assigned to external conditions, terminals or parameters, which may be inputs or outputs. The priority of the interrupt requests is in reverse order to the numbering, with the highest priority having the lowest number. The lowest priority has the highest number; therefore, the $\overline{PWR}$ condition, which is a logic 0 when power has been turned off, is the highest priority interrupt. In this condition, irrespective of other interrupt conditions, the program will shift into the "power off" subroutine which is found at a selected position in memory, which in practice is octal 010. In practice, the next interrupt input is the $\overline{BOOT}$ which creates interrupt request INT 2 to a location in memory. In this manner, a minimum program is available for initial operation of system A. This initial minimum program is located at octal 020 of memory and is "called" by various means schematically represented as a push-button in FIG. 1. Interrupt request INT 3 is the module interlock and parity check condition, which is operated in accordance with known practice to maintain continuity of the various modules. As will be explained later, the INT 4 interrupt request is a real clock interrupt request, which shifts the program to the octal 040 position in memory. This will be described in more detail with respect to the interrupt functions of system A. INT 5 is a communication interrupt, in the preferred embodiment of the invention. This interrupt generates a location octal 050 in memory. This allows communication from external means, such as the direct access module 20. The interrupt INT 7, which has the lowest priority, places the microprocessor into the interrupt state to read or write from external devices, such as thumb-wheels, lights, switches and visual display devices. This leaves INT 6, which is used with modules 30, 32 and 34 to expand the amount of interrupt capability in system A, in accordance with another aspect of the present invention. This aspect will be described in more detail later. The IIV6 output acknowledges the receipt and processing of an INT 6 interrupt request. This signal line remains at a low logic while the interrupting device transmits a call from one of the modules 30-34 to the CPU module 10. The call instruction is transmitted synchronously with a $\phi 2$ clock signal and provides the address in memory to which a call is placed during a selected additional interrupt provided by the add-on modules, only three of which are shown.

This description of the basic lines or command paths directed to and from CPU module 10 will be sufficient for a full appreciation of the invention which contemplates certain improvements in the CPU module 10 and various selected modules comprising the schematically represented system A, as shown in FIG. 1. These outputs and input lines correspond in nomenclature used by Intel Corporation for its 8080 microprocessor chip used in the preferred embodiment of the present invention. Corresponding nomenclature is used in other commercially available microprocessor chips which have the characteristics set forth generally herein as background and explanatory information well known in the field. The characteristics of this microprocessor chip are well known. Module 10 could produce an I-STROBE control line for software production of a strobe to the various inputs and outputs, if desired.

STATUS WORD FOR MICROPROCESSOR

In the microprocessor utilized in module 10, as in most microprocessors, a status word appears on the data terminals at the first of each machine cycle. This status word indicates the operation to be performed by the microprocessor during the current machine cycle. Although a variety of status codes and conditions could be provided, the ten status words of the Intel 8080 microprocessor are illustrated in the chart shown in FIG. 2. The data terminals have the coding indicated in the vertical columns for each of the various types of machine cycles during the initial part of the cycle. The binary status code on terminals $D_0$–$D_7$ is latched into the status latch SL shown in FIG. 4 at the initial synchronization pulse in the $\overline{SYNC}$ line.

When the machine cycle is an INSTRUCTION FETCH, the coding on data lines $D_0$–$D_7$ as latched into status latch SL will be 01000101. The binary code on each of the data terminals during the initial part of the cycle indicates a condition, as set forth in the status information column. In accordance with Intel 8080 terminology, the logic of data bus $D_0$ is the interrupt acknowledge (INTA). This logic indicates whether an interrupt request has been acknowledged and can be used to gate a restart instruction onto the data buses when the DBIN or DBINP line is active. The logic on the $D_1$ line during the initial part of the machine cycle indicates whether or not there is a writing function. This status is labeled $\overline{W}$ and is a logic 0 when the machine cycle will write data into memory or into an output location. When a logic 1 appears on the $D_1$ instruction line and is latched at the status latch, a memory or input location is read. A logic 1 on the $D_2$ line during the instruction read portion of the cycle indicates that the address buses $A_0$–$A_{15}$ hold the push down stack address from the stack pointer of the microprocessor. This status labeled STACK, is active during only a STACK READ or a STACK WRITE machine cycle.

When a logic 1 appears upon the $D_3$ data line during the initial micro cycle of a machine cycle, this indicates that HALT has been acknowledged. As can be seen in FIG. 2, this occurs during a Halt Acknowledge machine cycle or an Interrupt Acknowledge While Halt machine cycle. Otherwise, during the initial micro cycle, which is labeled $T_1$ in FIG. 3, this data bus $D_3$ is a logic 0. During an output function, the logic on line $D_4$ is a logic 1. This occurs when the machine cycle is an Output Write cycle. A logic 1 on the $D_4$ data line indicates that the address buses contain the address of an output device and that the data bus will ultimately, during the cycle, contain the output data when the R/$\overline{W}$ line is at a logic 0. The logic on data line $D_5$ provides a signal to indicate that the microprocessor is in the FETCH cycle for the first byte of an instruction. Thus, a logic 1 on $D_5$ during the initial portion of the machine cycle indicates that an instruction is to be obtained from memory or another location. This is the status $M_1$ illustrated in FIG. 2. The status INP is contained upon data line $D_6$. A logic 1 on this line during the status portion of a machine cycle indicates that the address buses contain the address of an input device and the input data should be placed upon the data buses when the DBIN output of the microprocessor is active. This output of course corresponds to the DBINP line of the CPU module 10. MEMR logic appears upon the $D_7$ data bus. A logic 1 on this bus during the status information portion of the cycle designates that the data buses will be used for a memory read operation.

During the status portion of any cycle, the coding upon data lines $D_0$–$D_7$ are the codes indicated in FIG. 2. This coding is an inherent function of the 8080 microprocessor and is set forth only for the purpose of a more convenient arrangement for understanding the preferred embodiment of the present invention.

ADDRESS CODING

Figure 2A:
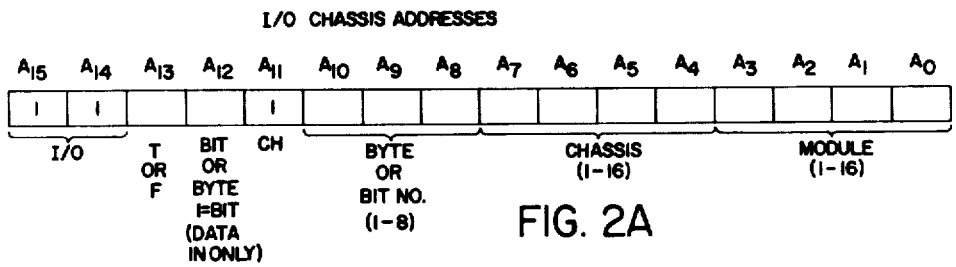
FIGS. 2A, 2B and 2C are address coding used for two input/output addresses and a memory address, respectively.
Figure 2B:
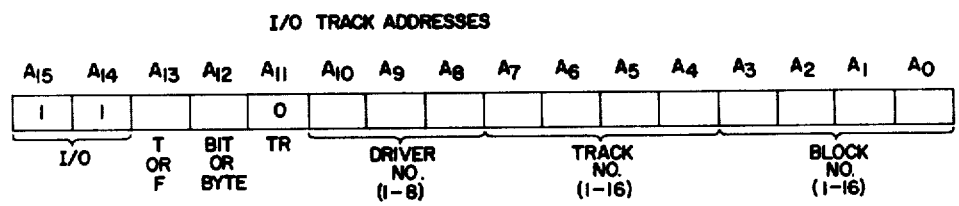
Figure 2C:
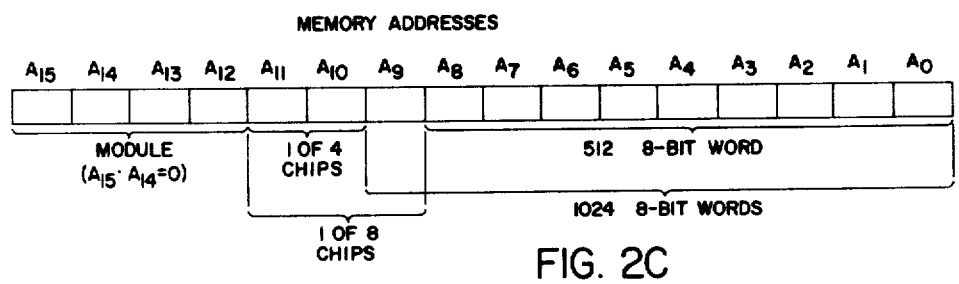

Referring now to FIGS. 2A, 2B and 2C, the coding of address lines $A_0$–$A_{15}$ is set forth for three separate types of addresses. In FIG. 2A, an address is shown for an input/output location associated with the chassis of system A shown in FIG. 1. Basically, in system A, a chassis location is a module in the main structure of the system and includes most input/output locations, except the external locations controlled by common module or drive 70 and the individual driven modules 80. The logic of address lines $A_{14}$, $A_{15}$ is a logic 1 when an input/output (I/O) unit or location is addressed by lines $A_0$–$A_{15}$. The logic at line $A_{13}$ selects either true or false data. In other words, a logic 0 at line $A_{13}$ for an input/output address indicates a true condition for the addressed information.

As will be explained later, system A has the capability of operating in a bit or byte mode for input and output information or data. In the bit mode, a logic 1 appears at address line $A_{12}$ for either a chassis address, in FIG. 2A, or in a track address, in FIG. 2B. A logic 0 in line $A_{12}$, indicates that the input or output of data is to be done in a byte mode. Address bit or line $A_{11}$ selects either a chassis address or an external track address. A logic 1 at line $A_{11}$ indicates that the address is a chassis address as opposed to a track address, which has a logic 0 in the $A_{11}$ bit or line. When the address is a chassis address, a particular word or byte of information is addressed by lines $A_8$–$A_{10}$. The chassis location is addressed by lines $A_4$–$A_7$ and the particular output or input, labeled as a "module" in FIG. 2A, is addressed by lines $A_0$–$A_3$.

As previously mentioned, external locations for input and output data may employ the addressing arrangement illustrated in FIG. 2B. This arrangement sets forth an address for the tracks, i.e. individual input/output locations, indicated by modules 80 in FIG. 1. These locations, in the illustrated embodiment, are single bit input and output terminals or units, such as on-off switches, lights and relays. In this second addressing arrangement, a logic 0 is found at address line $A_{11}$. Otherwise, the addressing is similar to that illustrated in FIG. 2A.

A representative memory address arrangement is shown in FIG. 2C. In this addressing scheme, a module is selected by the more significant address lines $A_{12}$–$A_{15}$. If four memory chips or units are used on a module, only lines $A_{10}$–$A_{11}$ are used for addressing the particular chip or unit. If eight chips or units are used, address lines $A_9$–$A_{11}$ are employed for addressing one of the units. This determines the number of additional lines available for location addressing in the particular unit. If there are four units, 1,024 eight-bit words are available for addressing by lines $A_0$–$A_9$ within such memory units. If eight memory units are employed, then lines $A_0$–$A_8$ are available for word addressing and 512, eight-bit words can be located in each memory unit. See FIGS. 7–8 for an example of the addressing network.

Other addressing schemes for lines $A_0$–$A_{15}$ could be employed; however, the addressing arrangement illustrated in FIGS. 2A–2C is employed in the preferred embodiment of the present invention and is utilized throughout the present description of the preferred embodiment.

BASIC INSTRUCTION CYCLE FOR CPU MODULE

The microprocessor employed in the preferred embodiment of the present invention has a basic instruction cycle as illustrated in FIG. 3. The microprocessor is timed by the input pulses $\phi 1$, $\phi 2$, the first of which determines the initial portion of a micro cycle labeled $T_1$–$T_5$. The micro cycle $T_W$ is set forth for the purpose of designating a wait condition which was described earlier with respect to the interplay between the READY logic and the WAIT logic. If a memory is not ready, then the microprocessor goes into a WAIT state represented by a logic 1 on the WAIT line, i.e. a logic 0 on the $\overline{\text{WAIT}}$ line. When the memory is then ready, the WAIT line shifts back to a logic 0 and the microprocessor continues into micro cycle $T_3$. For each machine there is a synchronizing pulse labeled SYNC. This synchronization pulse corresponds essentially to the internal synchronizing pulse of the 8080 microprocessor. The pulse has been shaped somewhat. The pulses shown in FIG. 3 are those entering and leaving the module 10; however, they are basically the pulses from the microprocessor itself. The logic correspondence between these two pulses, the CPU logic of FIG. 3 and the actual microprocessor logic, is apparent from the circuit shown in FIG. 4. During each of the micro cycles, the function set forth at the lower portion of FIG. 3 takes place. Sometime three micro cycles are used. In other instances, many micro cycles are required for a particular instruction. For instance, in an Intel 8080 when memory is accessed, as many as eighteen micro cycles may be used in normal operation. During the $T_1$ micro cycle of a machine cycle, the logic on lines $D_0$-$D_7$ is read. The address on lines $A_0$-$A_{15}$ (at the address terminals of microprocessor MP) is provided by either the internal program counter or another register within the microprocessor. This address information is placed into the program counter or register during a prior machine cycle. The DBINP line corresponds to the internal DBIN line. This determines whether or not data is placed on the data lines $D_0$-$D_7$, in a subsequent portion or micro cycle of the machine cycle. During the initial portion, the data at the data terminals of the microprocessor indicates the type of cycle to be processed during the machine cycle which may require several micro cycles. The logic on the lines designated in FIG. 3 changes according to the type of instruction to be processed in accordance with well known practice in the microprocessing art. These logic conditions will be employed throughout the description of the preferred embodiment of the present invention.

CENTRAL PROCESSING UNIT (CPU)

Figure 4A:
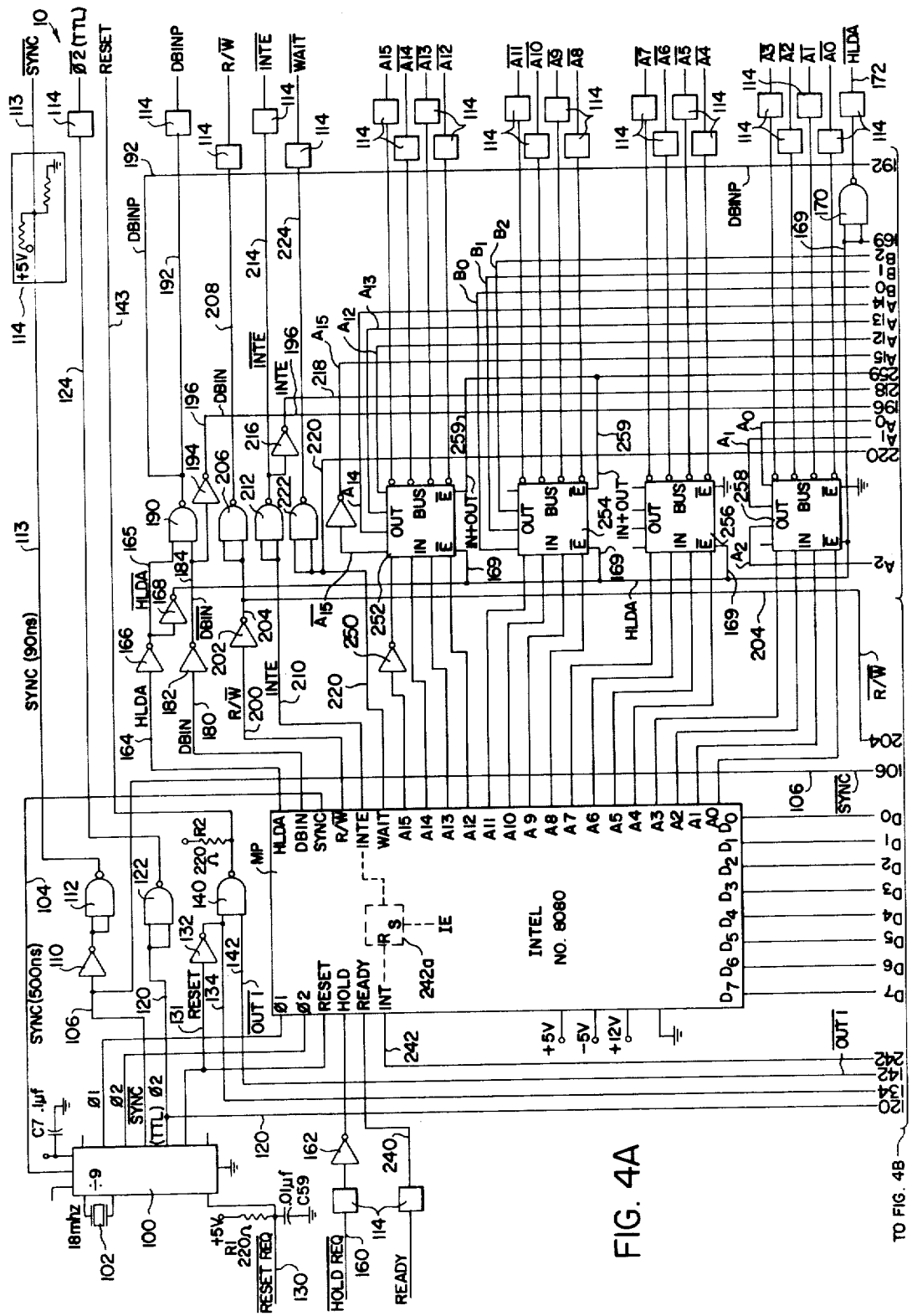
FIG. 4 is a composite view made of separate and distinct sections labeled FIGS. 4A, 4B, 4C, which sections are to be taken together and are jointly referred to in the specification as FIG. 4, and illustrating the central processing module of the preferred embodiment of the present invention and employing a major portion of the inventive features of the present invention.

Referring now to FIG. 4 which is divided into three separate views labeled 4A, 4B and 4C. These views are to be taken together and from the basic components of the central processing unit (CPU) module 10, as illustrated in FIG. 1. The various components of the CPU module will be described with respect to the showings of FIG. 4. The initial description shall involve the normal input and output of information to and from microprocessor MP together with certain peripheral equipment. Thereafter, specific features of the preferred embodiment of the invention will be discussed in detail with respect to other components contained in FIGS. 4A-4C.

As each successive program step or command is called by the microprocessor, the command indicates the type of cycle to be performed. If it is an input or output command, the data is applied to the data lines and the storage or output location is directed to the microprocessor on the data lines, which requests two bytes for the sixteen bit address. in accordance with general practice an address to be used for input or output (as shown in FIGS. 2A-2C) is stored at adjacent positions in memory. By processing the total program, and any called subroutines, controller A is updated periodically at a rate which may be once each 1.0 ms. Consequently, controller A can change conditions, read different results and perform all control functions in what appears to be instantaneous action. In other words, if a switch is closed to give an input change that, by the program, demands an output change, the program will make the necessary change in the output during a single run of the program being processed which may take only about 1.0-10.0 ms.

Referring now to the CPU module shown in FIG. 4, a divide by nine divider chip 100 is controlled by a crystal 102 to produce a 18 megahertz input which is divided by nine by chip 100 to produce $\phi 1$, $\phi 2$. The SYNC line 104 from microprocessor MP is directed to the chip 100 to produce a shorter and more distinct $\overline{\text{SYNC}}$ pulse in line 106. Throughout this description, an inverted form of logic indicates that the negative condition, or low logic condition, is true. Thus, the $\overline{\text{SYNC}}$ line is a logic 0 when true, i.e. at synchronization caused by a pulse in line 104. Double inverters 110, 112 control a line 113 which is the synchronizing output for module 10. At the output, a network 114, which is set forth in detail at line 113, is used at the various inputs and outputs to allow external control and positive control of the various leads and buses of module 10. The synchronizing line 106 is used in other components on module 10, for purposes to be hereinafter described. The signal of line 106 is a pulse of approximately 90 ns, whereas the SYNC pulse from microprocessor chip MP is approximately 500 ns in length. This provides a sharper synchronizing pulse for further processing as illustrated in FIG. 3.

The TTL $\phi 2$ line is a clocking pulse corresponding to the other $\phi 2$ line. This clocking pulse is inverted by inverter 122 to produce the inverted form of the clocking pulse in output line 124. This second $\phi 2$ output is used to control various logic gates throughout module 110 and the other modules forming the control system A, as schematically illustrated in FIG. 1.

A Reset Request pulse, as previously described, is applied to crystal control chip or divider 100 through line 130. This Reset Request line produces the reset output in line 131 which is inverted by inverter 132 to produce a $\overline{\text{RESET}}$ pulse in line 134, which resets certain logic on module 10. Line 134 also activates a NAND gate 140 to give a logic 1 on the main RESET line 143. In accordance with one aspect of the invention, the RESET line 143 can be activated by a line 142 which is the programmable OUT1 command line from a special instruction decoder 150 which will be described later and which is shown in more detail in FIG. 20.

A Hold Request pulse or signal on line 160 creates a logic 1 at the HLDA or Hold Acknowledge terminal of microprocessor MP. This output signal appears in line 164. Inverter 166 produces inverted logic, or $\overline{\text{HLDA}}$ in line 165. This inverted logic is again inverted by inverter 168 to produce a HLDA logic in line 169 to disable certain logic circuits on module 10 during a HOLD condition or state for the microprocessor MP. The logic from line 169 is inverted by inverter 170 to produce a $\overline{\text{HLDA}}$ logic in output line 172 which is used in other modules of controller system A.

The previously discussed DBINP line is controlled by the DBIN terminal of microprocessor MP which determines the logic of line 180. Inverter 182 inverts the DBIN logic to a $\overline{\text{DBIN}}$ logic in output line 184. NAND gate 190 converts the logic on line 184 and this appears as the DBINP logic. Thus, the DBINP logic is a combination of the DBIN logic and the Hold Acknowledge condition of microprocessor chip MP. In this manner, during the HOLD condition, the DBINP line is held to a high impedance state to allow access and control by direct access module 20. Under normal circumstances, the DBIN and DBINP logic are correlated and inverter 194 inverts the $\overline{\text{DBIN}}$ logic on line 184 to produce the inverted logic, or DBIN, on line 196. The DBIN line indicates whether or not data should be applied to the data bus $D_0$-$D_7$, as previously described.

The READ/$\overline{\text{WRITE}}$ line or terminal R/$\overline{\text{W}}$ of microprocessor MP is connected to line 200. The logic of this line is inverted by inverter 202 to produce an inverted form of this logic in output line 204. Inverter 206 reinverts this logic to produce the standard R/$\overline{\text{W}}$ logic in output line 208. In a like manner, the interrupt enable logic at the INTE terminal of microprocessor MP controls the logic at line 210. This logic is inverted by inverter 212 and appears in the inverted form in output line 214. A further inversion by inverter 216 produces the non-inverted form of the INTE logic in output line 218. In a similar manner, the logic on the WAIT pin or terminal of the microprocessor MP is connected to line 220 which is inverted by inverter 222 to produce an inverted $\overline{\text{WAIT}}$ logic in output line 224. The input 240 to microprocessor MP is the READY input which is used in connection with the WAIT output for the purpose of allowing additional time to access information in slower memory units. The INT (Interrupt) logic is applied to chip or microprocessor MP at the INT pin or terminal by line 242. The source of this logic will be described in connection with the interrupt aspect of the present invention. Interrupt signal is produced by the interrupt flip-flop 244 which will be set and reset in accordance with the subsequent discussion of the interrupt operation.

Upon receipt of a signal on line 242, microprocessor MP, in accordance with standard practice, goes into the INTERRUPT state. This stops the internal program counter and shifts the data lines to receive a CALL instruction to a particular subroutine coded on the data lines or terminals $D_0-D_6$. This subroutine stored in memory will handle the specific interrupt condition and then relinquish control over the microprocessor for subsequent processing of the interrupted program in the standard manner. The INT signal resets the internal interrupt flip-flop 242a to place a logic 0 on the INTE terminal or line. This prevents creation of any other interrupt signal. A program instruction or command designated EI which is the Enable Interrupt instruction is contained in the interrupt subroutines to then set the internal flip-flop 242a for acceptance of higher priority interrupts or additional interrupts after one has been acknowledge. This is standard operation for a microprocessor and is incorporated in the 8080 Intel microprocessor MOS chip.

When a code is to be sent along the address lines to various modules for selection of specific outputs, inputs and memories, the logic or code appears on the $A_0-A_{15}$ lines. For a reason to be described later, the $A_{15}$ logic is inverted by inverter 250 so that lesser used portions of certain memories are used in certain random storage operations of the microprocessor controller A. Under normal operating conditions, the logic of addresses $A_0-A_{15}$ passes through logic transfer devices or control gates 252-258 and onto the buses $\overline{A_0-A_{14}}$ and $A_{15}$. These devices or gates produce an inverted output to invert the address lines; therefore, since in the logic used the $A_{15}$ input is inverted, the $A_{15}$ output of module 10 is in non-inverted form. The other address outputs are in the inverted from for subsequent use by controller system A. Gates 252-258 are standard logic transfer intergrated circuit gates or transfer devices of the type which retains logic connection between the individual "OUT" terminals and the "BUS" terminals. For instance a logic 1 on the "BUS" $A_{15}$ terminal produces a logic 0 on the $\overline{A_{15}}$ "OUT" terminal. A logic 0 at both $\overline{E}$ terminals places the "BUS" terminals, under the control of the "IN" terminals. A logic 1 at either $\overline{E}$ terminal allows the "BUS" terminals to float to a logic 1 and removes control of these terminals by the "IN" terminals.

If the HOLD ACKNOWLEDGE (HLDA) logic on line 169 is high gates 252-258 are disabled at the left terminal $\overline{E}$ and the "BUS" terminals float toward a logic 1. Thus, the "BUS" terminals and the external $A_0-A_{15}$ lines can be controlled by external logic, i.e. from the direct access module 20. If the IN+OUT line 259 is high, gates 252 and 254 are disabled at the right terminal $\overline{E}$. The output or "BUS" terminals of these gates are allowed to float toward a logic 1 when the gates are disabled. This disabled state allows control by the random access module 20 during the HOLD state with gates 252-258 disabled. Also, the disabled state of gates 252, 254 allows control by special instruction decoder 150 during certain programmed outputs of the special instruction decoder. Under normal operating conditions, without a programmed IN or OUT command, address logic passes through gates 252-258 to the system A.

Data on external data buses $D_0-D_7$ is directed to the microprocessor MP through gates 260, 262 shown in FIG. 4B. These gates or transfer devices operate in a manner similar to gates 252-258. Logic on the DBINP line 192 controls the direction of information flow through gates 260, 262. The logic 1 input signal on line 192, releases the "IN" terminals and allows control of the "BUS" and "OUT" terminals by lines $D_0-D_7$. These gates are disabled in the HOLD state so that the data lines at the right hand side can float toward a logic 1 for control by the direct access module 20, as shown in FIG. 1. Data at terminals $D_0-D_7$ of microprocessor MP is directed to gates 260, 262 by gates 280, 282, shown in FIG. 4C.

As can be seen in FIG. 4, the designation $D_0-D_7$ relates to data lines or data terminals and the logic or data on these data lines or terminals may be controlled by data transfer gates or devices. In other words, logic on the $D_0$ terminal of the microprocessor may be directed to the output $D_0$ line of module 10 through gate 280 and gate 262. Thus, the several interconnecting lines are marked $D_0$ even though they are not always being used to transmit the $D_0$ logic, which may be conducted through an alternate path of $D_0$ lines. These paths are controlled by gates or transfer devices and the operation of these gates or transfer devices is herein explained. This same concept is used for the address lines $A_0-A_{15}$.

As so far described, the microprocessor MP can produce addresses in the address lines and receive or transmit information on the data buses $D_0-D_7$. Hereinafter, certain features of the present invention will be described to modify the normal operation of inputting data and outputting data at the prescribed addresses, be they input, output or memory addresses.

Address control gates 252, 254, 256 and 258 are similar, commercially available IC chips which are enabled by a logic 0 at both enabled terminals $\overline{E}$. The output, "OUT", terminals of these chips are always connected to the inverted "BUS" lines for concurrent, inverted logic. Consequently, at all times the "OUT" terminals and their connected leads "read" the logic of the "BUS" or address lines $A_{15}-A_0$. When a logic 0 appears on both enabled terminals $\overline{E}$, the input side "IN" of each gate is connected in inverted from to the "BUS" side of the gate to control the lines on the "BUS" terminals. A logic 1 on the HLDA line 169 isolates the "BUS" terminals from the "IN" terminals and allows the "BUS" terminals to float and be controlled by logic applied to the "BUS" terminals. Thus, during a HOLD state of microprocessor MP, the logic on the addresses $A_0-A_{15}$ appears on the output leads "OUT" from gates 252-258.

When a logic 1 appears on the IN+OUT line, the right hand enable terminal $\bar{E}$ disables gates 252 and 254. Thus, during an IN or OUT programmed command from the special instruction decoder 150, gates 252, 254 are disabled. This creates a logic 1 at the "BUS" terminals if there is no external data applied to lines $A_8$-$A_{15}$. A logic 1 appears in line $A_{15}$ and a logic 1 in lines $\overline{A_8}$-$\overline{A_{14}}$. Thus, address $A_{15}$ is a logic 1 and addresses $A_8$-$A_{14}$ are at a logic 0. Gates 256 and 258 are not affected by the logic on the IN+OUT line 259 and, thus, carry the microprocessor addresses appearing on terminals $A_0$-$A_7$ of the microprocessor, except during a HOLD state. In this manner, any address during a programmed IN or OUT command, which will be explained in detail later, will appear at an address of 32 K plus the coding on lines $A_0$-$A_7$.

Gates 260, 262 operate in the same manner as gates 252-258. During an input operation, the DBINP line 192 shifts to a logic 1. This removes the "IN" terminals from control of gates 260, 262. The inverted "BUS" logic is, thus, controlled by external lines $D_0$-$D_7$ and is applied to data gate 270 through gates 260, 262. At other times, a logic 0 appears on the DBINP line 192 and gates 260, 262 are enabled to connect the input "IN" terminals to the "BUS" terminals so that the external lines are controlled by lines $D_0$-$D_7$ from gates 280, 282. Gates 280, 282 operate somewhat differently than the previously explained commercially available transfer gates. Gates 280, 282 are IC chips which include an enable terminal $\bar{E}$ and a direction terminal "Dir". A logic 0 enables the operation of these gates. A logic 0 on the direction terminal "Dir" connects the input "IN" terminals with the "BUS" terminals. A logic 1 on terminal "Dir" connects the "BUS" terminals to the output terminals "OUT" or to the lines connected to these terminals. Under normal circumstances, a logic 1 appears at the direction terminal "Dir" for outputting data through gates 280, 282 to the data control gates 260, 262. During an interrupt condition, which will be described later, the direction terminal will have a logic 0 which will connect the input terminals "IN" to the "BUS" terminals to produce a restart subroutine call to a selected address. When there is an INT 6 condition, there is a logic 0 in INT 6 line 290. This produces a logic 1 in output 294 of inverter 292. In this manner, IC chips 280, 282 are disabled and there is no logic or data transfer therethrough. In these chips, the disabled condition blocks all logic transfer so that a subroutine address can be sent from an external location during the INT 6 processing condition of microprocessor MP. This will be described in more detail with respect to the interrupt operation of the module, as shown in FIG. 4.

LOW IMPEDANCE ADDRESS AND DATA BUS

By using the integrated circuit chips or gates 252-262, the lines connected directly to the microprocessor are separate from the lines external of module 10. The external address lines and external data lines are low impedance operating lines. The lines connected to microprocessor MP are high impedance lines in accordance with standard microprocessor design. Thus, the integrated circuits or chips forming gates 252-262 convert the normally high impedance microprocessor lines, such as used in an 8080 microprocessor, to low impedance lines externally of module 10. High impedance lines of the type connected directly to the microprocessor chip produce high voltage changes upon exposure to electromagnet radiation. By using the low impedance external lines, in accordance with one aspect of the invention, any inadvertent electromagnetic radiation produces high induced currents, but only low voltage surges. The logic of the system shown in FIG. 1 is generally voltage responsive. Thus, the low voltage created by inadvertent, stray radiation to the external lines does not tend to affect the logic of system A. This is true even if the external lines are relatively long and act as somewhat efficient antennas. When using the 8080 chip, the address terminals and the data terminals present an impedance of approximately 2.5 K ohms. This produces 1.0 milliamp sink for 5.0 volt D.C. logic. The impedance of each output of gates or chips 252-262 is approximately 2 ohms and produces a desired 50 milliamp sink for the controlled logic because of resistor networks 114 on each control line. In practice, it is desired that the low order impedance of the lines external of the module be less than about 1% of the high order impedance of the microprocessor terminals. The general range of this ratio should be 0.1% to 1%. This produces a good noise immunity between the microprocessor chip and the external controlled logic of the system A.

BIT MODE OPERATION

Figure 13:
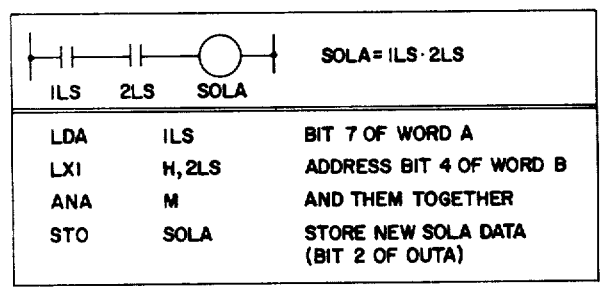
FIG. 13 is a simplified program to perform the function of the program shown in FIG. 12 but when the bit mode of operation is employed in the preferred embodiment of the present invention.
Figure 12:
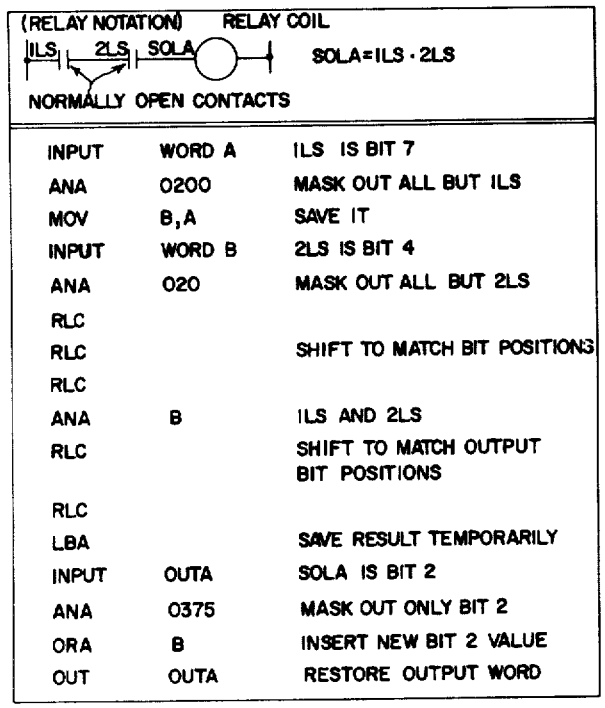
FIG. 12 is a schematic view in representative program of a simple logic function which is to be programmed in a byte mode.
Figure 14:
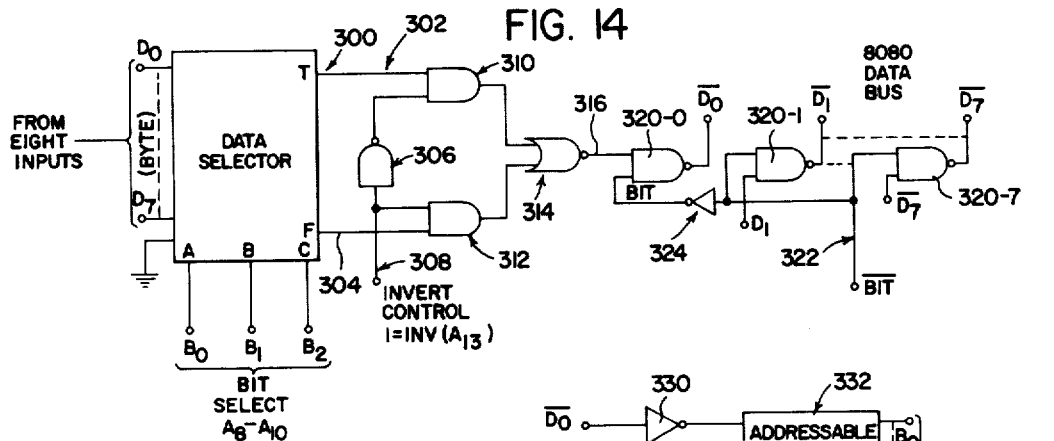
FIG. 14 is a schematic illustration of the circuitry employed in FIG. 4 for converting to a bit mode of operation on input to the microprocessor with certain modifications for purposes of explanation.

As so far described, the programmable controller system A, and more particularly the CPU module 10 shown in FIG. 4, operates on a byte basis wherein the data input and data output of the microprocessor MP is an eight bit word, or byte. In this type of system, masking techniques and data shifting are required to logically process a specific bit of a byte or word. Thus, if two inputs are to be ANDed, the inputs must be masked and/or shifted to produce the inputs at the same location within the microprocessor. This requires a substantial amount of software. In accordance with one aspect of the present invention, a microprocessor capable of multiple data bit process is provided with a bit mode of operation. This aspect of the invention allows a byte to be introduced into CPU module 10 on the external bidirectional data lines $D_0$-$D_7$. The specific bit is selected on the module and directed on a selected data line, such as line $D_0$ connected to the microprocessor MP. Thus, bit data or information can be introduced into the microprocessor at a specific location and logically processed without requiring masking and shifting of the data within the microprocessor by extensive software programming. The software to AND two normally opened switches 1LS and 2LS to produce a relay coil condition at SOLA requires the software program shown in FIG. 12 if the data is introduced into module 10 upon a known, but random data line, and is processed in a byte mode as is standard practice with microprocessor control systems. In accordance with one aspect of the present invention, a bit mode operation is provided on the basic CPU module 10, which operation produces a relatively simple software program for ANDing switches 1LS and 2LS. This more simple program is shown in FIG. 13. The components necessary for shifting from a standard byte mode of operation to a bit mode is schematically illustrated in FIG. 14. In FIGS. 2A and 2B, the bit mode of operation is addressed by placing a logic 1 in address $A_{12}$. Referring to FIG. 1, module 70 produces only data on line $D_0$; therefore, this data is only bit data and processed accordingly. Information from the I/O chassis module 60 is introduced into CPU module 10 on lines $D_0$-$D_7$, which is a byte of eight separate bits. When this type of data is received, the bit mode of operation may be selected to process a selected bit of information from the input byte. By employing this novel conversion system in the CPU module, a known bit of input data can be processed in bit mode even though it is contained in an input byte.

FIG. 14 illustrates schematically a logic circuit for converting a byte of information into a selected bit of data for subsequent processing by microprocessor MP. In this schematic representation, a data selector 300 is connected to data lines $D_0$-$D_7$, which carry an eight bit word, or byte. Address lines $A_8$-$A_{10}$ control terminals A, B, C of selector 300 to select one of the eight bits of information or data contained on the input byte. This selected bit in the true condition appears at the T terminal, or line 302, and the false condition of the bit, i.e. the inverted data, appears at the F terminal, or line 304. Thus, the selected bit of information or data from the input byte is contained in inverted form on line 304. Inverter 306 directs a logic 0 to gate 130 when the logic of line 308 is a logic 1. This is controlled by address lines $A_{13}$-$A_{15}$ which are all at a logic 1 when the inverted form of input/output (I/O) information is required. AND gates 310, 312 direct either the true or the false information to gate 314, according to the logic on line 308 which is controlled by the input or output address $A_{13}$. The NOR gate 314 has an output 316 which therefore carries a logic which is the true or false condition of a selected bit which is decoded by the logic on line $D_0$-$D_7$ of data selector 300. The data to microprocessor MP is contained on the output of NAND gates 320-0 to 320-7. The NAND gates 320-1 to 320-7 are controlled by the $D_1$-$D_7$ lines. When the bit mode of operation is contained at address line $A_{12}$, a logic 0 appears in line 322. This inhibits gates 320-1 to 320-7. Thus, a logic 1 appears in $\overline{D_1}$-$\overline{D_7}$ lines and has no effect upon the 8080 data. Inverter 324 converts the $\overline{BIT}$ logic and applies it to gate 320-0. This information combines with the logic on line 316 to produce the desired logic in line $D_0$ at the microprocessor. Thus, the $D_0$ line carries the desired logic to the microprocessor for processing in a bit mode. This function will be described in more detail with respect to the actual circuitry illustrated in FIG. 4 although the schematic circuitry of FIG. 14 is representative of the basic concept employed in module 10 for byte information into the bit operation.

Figure 15:
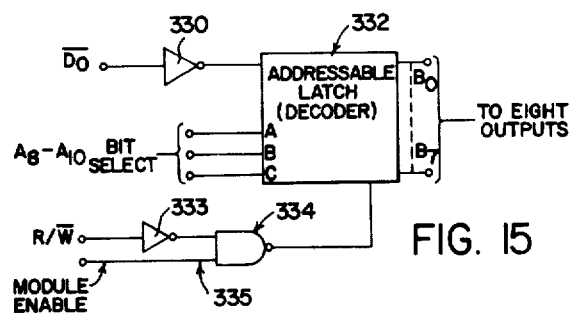
FIG. 15 is a schematic view illustrating conversion of an output circuit to accept a single bit of information and similar to the bit circuit illustrated in FIG. 9.

Referring now to FIG. 15, there is illustrated a schematic circuit to be used at various modules to accept the logic on line $D_0$ which is the bit processed logic from the microprocessor, i.e. from CPU module 10. This single bit logic appears on line $\overline{D_0}$ which is inverted by inverter 330 and directed to an addressable latch decoder 332. The address lines $A_8$-$A_{10}$ at terminals A, B and C produce the logic from lines $D_0$ at the decoded output $B_0$-$B_7$ of the addressable latch decoder 332. A logic 0 on the $R/\overline{W}$ line produces a logic 1 at the output of inverter 333. This enables NAND gate 334 to enable the addressable latch or decoder 332 upon receipt of a module enable signal at line 335. Thus, when the particular module is addressed during an output or writing operation, a selected output location receives a bit of logic from the $D_0$ line. This type of logic can be used at various modules to output the processed bit of information and apply it to a single bit addressed output location. Of course, this circuit would be appropriate for either a memory or an output module. In FIG. 9, an output circuit similar to the circuit shown in FIG. 15 is used in module 60. This bit mode output operation will be discussed in more detail with regard to its use on a byte input/output module, such as module 60.

Referring now to the actual input circuitry used in the preferred embodiment of the invention for selecting bit mode operation for input byte data, the logic on the $\overline{BIT}$ line 322 is controlled by NAND gate 340 shown in FIG. 4. This BIT gate receives logic from address lines $A_{15}$, $A_{14}$ and $A_{12}$. This gate produces a logic 0, or a bit mode signal $\overline{BIT}$, in line 322 when the address is an input/output address and bit mode is requested by address line $A_{12}$. The INV NAND gate 342 is controlled by the logic of address lines $A_{15}$, $A_{14}$ and $A_{13}$. The output 344 of gate 342 is the $\overline{INV}$ line. The $\overline{BIT}$ line 322 and the $\overline{INV}$ line 344 combine at NOR gate 345 to produce the output 308, schematically illustrated in a more simplified form in FIG. 14. This output on line 308 is a logic 1 when there is a byte mode and inverted logic is requested. If line 308 has a logic 0, gate 310 is actuated to produce the true form of logic at the input of gate 314, previously discussed in connection with the schematic showing of FIG. 14. The output of gate 312 is a logic 0; therefore, line 316 includes the inverted form of the bit logic selected by selector 300. A logic 1 in line 308 produces the opposite effect and transmits the inverted form, or the false logic, in line 316. Thus, line 316 contains the input information or data which is to be used by the microprocessor during input of the bit mode of operation.

The $\overline{BIT}$ line 322 also controls data input or steering AND gates 340-1 to 340-7. When the address indicates a bit mode of operation, a logic 0 appears in line 322 and these gates are disabled at a logic 0 output. Line 322 also controls NAND gates 340-0 which regulate the $D_0$ input data line from gate or transfer device 262. A logic 0 in line 322 places a logic 1 at the third, or steering, input of gate 346. The other two inputs are the $\overline{IN3}$ and line 316. Thus, when there is no programmed IN3 signal from the special instruction decoder 150, i.e. a logic on the $\overline{IN3}$ line, bit mode has been addressed, i.e. a logic 0 in the $\overline{BIT}$ line 322, the logic of line 316 is transmitted to the input of NOR gate 348 instead of the logic on the $D_0$ line at the input of gate 340-0. This gate is disabled by the logic of line 322. Gate 348 is activated until the IN3 signal is received from decoder 150. Thus, during normal operation gate 348 is active and the logic of line 316 is inverted and applied to the input $DI_0$ of data gate 270. This logic is strobed to the $DO_0$ terminal of gate 270 at a DBIN pulse from the microprocessor. The selected bit of information or data is, therefore, directed by gate 348 to the $D_0$ data bus or terminal of microprocessor MP during the bit mode of operation. During normal operation, line 322 is a logic 1; therefore, gates 340-0 to 340-7 are all active and transmit data from transfer devices or gates 260, 262 through gate data 270 to the microprocessor during each input cycle during which a DBIN pulse is created and used by module 10. With respect to the logic on the $D_0$ line, the logic is inverted first by gate 340-0 and then by gate 348 to produce the desired logic state for use by microprocessor MP when processing byte data.

In summary, when the BIT mode of operation is selected, the specific addressed bit of an input byte is transmitted by a special network from data selector 300 to the $D_0$ line at the microprocessor. Of course, other networks could be used for processing a single bit of information. Also, data line $D_0$ was selected only for convenience and other lines could be used.

STATUS READ AT IN3

Special instruction decoder 150 is used to provide a wide variety of hardwired signals which can be produced by simple programmed commands to the microprocessor, especially input or output commands. This novel decoder operates from the status code of the microprocessor and will be described later in some detail; however, since gates 346 and 348 of the previously described circuit are controlled by the IN3 output signal or pulse from special instruction decoder 150, it is appropriate to indicate the operation of this particular hardwired program controlled signal from decoder 150. A logic network 350 includes gates 352, 354 and 356. The output of these gates is illustrated in FIG. 4C as being the interrupt enable condition INTE, the memory interlock condition $\overline{\text{MEN INT}}$, and the input/output interlock condition $\overline{\text{I/O INT}}$. These gates are controlled by lines 218, 354a and 356a, respectively. When there is an IN3 instruction or signal from decoder 150, network 350 places the condition of the logic of the designated sources to the $D_7$, $D_3$ and $D_2$ input data lines, respectively, by lines 352b, 354b, and 356b.

The IN3 pulse is a logic 1 when true and appears at the output of inverter or NAND gate 359. An AND gate 360 controls the logic on data input gate 348 during the IN3 instruction. Thus, during IN3, gate 346 is disabled and gate 360 is enabled to read the logic on the $\overline{\text{PWR}}$ line 358. This line represents the condition of the power supply of system A. It is seen that the status of several conditions of system A can be read on separate data lines during the program IN3 instruction or signal from decoder 150. If other information were to be read, it could be placed upon the available data but lines, such as $D_1$ and $D_4-D_6$. Consequently, gate 348, which is used for control of logic flow during a bit mode of operation, is also used as a data selector for reading a condition of system A during an IN3 instruction from special instruction decoder 150.

SPECIAL INSTRUCTION DECODER

The special instruction decoder 150 is shown in more detail in FIG. 20 and the peripheral equipment utilizing this decoder is shown in FIG. 4. The purpose of the instruction decoder is to add instructions to a CPU module externally of the commercially available MOS chip microprocessor, but using information or data generated by the chip upon selected software commands. As noted in FIG. 2 if a certain instruction command is given to the microprocessor, a known status code appears at the bidirectional data terminals or lines $D_0-D_7$. During the synchronization pulse of each $T_1$ micro cycle shown in FIG. 3, a status latch SL (FIG. 4B) can latch the $D_0-D_7$ status code at its output terminals for subsequent use during a selected machine cycle. This is known practice in microprocessor systems and the logic on specific output terminals, such as the $D_0$-INTA, can be used in the system. In accordance with the present invention, the latched binary status code at the output of the status latch can be logically combined with selected address logic to produce usable signals that are created by a programmed command. For instance, if a program command is IN3, an IN3 pulse is created. Since this is an Input Read command, a logic 1 appears at the $D_6$ terminal of the microprocessor during the status word and at synchronization. Address lines $A_0$, $A_1$ contain a binary three. This logic produces a logic 0 pulse at the IN3 terminal of the special instructions decoder. With an OUT command, a logic 1 appears at the $D_4$ terminal to produce an OUT command signal. Consequently, by either an IN or OUT programmed command to the microprocessor, a special decoded signal can be produced to perform many hardwired functions on module 10 or in other parts of controller A. This procedure could be used with other commands, except for those which are automatic such as Instruction Fetch, which occurs at each process step. In summary, instruction decoder 150 provides output signals which can be generated in response to a software command. The concept expands the versatility of programmable controller A so that certain signals can be created conveniently without extensive software implementation. In other words, a simple IN3 program step, produces an IN3 signal.

As shown in FIG. 4, the status code logic for each separate command of FIG. 2, as they appear on lines $D_0-D_7$ of microprocessor MP, are latched into the output of status latch SL. The output code or logic, as shown in FIG. 2, appears at the output of latch SL after a synchronization pulse of a given machine cycle. In accordance with one aspect of the invention, this status code or information, which is available on standard microprocessors, is used to create output signals in response to selected, simple software instructions. In the illustrated embodiment, signals are created whenever the machine cycle is for an input (IN) or an output (OUT) cycle. A logic 1 appears at the $DO_4$ output terminal of latch SL when an output (OUT) signal is requested. A logic 1 appears at output $DO_6$ when an input (IN) signal is requested. This concept is apparent from the machine cycle coding shown in FIG. 2. Thus, whenever the machine cycle is an IN status or an OUT status, a logic 1 appears upon the IN or the OUT lines as shown in FIG. 20 and FIG. 4. These command or status codes are decoded to produce a series of necessary hardwired signals. The output condition of latch SL also produces a logic 1 at lines other than the IN and OUT lines. For instance a logic 1 at the $DO_0$ output terminal produces an Interrupt Acknowledge sign of INTA. This places a logic 1 on line 362 for use in the subsequent INTERRUPT processing. A logic 1 on the $DO_3$ line of the status latch produces a Halt Acknowledge signal HLTA in line 364. When this happens, gate 365 is grounded to turn on panel light 365a. This light is also controlled by a WAIT signal in line 220. Thus, it is seen that the latched in logic or status code from the $D_0-D_7$ lines at the output of latch SL is used to produce output signals for subsequent processing of information on the CPU module. This expands the capability of the system A over systems of the past which required extensive software for accomplishing the results obtained by decoding the standard status code and using it for output pulses or signals. The outputs 0-7 of special instruction decoder 150 as set forth in FIG. 20 are outputs IN0-IN3 and OUT0-OUT3, respectively. The function of these programmable signals and the combined status code and address logic to obtain them are set forth in the truth table of FIG. 20.

If a software instruction of IN0 appears, this produces an address of $A_0=0$ and $A_1=0$. In addition, the IN line from output $DO_6$ is a logic 1. This produces a pulse output from decoder 150 at the IN0 line. As the logic on line $A_0$, $A_1$ changes, it is possible to get four separate pulses for either an IN signal or an OUT signal. The IN and OUT signals are connected to enabling NOR gate 370 to enable decoder 150 whenever either an IN or an OUT command is provided to the microprocessor. DBIN line 196 and the R/W line 204 also enables decoder 150 by gate 380 to produce the desired pulse outputs. The output pulses from decoder 150 are pulsed by gate 380.

As explained in connection with the network 350, an IN3 command decoded from $A_0$, $A_1$ and $DO_4$, $DO_6$, produces a logic 1 to feed the status of various information into the microprocessor on selected input lines $D_0$–$D_7$. In FIG. 20, it is shown that an IN0 command could be used to freeze the outputs on modules 70 by developing an I-STROBE. This strobe could be removed by an OUT0 command. Other uses of the hardwired output signals created at the status latch will be appreciated from further description of the present invention. When a software IN or OUT command is given, the status code shown in FIG. 2 appears on the status lines and is latched into output of status latch SL. Thereafter, this information is decoded to produce finite output signals.

The address lines during the use of decoder 150 address specific output device. This device is a memory location and in accordance with another aspect of the invention, the addresses are held at high order locations in memory. This is accomplished by providing the lock line 372, shown in FIGS. 4 and 20, which line has a logic 0 whenever decoder 150 is in operation. An inverter 374 produces the logic on IN+OUT line 259, which has been previously discussed. Thus, when the decoder 150 is in operation as determined by the output of gate 370, the output "BUS" terminals of the transfer devices or gates 252, 254 are allowed to float to a logic 1. Thus address lines $A_8$–$A_{14}$ are at a logic 0 and a logic 1 appears at line $A_{15}$. This causes the address lines to address a memory location having an address number which exceeds 32,767, or octal 77,777. The location could be 32,768, or octal 100,000 for IN0 or OUT0. Thereafter, the addresses could be incremented in binary fashion. Thus, OUT3 address, as shown in FIG. 20, is at 32,771 in decimal numbers or octal 100,003. Octal address for this number is illustrated also in FIG. 20. Thus, the relatively unused portion of memory above the 32 K position or address is used for any IN or OUT command or instruction. This feature is accomplished by using inverter 250 in the $A_{15}$ address of microprocessor MP. The true condition of $A_{15}$ when interconnecting the modules by a motherboard or otherwise is a logic 1.

Status latch SL shifts or strobes the logic or status code from microprocessor lines $D_0$–$D_7$ to the output lines $DO_0$–$DO_7$ upon a negative SYNC pulse created at the start of each machine cycle, as shown in FIG. 3. This information or code remains the same until the next cycle. As can be seen, this latched information or code can be provided directly to external logic, such as the INTA line 362, or can be decoded by special instruction decoder 150 to produce a series of output pulses in response to specific software instructions or commands. Modifications could be made in the decoding arrangement or in the memory maping arrangement in accordance with the concepts described above.

As shown in FIG. 3, after the information has been latched into the output of status latch SL, the DBIN or DBINP pulse is created. In the same manner, the R/W pulse is created. One of these signals activates decoder 150 after the gates or transfer devices 252, 254 are disabled by IN+OUT line 259. When processing an IN command or an OUT command, only addresses $A_0$–$A_8$ are active and these are mapped into a position above 32 K which is determined by a logic 1 in the $A_{15}$ line.

A SYNC pulse on line 106, which is a logic 0 pulse transfers logic from the input terminals to the output terminals of the status latch SL. In addition, during this synchronization pulse, special instruction decoder 150 is disabled. This disables the special instruction decoder during reset of the microprocessor to prevent random IN or OUT commands during this unsettled condition.

During operation, the logic on the output terminals of latch SL are decoded together with the logic of $A_0$, $A_1$. At a R/W inverted pulse, or a DBIN pulse, the information at the input of special instruction decoder 150 is strobed into the outputs as indicated in FIGS. 4 and 20. This produces specific output pulses having a length determined by gate 380. These pulses then perform certain logic functions on module 10, which functions are generally set forth in the truth table of FIG. 20. The OUT3 pulse is a programmed SYNC pulse in the preferred embodiment. This pulse can be used externally of module 10 for program synchronization if desired. The function of the I-Strobe pulse has already been described together with the function of the IN0 and OUT0 pulses. The OUT1 pulse has been described with respect to gate 140 for creating a RESET signal. The OUT2 pulse is used for restarting during the interrupt process, which will be described later. Of course, these software requested hardwired signals for use on the CPU module can be used for various other functions. By using the special instruction decoder, a variety of hardwired output pulses can be created by using the inherent status code function of the 8080 microprocessor and other microprocessor chips. By providing the arrangement utilizing the lock line 372, microprocessor addresses a high address during the IN and OUT commands decoded by decoder 150. Thus, there is no tendency to rewrite or otherwise destroy information in lower level memory locations, which are generally used in programming and in other more common processing. Actually the information written into the high order memory locations is insignificant and random and is not used in actual processing. In other words, the high order memory locations above about 32K are the depositories for miscellaneous addressing during processing of the IN and OUT commands by the coded logic on lines $D_0$–$D_7$ during the initial portion of the machine cycle. Of course, these high order memory locations could be obtained by using a true condition for any of the more significant bits of a sixteen bit address. By use of the most significant bit, i.e. bit $A_{15}$, the most remote memory area is used for storing the random information appearing on the address lines during the IN or OUT programmed commands. In this manner, the IN and OUT command information can be stored in series at a location seldom used by a stored program of software instructions. Any random data is also stored in these advanced locations during the IN and OUT commands. The IN and OUT signals are at logic 0 as noted by inverted form on the drawings; however, this inverted form is conventional and will not necessarily be identified in the discussion.

The instruction decoder 150 shown in FIGS. 4 and 20 use the latched status code at the output of status latch SL and addresses on lines $A_0$, $A_1$ to activate one of the eight outputs 0–7 of decoder 150. Of course, the latched status code could be decoded by itself or with selected other address lines or selected data lines $D_0$–$D_7$ to give the desired signals upon a software command. In other words, the data latched at the output of status latch SL can be used by itself or with programmed logic from the memory as exhibited by data lines $D_0$–$D_7$. This type of operation will require a call to memory to exhibit desired signals in response to software commands. These signals are hardwired and may be used on CPU module 10 or at other locations in system A. The use of the latched status code on latch SL with selected address lines $A_0$, $A_1$ is used in the illustrated embodiment and is preferred.

HOLD REQUEST CONCEPT

Figure 5:
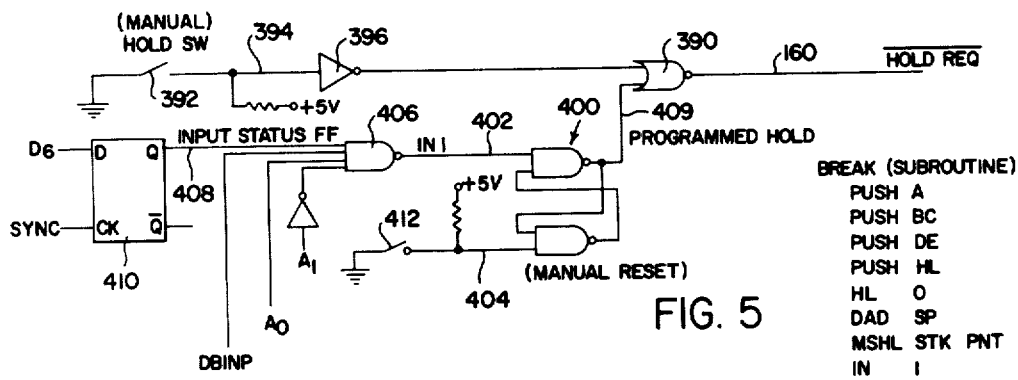
FIG. 5 is a schematic logic diagram illustrating the HOLD REQUEST function of the preferred embodiment, together with an abbreviated subroutine which may be employed therewith.

With an Intel 8080 microprocessor chip, the internal registers can not be read or modified during the HOLD state, except by software procedures. Programmable controller A includes a hardwired arrangement for enabling the HOLD condition of microprocessor MP and for allowing the use of software during the holding operation. This concept is employed during debugging and programming primarily by the direct access module 20, as shown in FIG. 1. The Hold Request signal is obtained by circuitry as schematically illustrated in FIG. 5. In this hardwired circuitry, a NOR gate 390 controls the logic of the $\overline{\text{HOLD REQUEST}}$ line 160 as shown in FIG. 4. A manual or computer controlled switch or logic, schematically illustrated as switch 392, applies a logic 0 to line 394 when a HOLD is requested by an external device such as computer 22. This logic is inverted by inverter 396 to produce a logic on one input of control gate 390. This applies a logic 0 to line 160 and requests a HOLD condition for the microprocessor MP. When the HOLD state is reached, the external module 20 can control all address and data buses, as previously discussed. This HOLD state produces a logic 1 at the HLDA terminal or line 164 for the purpose of disconnecting the chip from the address lines by the logic on line 169. Also, the data lines are disconnected at gates or transfer devices 260, 262. This concept has been previously described. Thus, at a specific command, either manually or by the computer, microprocessor MP can be placed in the HOLD state. In accordance with one aspect of the invention, a software command can activate hardware to provide the HOLD condition for microprocessor MP. In accordance with this aspect of the invention, a programmed HOLD flip-flop 400 has a set line 402 and a reset line 404. The set line is controlled by a control gate 406 which is a NAND gate having inputs 408 from flip-flop 410, DBINP, $A_0$ and $\overline{A_1}$. During an IN1 command, $A_0$ is a logic 1 and $A_1$ is a logic 0. Thus, these two inputs of gate 406 are at a logic 1. After the synchronization pulse of an IN command, the logic 1 of the $D_6$ data line, as shown in FIG. 2, is clocked into line 408 by flip-flop 410. At the DBINP pulse, all inputs to gate 406 are a logic 1. This produces a logic 0 in set line 402 and a logic 1 in output 409 of flip-flop 400. Thus, on a programmed IN1 command a HOLD request is placed upon microprocessor MP. Flip-flop 400 can then be manually reset by switch 412. By utilizing this HOLD request command which can be initiated by software, the program shown in the lower part of FIG. 5 may be used. At the breakpoint (BREAK) selected by computer 22, the program subroutine illustrated in FIG. 5 is processed. At first, the registers A-E, H and L are stacked on a pushdown memory arrangement which is well known in the Intel 8080 technology. Thereafter, the high and low registers H, L are set to a logic 0. At DAD, the stack pointer is added to the H and L registers. Thereafter, the H and L registers are stored in memory at the stack point. This provides the re-entry address for the subroutine. Thereafter, there is provided an IN1 command. This places the microprocessor in the HOLD state as shown in FIG. 5. The NOP step is then used to read and modify any registers of the microprocessor. After this has been done, flip-flop 400 is manually reset and the subroutine is progressed by bringing out the register information by a last in, first out basis. After this has been completed, the RET command is given to return the subroutine to the executive program. By providing a hardwired circuit controlled by a software command, such as IN1, the microprocessing chip may be placed into a HOLD state at any position in the program of controller A. This is done by calling the subroutine shown in FIG. 5 at any given location in the program by using an external computer 22. For instance, if an address below the address 121 appears to present difficulty, the call break subroutine can be called at address No. 121. Whenever address 121 is reached, the subroutine is processed which includes an IN1 command. This stops the microprocessor and places it in the HOLD state for interrogation. The subroutine shown in FIG. 5 may be preceded by decrementing the return address by a selected number. This allows the return to the basic program at a position above the break point which position will produce the proper return address which has been erased for the purpose of placing the break call instruction in the program.

During the IN1 command, a pulse is created on the IN1 terminal of the special instruction decoder. This is not used on CPU module 10; however, similar logic is duplicated at module 20 for the programmed hold request signal as shown in FIG. 5. The IN status line $D_6$ is used as hold request logic of module 20 and is needed for access by external devices, such as computer 22. This IN1 output could be employed on module 10 for other processing. In addition, this terminal could be used for the programmed HOLD request signal. During the HOLD state, a logic 1 appears in the HLDA line 164 and the address terminals and data terminals are in the high impedance state. Control is then obtained over the external address and data lines by the external device such as the direct access module.

REAL TIME CLOCK

A variety of real time clock circuits could be used for programmable controller A, as shown in FIG. 1; however, in accordance with one aspect of the invention, the real time clock includes a counter 440, shown in FIG. 4B, which produces a pulse every 10.0 ms on output line 442 or a pulse every 1.0 ms on output line 444. A switch 446 is used to select one of the outputs for operation. Counter 440 is driven by the TTL $\phi 2$ line 120 and may be turned on or off by a programmed control line 448. A selected binary logic on this line disables the real time clock or counter 440 and is produced by the Q output of flip-flop 450. This flip-flop is clocked by the IN2 pulse as previously described. The logic, after clocking on the Q output or line 448, is determined by the logic of $A_2$ at the time of the IN2 pulse. The set terminal S of flip-flop 450 is held by line 452 at a logic 1 so that the flip-flop can be reset by line 134, but is not set during operation. Consequently, an IN2 software command with a selected logic on address line $A_2$ can either turn the real time clock 440 on or off. This produces a software control over the internal real time clock of the CPU module 10. The condition of the real time clock or counter 440 is sensed by a flip-flop 454 having a clocking pulse connected to line 456 which is the output of switch 446. Thus, according to the setting of switch 446, flip-flop 454 is clocked periodically. During each clocking, a logic 1 is applied to the inactive Q terminal. A logic 0 is thus clocked into the $\overline{Q}$ terminal connected to line 462 which is the $\overline{INT4}$ line. This produces a requested interrupt for microprocessor MP at priority level 4, in accordance with the interrupt function to be discussed later. When the interrupt has been processed, a logic 0 is produced in the Reset line 460. Thus, during normal operation flip-flop 454 is clocked at a known frequency to interrupt the program and shift it to the real time subroutine. The reset line 460 resets the flip-flop for the next clocking period. Thus, the real time clock program may be called up at a set time irrespective of the processing time required for the executive program used in controller system A. Thus, a real time background is provided for system A and a timing function can be developed in the software by known techniques. The real time clock can be activated or deactivated by an IN2 programmed command with a set logic on one of the address lines, in this instance, address line $A_2$. The use of address line $A_2$ with the IN2 command (formed from IN and $A_0$, $A_1$), means that in the software there can be an IN6 command which is IN2 combined with $A_2$. In this manner an IN2 command (IN2=yes plus $A_2=0$) enables the real time clock and an IN6 (IN2=yes plus $A_2=1$) disables the clock.

INTERRUPT CONCEPT

Microprocessor chip MP is a standard 8080 Intel chip having an INT input terminal controlled by the logic on line 242, as previously described. When an interrupt is requested by a logic on line 242, the interrupt enable INTE line 210 (218) receives a logic 0 which indicates that an interrupt is being processed and prevents acceptance of another interrupt. The interrupt feature of the microprocessor is controlled by a standard No. 8214 interrupt decoder 500 produced by Intel Corporation. This decoder includes, as primary function terminals, the terminals illustrated in FIGS. 17 and 4C. Terminals W, X, Y and Z are connected to the data lines $D_0$–$D_3$, respectively, at the output side of gate or transfer device 280. Terminal G receives the program initiated OUT2 command from the special instruction decoder 150 which has been previously described in detail. The binary logic on line $D_0$–$D_3$ at an OUT2 command indicates the level of interrupt which is to be given priority. In other words, if the interrupt is at the fourth level, the INT 4 subroutine will provide a logic 0100 at output leads $D_3$–$D_0$. This is a binary four and indicates that an interrupt below level 4 (higher priority) may be accepted by interrupt decoder 500. Interrupts INT 1-INT 3 will be accepted. Interrupts INT 5-INT 7 will not be accepted by decoder 500. The interrupt decoder 500 produced by Intel has only the capabilities of processing eight separate levels. In accordance with the illustrated embodiment, interrupt INT 0 is held to a logic 1, i.e. a false condition. Thus, this terminal is not used. Terminals 1-7 indicate the type of interrupt received by decoder 500. They are in the order of priority indicated previously. The highest priority interrupt being received is processed. If a lower order priority interrupt is being processed, the higher order interrupts can obtain control and be processed before returning to the lower priority interrupt. This is well known in the art and is a standard unit for accomplishing the priority selection. The outputs I0-I2 carry the logic of the interrupt level being processed. In other words, during an interrupt INT 4, the coding will be 001 on lines I0-I2, respectively. The ISE terminal receives the INTE signal from microprocessor MP. When an interrupt is first acknowledged by the decoder 500, a negative pulse is created at the $\overline{IA}$ terminal to set flip-flop 244, shown in FIG. 4C. This produces a logic 1 in INT line 242 informing the microprocessor that an interrupt request has been received. When the proper subroutine is started, an OUT2 command is received in the OUT2 line to reset flip-flop 244. This produces a logic 0 in line 242 and again creates a logic 1 in the interrupt enable INTE line (210) 218. These are the basic terminals which are provided on an Intel No. 8214 interrupt decoder. The function of this decoder is well known.

The use of interrupt decoder 500 in controller A on module 10 will be discussed in connection with the interrupt INT 4 which is the real time clock interrupt request. This request occurs under normal circumstances at uniformly spaced time intervals determined by switch 446. The discussion of this particular interrupt request applies equally to the other interrupt requests, except for INT 6 which is used for interrupt expansion.

The description of the circuit shown in FIG. 4 with respect to the operation of an interrupt INT 4 negative request pulse on line 462 will illustrate the manner in which the interrupt feature of the present invention is performed. The schematic showings of FIGS. 17, 17A and 18 will be of assistance in this regard. Prior to the acceptance of an interrupt request, microprocessor MP has a logic 1 in the INTE line 218 which is connected to the ISE terminal of decoder 500, as shown in FIGS. 4C and 17. This logic 1 enables decoder 500 for processing of negative pulses received on request terminals 1-7, which terminals correspond to the numerical assigned priority levels of the interrupt signals as contained within standard decoder 500. Assuming now that counter 440 of the real time clock has been pulsed to clock flip-flop 454. This produces a logic 0 in the $\overline{INT}$ 4 line 462. When this happens, a binary logic for the digit four is displayed at terminals I0-I2 connected to lines 502, 504, and 506, respectively. At approximately the same time, a negative interrupt acknowledge pulse is created at the $\overline{IA}$ terminal of decoder 500. Thus, a negative pulse in line 508 resets flip-flop 244 which places a logic 1 on INT line 242. This resets internal flip-flop 242a of the microprocessor to place a logic 0 on enable INTE line 218. This holds decoder 500 so that no other interrupt can be processed and coded on lines I0-I2. In this manner, the microprocessor MP receives an interrupt request signal. During the next machine cycle of microprocessor MP, the logic shown in FIG. 2 for the INTERRUPT ACKNOWLEDGE status appears on data lines $D_0$–$D_7$. This binary coding is latched at the output side of status latch SL at the synchronization pulse of microprocessor MP. This status code logic produces a logic 1 at the $DO_0$ output terminal of status latch SL. No other status code, except an Interrupt Acknowledge While Halt, gives a logic 1 at terminal $DO_0$. Thus, the INTERRUPT ACKNOWLEDGE line 362 receives a logic 1 and this activates gate 510 that also receives input logic from line 290, which is the $\overline{IIV6}$ line. Since the processed interrupt is not a INT 6 condition, line 290 is a logic 1, as will be described in connection with decoding network 524. Two logic 1 signals at gate 510 produce a logic 0 in the output 512. This logic 0 turns off data gate 270, as previously described. Thus, lines $D_0$–$D_7$ connected directly to the microprocessor are released to float toward a logic 1, or false condition, and are controllable by data gates or transfer devices 280, 282, in a manner to be described later. INTA signal on the $D_0$ line is retained in a latched condition at a terminal $DO_0$ until the next sync pulse. Thus, this is a continuous logic 1 condition instead of a pulsed logic 0 which is created at the output of special instruction decoder 150. The INTA logic 1 signal is also directed to the input of NAND 250. The other input to this gate is the DBIN line 196. Thus, at the DBIN pulse, shown as a DBIN pulse in FIG. 3, a logic 0 is strobed into line 522. This immediately shifts the "Dir" terminals of logic transfer devices 280, 282 to a logic 0, which allows transfer of data from the "IN" terminals to the "BUS" terminals. In this manner, the "IN" terminals of transfer devices 280, 282 are used to direct data into the microprocessor during the DBIN pulse, after an interrupt has been acknowledged by the $D_0$ terminal of microprocessor MP.

Referring now to FIG. 2 and FIG. 17A, when an interrupt acknowledge has been received, the microprocessor looks for an address to which the control of the microprocessor may be transferred to process the subroutine corresponding to a specific interrupt condition. The input nature of the cycle is clearly shown in FIG. 2 wherein the $D_1$ status line, or $\overline{W}$ line, is a logic 1. The microprocessor will read a subroutine address from the floating $D_0$–$D_7$ lines. The address for each of the separate interrupt restart routines used in the preferred embodiment is set forth in octal coding in FIG. 17A. It is noted that in the preferred embodiment, the restart calls (which contain a call instruction and an address) all begin with octal 3 and end with octal 7. Thus, each of the subroutines is at a memory location as set forth in the right hand columns of FIG. 17A. In these columns it is noted that $D_0$, $D_1$, $D_2$, $D_6$ and $D_7$ are always logic 1 for a restart subroutine to be employed by the separate interrupt requests. Thus, the input terminals corresponding to $D_0$, $D_1$, $D_2$, $D_6$ and $D_7$ of the microprocessor can be latched to a logic 1. This is done by line 523. The other lines to the "IN" sides of gates 280, 282 carry the logic of the coded lines 502, 504 and 506. Thus, $D_3$, $D_4$ and $D_5$ provide logic which varies according to the interrupt level which is being processed. In the present example, the RST4 address is used for the real time clock subroutine. This is created by a logic 100 on line $D_5$, $D_4$ and $D_3$, respectively. In this manner, the three lines I0-I2 control the memory location to which the microprocessor shifts for the interrupt subroutine. The other data lines are latched to a logic 1. At the same time, decoding network 524 decodes the logic on lines 502, 504, and 506 together with the $\overline{DBIN \cdot INTA}$ strobing logic on line 522. Network 524 includes NAND gates 530, 532 which are controlled by the output of inverter 534, and the outputs of the "0" inverter 536 and the "1" inverter 538. Line 506 is directed to gates 530, 532 without being inverted. Thus, at the INTA.DBIN strobe, line 290 is shifted to a logic 0 if the interrupt is INT 6. If the interrupt is INT 4, as in the example, a logic 0 appears in line 460 and line 290 remains at a logic 1. This logic 0 in line 460 is directed to the reset terminal of flip-flop 454 to reset the real time clock for subsequent operation. This decoding network for resetting the real time clock is schematically illustrated in FIG. 18.

Referring now to FIG. 19, a typical subroutine at address octal 040 is set forth in abbreviated form. The first command is LA 004. This is a load to the microprocessor accumulator binary four. The next command is the OUT2 command. This has been discussed previously. At that time, a logic 0 appears in the OUT2 line at the output side of special instruction decoder 150. This logic 0 resets flip-flop 244 to a logic 0 at INT line 242. Then, the subroutine shifts to an EI command which sets internal flip-flip 242a. In this manner, the INTE line 218 shifts to a logic 1 to again allow acceptance of interrupts by decoder 500. Since there has been a new logic code latched into status latch SL, there is no longer an INTA signal on line 362. Thus, a logic 1 appears at the "Dir" terminals of logic transfer devices 280, 282. The logic passes through these gates in a normal fashion between the "BUS" and the "OUT" terminals. At the OUT2 pulse, the logic of the $D_0$, $D_1$, $D_2$ and $D_3$ is applied to the W, X, Y and Z terminals, respectively, of decoder 500. This logic, which is the accumulator logic 00000100 is decoded as level 4, by decoder 500. Thus, interrupt requests INT 4-INT 7 are disabled and INT 0-INT 3 can be accepted. Of course, the next interrupt request must wait the short time needed to shift line 242 and set flip-flop 242a. Consequently, a logic 1 at the ISE enabling terminal indicates when decoder 500 can accept a next interrupt request. In this manner, higher priority interrupts can cut into the subroutine being processed under the INT 4 condition. As will be apparent from the description of the additional interrupts, these higher interrupt priority levels are more drastic conditions, which conditions require immediate attention by an operator.

INTE line 218 is then shifted to a logic 1 by the programmed EI command in the subroutine. Thereafter, subroutine No. 4 is processed. This subroutine may take a variety of forms and is not important to the understanding of the present interrupt concept. However, in practice, the accumulator of the microprocessor is loaded with the octal 010 at the end of the subroutine. This is level eight on the priority scale, which is less than any level on decoder 500. The internal accumulator receives a binary coding of 00001000. Then a programmed OUT2 command is processed. The octal 010 is applied to the $D_0$–$D_3$ terminals to produce a logic 1 at the $D_3$ terminal and a logic 0 at the $D_0$–$D_2$ terminals. This logic 0001 is applied to the priority decoding terminals W, X, Y, and Z, respectively, of decoder 500. Decoder 500 can now accept any interrupt below INT 8. Thus, all interrupts can be accepted by the decoder. The programmed OUT2 command at the end of the subroutine for each interrupt condition clears the decoder for subsequent interrupt request signals.

Other interrupts are processed in accordance with the same basic principles, as set forth with respect to interrupt INT 4, with the exception of the expansion interrupt concept, which is INT 6 and which will be described later. In that instance, the IIV6 line 290 is shifted to a logic 0 to deactivate gate 510 and logic transfer devices 280, 282. The subroutine addresses for INT 6 are contained on separate modules 30, 32 and 34, as shown in FIG. 1, and as explained in detail with regard to the showings of FIGS. 6 and 6A.

The various interrupt request input lines used in the preferred embodiment are schematically illustrated in FIG. 1. Pulses or signals on these lines enter module 10 through networks 114 and a plurality of primary inverters 540. Certain secondary inverters 542 are employed in some situations where the incoming interrupt signal is a logic 0 signal. An inverter 544 at the output of inverter 540 for the power interrupt, ACPWR, controls the logic in the $\overline{PWR}$ line 358. Thus, inverter 544 is used to read the condition of the power supply during a program IN3 command, as previously described. NAND gate 546 is used to join the I/O interlock in the memory interlock as a common interrupt condition. Inverter 548 shifts the logic of this condition before placing it on one of the level terminals 0–7 of interrupt decoder 500. A logic 0 at any of the interrupt terminals produces an interrupt request. For instance, when power is interrupted for any reason, the normal logic 0 on the $\overline{AC}$ $\overline{PWR}$ line shifts to a logic 1. This is inverted by one of the inverters 540 to produce a logic 0 request at the INT 1 terminal.

As previously described only interrupt levels having a higher priority than an interrupt being processed can force a disruption of one interrupt and a processing of another interrupt. The power condition is the highest interrupt priority level in the illustrated embodiment. The interrupt INT0 has the highest priority level in decoder 500 and is maintained at a logic 1. This terminal is not used in the illustrated embodiment of the present invention because a reset performs the same function. The $\overline{BOOT}$ interrupt input (INT 2) shifts the program to a subroutine at octal 020 in memory. This address is contained on lines $D_3$-$D_5$, as shown in FIG. 17A. Generally, this input is controlled by a pushbutton which is used to load a minimum program into the controller A or for other such purposes which should take precedent or priority over any condition of system A, except the power status. The next interrupt level is the input/output (I/O) and memory (MEM) interlock systems. If one of these interlock circuits is broken, a logic 1 appears on the input of the broken circuit. A logic 0 appears at one input on gate 546. This gives a logic 0 at the output of inverter 548 to request a level INT 3 interrupt. Thus, controller system A would go into a program subroutine and hold the subroutine and controller until the interlock error can be corrected. The next highest order of interrupt request is INT 4. This is the real time clock interrupt which has been described earlier in detail.

The interrupt request INT 5 is generally used with external communication devices for interrupting the standard program so that external equipment can be used to control features of system A. The next priority interrupt is INT 6 which will be described in detail in the next section and is used as one important aspect of the present invention. The last interrupt is INT 7 which is generally used for servicing various pushbutton and display devices of the type used on module 60 or other similar modules. Whenever a signal is received on the INT 7 line, a subroutine at octal 070 is processed to read the condition of the various switches and to change selected display devices according to current data or information. In other words, the switches and display devices in module 60 may be held at a given condition for several program cycles and until there is a call, i.e. INT 7 request, from that module indicating that there has been a change in conditions or a call from another location indicating that there should be a change in the condition of output device module 60 or other similar modules. At that time, INT 7 signal is created and the pushbuttons and displays are updated by an appropriate subroutine.

It is implicit in the priority discussion that the priority levels of the interrupts are used basically for simultaneous hardwired calls by the interrupt circuits. However, the priority levels can also be used to determine the ability of a second interrupt call to disturb an interrupt subroutine being processed. Under certain conditions, which may be programmed, the priority levels or the relative importance thereof, may be modified. This could be done by sending an OUT2 command with a level which is different than the interrupt level being processed. See FIG. 19 for the OUT2 priority command.

It is apparent that the interrupt system provides an efficient manner for obtaining a jump signal to a selected subroutine which is coded on lines 502, 504 and 506. This hardwire subroutine selection arrangement substantially reduces software demands of system A and locates the required subroutines at selected, convenient locations in either the RAM or PROM.

INTERRUPT EXPANSION

In accordance with one aspect of the present invention, programmable controller system A can process a substantial number of separate and distinct interrupt conditions on several modules, three of which are shown as modules 30, 32 and 34 of FIG. 1. Of course, other modules could be employed without departing from this aspect of the invention. wherein a fixed interrupt level control device or interrupt decoder 500 is provided with an expandable interrupt position or level, which is the INT 6 condition. By using the present invention, the INT 6 input to decoder 500 can be employed for a number of specific and selected "add-on" interrupts, which can be priority controlled externally or randomly processed. The structure of system A, as so far described, is not modified to provide the greater number of interrupt request conditions. Thus, a fixed number of interrupt terminals available on Intel 8214 interrupt decoder is not a limitation in the system shown in FIG. 4. By a novel interrupt expansion concept, which will be hereinafter explained, the INT 6 position or level provides an interrupt window which may be filled by a multitude of separate and distinct interrupt conditions. These interrupts are all processed as an INT 6 priority. The INT 6 priority is used for expansion of programming capability at specific addresses, which addresses are not used unless required by an external interrupt "call". The interrupt window could be provided at other levels.

Figure 6:
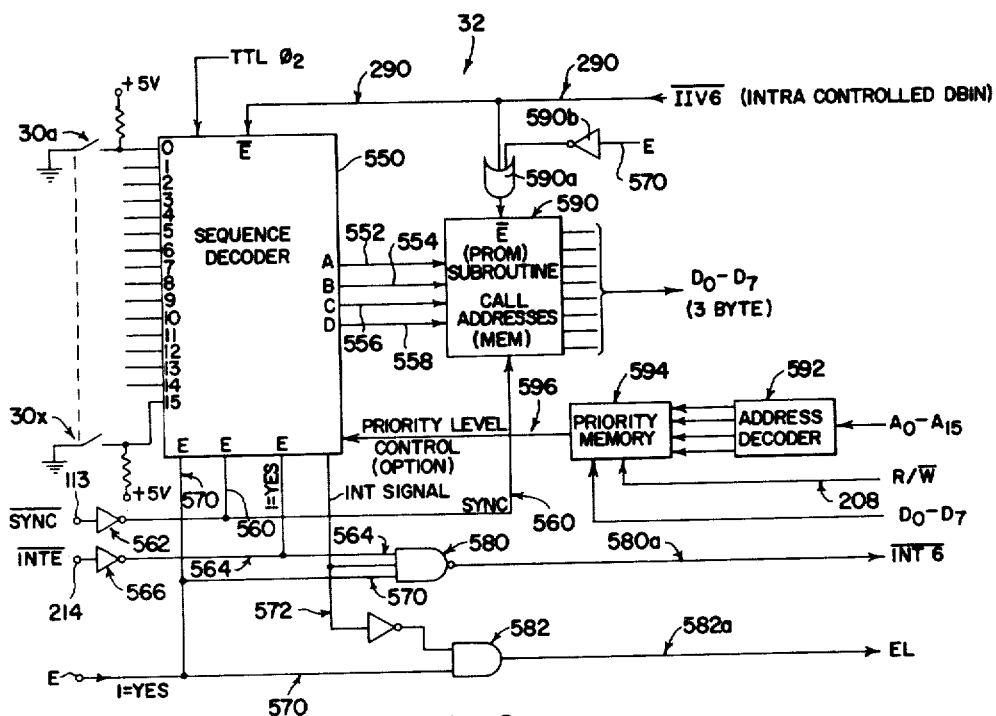
FIG. 6 is a schematic logic diagram illustrating an expansion module for expanding the interrupt capability of the programmable controller.

Referring now to FIG. 6, there is a schematic representation of the structure of module 32, which construction is used on each of the modules 30, 32 and 34, as shown in FIG. 1. Interrupt switches 30–30x control the logic on input terminals 0–15 of a sequence decoder 550. A sequence decoder of the type used in FIG. 6 contemplates a periodic scanning by a strobe TTL $\phi$2 which "looks" at the input terminals in a preselected sequence. As soon as the scanner notices an interrupt request signal, the interrupt is acknowledged and processed by a subroutine, assuming decoder 500 of FIG. 4C is not at a priority greater than INT 6. After the interrupt has been processed and turned off, the strobe continues from that interrupt position and progresses through the various input terminals looking for another interrupt request. Thus, during normal operation the first interrupt condition acknowledged is processed and then the strobe continues in accordance with known sequencing until the next interrupt condition is acknowledged and processed. The coding of the particular acknowledged interrupt appears on output terminals A, B, C and D of sequence decoder 550. Thus, these lines are decoded according to the number of the interrupt request being acknowledged by the strobe of sequence decoder 550. In other words, if interrupt position No. 15 is acknowledged, a logic 1 appears in all lines 552-558.

Sequence decoder 550 is controlled by a SYNC pulse in line 560 which is connected by inverter 562 to the $\overline{\text{SYNC}}$ line 113. At the SYNC pulse, the interrupt requesting being processed is decoded and strobed into the output terminals A, B, C and D of decoder 550. To actuate the decoder of the particular module 32 shown in FIG. 6, the basic enabling line, $\overline{\text{INTE}}$ line 214 must have a logic 0 condition. The logic on line 564, which is the output of inverter 566, is controlled by the INTE logic. When microprocessor MP will accept an interrupt request, line 214 shifts to a logic 0. This applies logic 1 in line 564 to enable sequence decoder 550. Another enable terminal E of decoder 550 is controlled by the logic on line 570, which is a logic 1 if all higher priority expansion modules are not in use. When a logic 1 appears in line 560 and line 570, decoder 550 can operate. When there is an interrupt enable signal a logic 1 appears on line 564. This logic is also required for operating decoder 550. When one of the switches 30a-30x records an interrupt request, an output logic 1 is received on the interrupt signal line 572. When this happens, NAND gate 580 is actuated to produce a logic 0 pulse in line 580a. This is the $\overline{\text{INT 6}}$ pulse. This pulse can be created only when the microprocessor chip is in the interrupt enable condition and the module 32 is enabled by a logic 1 in line 570. When there is a signal in line 572, or when the module 32 is not enabled by a logic 1 in line 570, the output 582a of AND gate 582 is a logic 0. This disables all subsequent interrupt expansion modules. Thus,, if there is an interrupt signal in any of the higher priority modules, those interrupts are processed and removed before subsequent modules can be processed. After all interrupts have been processed from the uppermost module, the next module is processed and so forth in sequence. This produces module priority within the general INT 6 priority level. Since the speed of the microprocessor is so great with respect to any normal operation of controller system A, all of these interrupts can be processed and removed or turned off without seriously affecting the time necessary to process a continuous program cycle. If additional time is needed, the real time clock can be shifted into the 10.0 ms mode to provide more time for the program cycle and necessary interrupts.

After an interrupt has been requested by one of the switches or switch means attached to sequence decoder 550, a signal appears in lines 552-558. This produces a coded signal at the input of a PROM unit 590 which contains the call instruction and subroutine addresses for all of the interrupt sequences of switches 30a-30x. Of course, the interrupt requests need not be switches. They may take various forms to indicate that a special subroutine is needed for a special purpose which may be experienced at random times. Memory 590 could be a RAM and the call instructions and addresses could be stored therein at program initialization of system A and/or altered by system A during different program sequences.

When a SYNC pulse is received in line 560, the coding on lines 552-558, representing an interrupt request 30a-30x, produces one byte of eight bit information on lines $D_0$-$D_7$ indicating a call to a particular subroutine in memory of system A, whose address is to follow.

Thereafter, the next two SYNC pulses produces two more bytes of information or data on $D_0$-$D_7$ data lines. These two bytes of information indicates the address of a memory location in system A in which the requested subroutine is stored. The request is made by the coding on lines 552-558. Memory 590 is a PROM which includes fixed memory call addresses correlating to the specific inputs for the decoder 550 of module 32 or a RAM. The other modules would have different subroutine call addresses, even though the lines 552-558 of each of the modules could carry similar codes for the input and/or interrupt requests. Before the PROM 590 can send out a call, a $\overline{\text{IIV6}}$ pulse must be received from line 290. This signal is created by network 524, shown in FIG. 4C, and is obtained after the microprocessor has acknowledged an interrupt request by line 522 and the level on lines 502, 504, 506 is INT 6. The $\overline{\text{IIV6}}$ logic 0 signal latches sequence decoder 550 to a given code and activates the PROM 590 through OR gate 590a to transfer the logic from the PROM to lines $D_0$-$D_7$. Gate 590a is held at a non-operative logic 1 condition by inverter 590b when Enable (E) line 570 is at a logic 0. Consequently, only PROM 590 of the active module is operative to multiplex data to lines $D_0$-$D_7$. After the three bytes of output from PROM 590, sequence decoder 550 is unlatched by a shift of the $\overline{\text{IIV6}}$ line 290 to a logic 1 awaiting a new interrupt INT6 condition. A module receiving a logic 1 on E line 570 produces an interrupt signal on line 572 which disables all lower level modules. Consequently, the PROM 590 of each of the lower level modules will be inactive and will produce no bytes in the $D_0$-$D_7$ lines. If an interrupt request is made, but has not been processed, the request will be processed during subsequent scanning of terminals 30a-30x. If selected priority levels for each module 30-34 is desired, within the confines of the INT 6 overall level, an address decoder 592 can be provided on each interrupt expansion module and controlled by the logic on address lines $A_0$-$A_{15}$. The output of this decoder controls a priority memory unit 594 which produces the priority level signal on a line represented by a single line 596 in accordance with priority level select data inputted to memory unit 594 by data lines $D_0$-$D_7$. This input operation can be controlled by the R/$\overline{\text{W}}$ line 208. These lines control the priority of module 550 through line 596. In other words, by proper coding of line 596 as obtained from data stored in memory unit 594, the relative priority levels of interrupt inputs 0-15 on decoder 550 can be modified. Also, if desired, lines 596 can selectively activate or deactivate inputs 0-15 of decoder 550. Of course, other priority arrangements could be developed for the expansion modules. In addition, it is possible to process all of the expansion interrupt switches or stations randomly. These could all be processed and turned off in a short real time. The turn off of a request can be done by the subroutine or by any arrangement responsive to processing of a request or the disappearance of a request for any reason. The limitation of the interrupt expansion capability at the INT 6 level, or other selected level, is by basically the capacity of the memory locations in the PROM 590 on the individual modules. The memory unit 590 of the expansion modules actually stores the call instructions and subroutine addresses for each of the expansion interrupt conditions or terminals. The instruction could be fixed and hardwired.

As previously discussed, when there is an INTA on lines 362, gate 510 produces a logic 0 in line 512 to turn off data gate 270. This allows the data lines $D_0-D_7$ to float toward a logic 1 for insert of the restart address for an interrupt, except for INT 6. In the INT 6 mode, a logic 0 appears in line 290 at the time of the INTA logic 1. Consequently, gate 510 remains latched with a logic 1 in line 512. Thus, gate or data transfer device 270 is not disconnected and data is transmittable from line $D_0-D_7$ of modules 30-34 to the terminals $D_0-D_7$ of microprocessor MP. In addition, a logic 0 in lines 290 produces a logic 1 in lines 294 to disable gates or data transfer devices 280, 282. This releases control of these gates from the data lines $D_0-D_7$ for direct calling through the data lines to memory locations specified by the call address of PROM 590. Thus, it is apparent that a number of different interrupt requests can be provided in the window produced at INT 6 of the standard interrupt decoder 500, shown in FIG. 4. Various modifications in this concept of expanding the interrupt capability by utilizing a finite position on an interrupt priority decoder 500 could be developed without departing from the basic concept utilized in the circuit schematically illustrated in FIG. 6. By providing the expanding interrupt at the INT 6 window or level, the external expansion modules provide direct vectoring to specific memory locations by means of a CALL instruction and the subroutine call addresses in memories 590 on external modules 32-34.

Figure 6A:
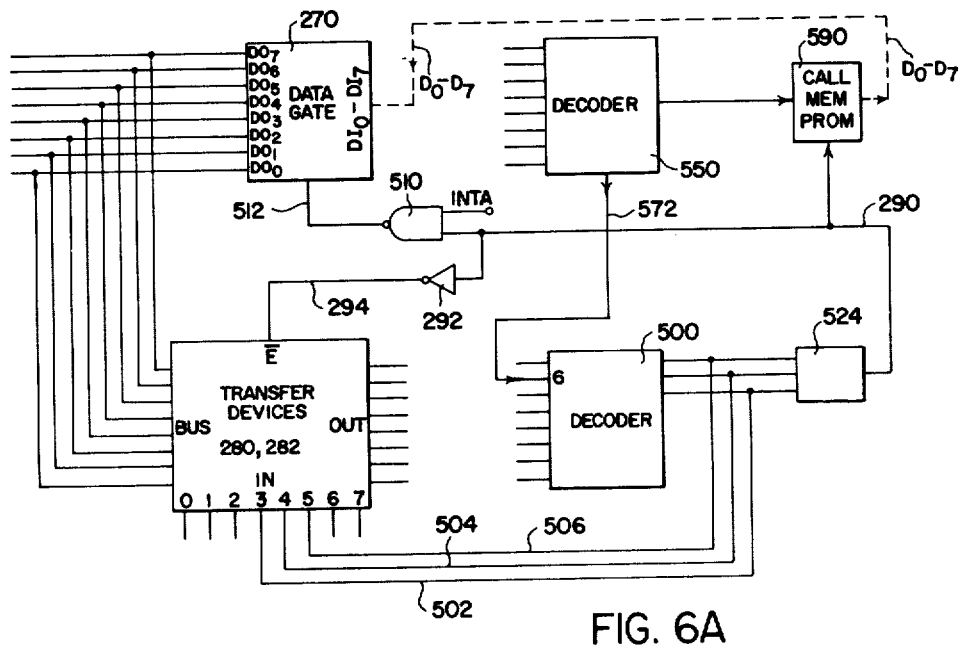
FIG. 6A is a schematic wiring diagram illustrating certain primary features of the diagram illustrated in FIG. 6 and combining certain related subject matter employed in the central processing module illustrated in FIG. 4.

FIG. 6A illustrates a somewhat simplified circuit for the interrupt expansion concept. During normal interrupt operation, line 290 is a logic 1 while the INTA line is a logic 1 during processing of the Interrupt Acknowledge machine cycle. Thus, the output 512 of gate 510 is a logic 0. This turns off data gate 270, disconnecting input lines $D_0-D_7$ and giving control of the data terminals of the microprocessor to the data transfer devices or gates 280, 282. The logic of line 294 is also a logic 0. Thus, transfer devices 280, 282 are active. At the DBIN signal, logic from the lower terminals of transfer devices 280, 282 is transferred to the output data lines $D_0-D_7$. Thus, the fixed logic 1 at input lines $D_0$, $D_1$, $D_2$, $D_6$ and $D_7$ addresses the restart subroutine for the particular interrupt level indicated by only the code on lines 502, 504 and 506.

When there is an external interrupt, an interrupt signal is created in line 572. By the circuitry illustrated in FIG. 6, this produces an input at INT 6 of interrupt decoder 500. This, in turn, produces a logic 0 in line 290 which is the output of logic network 524. The logic 0 inhibits gate 510 and places a logic 1 in line 512. Thus, data gate 270 is active during the INTERRUPT ACKNOWLEDGE machine cycle of microprocessor MP. At the same time, a logic 1 appears in line 294. This deactivates transfer devices 280, 282. Thus, during the INTERRUPT ACKNOWLEDGE machine cycle, data gate 270 is active when an external, or add-on interrupt signal has been received. Decoder 550 on each of the expansion modules then selects a proper subroutine memory address from call memory or PROM 590. This address is placed onto data lines $D_0-D_7$ and directed to CPU module 10 and data gate 270. In practice, three separate bytes of information can be transferred by memory device 590. This can be done by having decoder 550 select a certain position and then index that position by subsequent synchronizing pulses. These separate bytes of information are placed on the microprocessor for use in selecting the interrupt specific subroutine for the calling terminal. It is seen that the add-on interrupt feature which can produce an expanded interrupt capability is applied to a given, selected terminal of the standard interrupt decoder 500. This expands the capabilities of system A at a given level, without complex circuits and software.

EXTERNAL HARDWIRED INTERRUPT CALL SYSTEM

Figure 16:
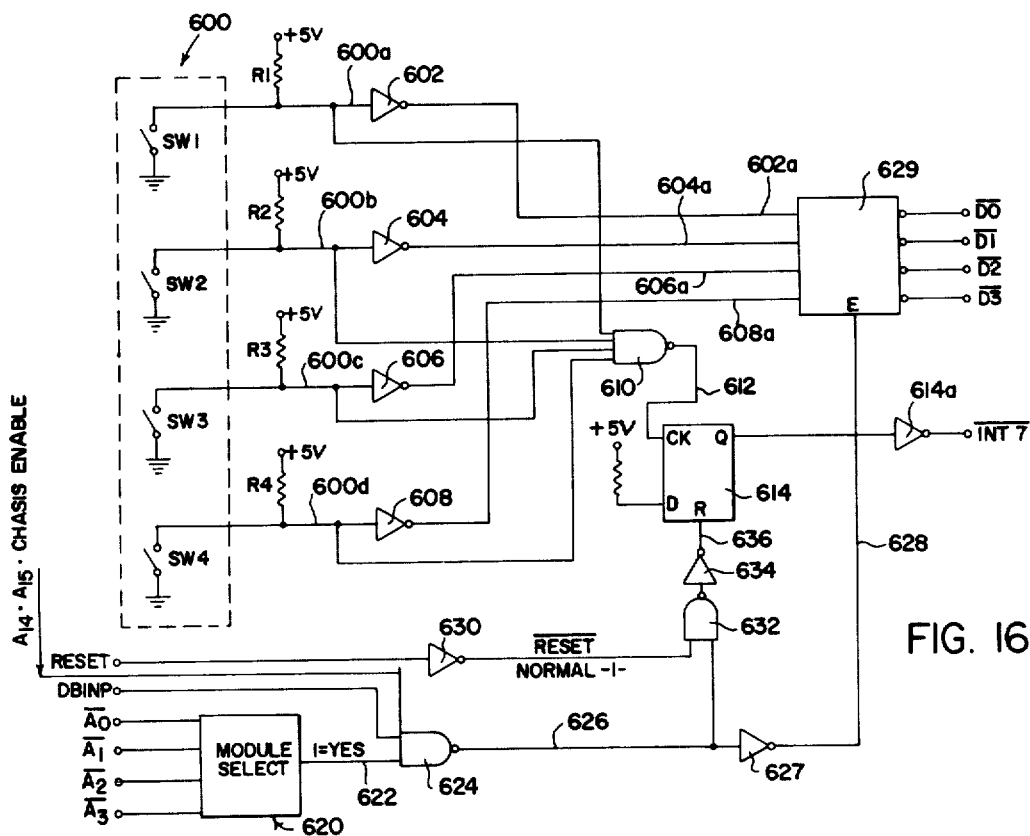
FIG. 16 illustrates a module for creating an interrupt condition to read external switch conditions to avoid continuous processing of these switches during the normal operation of programmable controllers.

Although not specifically shown in FIG. 1, the programmable controller system A can include an input/output module which uses interrupt request to process selected input or output information on the module, as opposed to interrupts from external locations which are processed in the expansion concept. In this regard, if a given module is to be processed by a special subroutine upon demand from the module, the demand could be at a terminal 30a-30x, etc. of the expansion module, or it could be assigned its own interrupt level. For instance, if a series of special switches on a module are included in the controlled or if an eight bit digit of word is available from an analog converter, it may not be advisable to read the condition of the module until there has been an actuation or a change in conditions or logic. At that time, as in other interrupt functions, a subroutine for reading from or writing to the module may be processed. This feature is accomplished in the preferred embodiment of the present invention by using the $\overline{INT}$ 7 input line to interrupt decoder 500. A schematic circuit for this purpose is illustrated in FIG. 16. In this illustrated embodiment, a switch network 600 includes a series of switches SW1-SW4, each of which controls the logic on lines 600a-600d, respectively. A series of inverters 602-608 control the logic on output lines 602a-608a. A NAND gate 610 reads the switch logic and produces an appropriate logic on line 612. When the logic on line 612 shifts from logic 0 to a logic 1, flip-flop 614 is clocked. The D terminal of this flip-flop is latched to a logic 1; therefore, upon clocking a logic 1 appears at the Q terminal of flip-flop 614. This logic is inverted by inverter 614a to produce an $\overline{INT}$ 7 signal. This signal is processed in accordance with the previously discussed interrupt processing by the circuit shown in FIG. 4. As so far described, when a switch is closed, a logic 0 appears in the $\overline{INT}$ 7 line to request an interrupt at this priority level. This places the microprocessor MP in the interrupt state, assuming that there is no higher priority interrupt being processed. When this happens, the octal 070 address is called by restart instruction code octal 377 and the subroutine at address 070 is processed. This subroutine reads the condition of the switches SW1-SW4 and can read other logic on the module shown in FIG. 16 or other designated logic. Of course, any one of a larger number of switches or terminals could be used to create an $\overline{INT}$ 7 signal. The subroutine can then address a calling module for reading and writing into the various terminals switches, etc. by the $D_0-D_7$ lines. When the switches shown in FIG. 16 are to be addressed during the subroutine processing, lines $A_0-A_3$ contain an address recognized by module select network 620. This network can take a variety of forms one of which is generally shown in FIG. 7, with inverter 643 omitted. Basically, when the module is addressed, an enabling signal is received. In the illustrated embodiment, a logic 0 in line 626 is an enabling signal. The signal is controlled by module select network 620 I/O select lines $A_{14}$, $A_{15}$ and a chassis enable signal controlled by the logic on line $A_4-A_7$, as shown in FIG. 2A.

When the subroutine or other program requests information or data from the module shown in FIG. 16, the logic 1 in line 622 combines with a DBINP pulse to actuate a NAND gate 624. Output 626 of this gate is directed to an inverter 627 having an output line 628. Thus, a logic 0 enabling signal at the DBINP strobe appears in line 626. This produces a logic 1 in line 628 to enable a logic transfer device or gate 629. Thus, the logic on lines 602a-608a appear in inverted form at the bi-directional data lines $D_0$-$D_3$. Consequently, after an INT 7 signal has placed the microprocessor in the INTERRUPT state, subsequent address from the selected subroutine directs the condition of the switches SW1-SW4 to four of the data lines. When a logic 0 appears in line 626, this actuates NAND gate 632 which is also controlled by a $\overline{RESET}$ line from an inverter 630. The $\overline{RESET}$ line is normally a logic 1; therefore, a logic 0 in line 626 at the DBINP strobe actuates NAND gate 632 to place a logic 0 at the output 636 of inverter 634. This resets flip-flop 614 to a logic 1 in the $\overline{INT\ 7}$ line. Thus, when the logic has been read by transfer device 629 to data line $D_0$-$D_3$, flip-flop 614 is reset to a logic 0 at the Q terminal. This concludes the operation of the circuit schematically illustrated in FIG. 16 which is representative of arrangements for utilizing the interrupt concept to selectively process information upon a change in input conditions of a module. Modifications could be made in this particular structure without departing from the intended illustrative nature of FIG. 16. For instance, all data lines $D_0$-$D_7$ would generally be used to read from or write to a module giving a request call on the INT 7 line.

PROGRAMMABLE READ ONLY MEMORY MODULE

As illustrated in FIG. 1, the programmable controller system A includes a variety of memory units, one of which is designated generally as a programmable read only memory or PROM module 40. FIG. 7 provides a schematic representation of an appropriate PROM module. In accordance with this illustration, a module selector network 620 of the type previously described includes switches 640a-640d located within the motherboard MB of system A into which module 40 is plugged. As in most control systems, the chassis of system A includes the motherboard MB which includes hardwired interconnections between separate modules in the chassis and interconnection between other interrelated, but separate units. The motherboard may be several units or components used as a network to interconnect the elements of system A. The permanent setting of switches 640a-640d in the motherboard determines the specific address of the PROM mdoule 40, which is in a particular location on the motherboard of the chassis used by system A. Module selecting network 620 decodes the logic on lines $A_{12}$-$A_{15}$. Since module 40 is a memory, a memory address as illustrated in FIG. 2C would be used to select the module and a specific memory address on the module. Since an I/O address, shown in FIGS. 2A and 2B, always includes a logic 1 at both the $A_{14}$ line and the $A_{15}$ line in system A, one of these bits or address lines must be a logic 0 to designate a memory address. EXCLUSIVE OR gates 642a-642d compare the logic on address lines $A_{15}$-$A_{12}$ to the position of switches 640a-640d, respectively. Inverter 643 is used at gate 642a because the logic on line $A_{15}$ is not inverted on the motherboard MB of system A. This has been discussed previously. If there is a comparison between the address on lines $A_{15}$-$A_{12}$ and switches 640a-640d, a logic 1 appears at all four inputs of control NAND gate 644. This produces a logic 0 in the $\overline{622}$ line. This is an indication that the address being processed by system A is a memory address and has selected module 40. The output of gate 644 is inverted by an inverter 645 to produce a logic 1 in line 622 when module 40 has been enabled. The logic 0 in line $\overline{622}$ enables an eight bit decoder 650 which produces a logic 0 in one of the output lines 650a-650h upon decoding of address lines $A_9$-$A_{11}$. The inverted outputs of decoder 650, as is normal in system A, are biased to a logic 1 which is false. Thus a logic 0 will appear in only one of the output lines 650a-650h. The line will be determined by the coding of address lines $A_9$-$A_{11}$.

As indicated in FIG. 2C, memory units may be addressed in groups of either 512 eight bit words or 1024 eight bit words. When the former memory arrangement is used, the address shown in FIG. 2C can be directed to eight separate chips or memory units. This is shown in FIG. 7 wherein eight PROM chips 652-1 to 652-8 are provided. In the illustrated configuration, the interconnecting wires 654 are not used. This separates each of the PROM chips 652-1 to 652-8 for independent operation and addressing. Also, the interconnecting wire 656 is shown in the grounded position. This releases address line $A_9$ for control of the eight bit decoder 650. Thus, the address on the address lines $A_9$-$A_{11}$ selects a particular one of eight outputs 650a-650h. This energizes a selected one of PROM chips or units 652-1 to 652-8. The particular word is then selected by the multiplexed logic on lines $A_0$-$A_8$. A strobe gate 660 produces a logic 0 in strobe line 662 when network 620 has been enabled and there is a DBINP pulse. With this strobe pulse, the $\overline{ST}$ terminals are energized to strobe the requested information from the energized one of the PROM chips 652-1 to 652-8 to the output data lines $D_0$-$D_7$.

To provide memory in units of 1,024 eight bit words, connectors 654 are used and wire 656 is shifted to the ungrounded position. This arrangement directs the logic of address line $A_9$ to the PROM chips. In this option, PROM chips 652-2, 652-4, 652-6 and 652-8 are not used. PROM chips 652-1, 652-3, 652-5 and 652-7 are replaced by PROM chips having the capacity of 1024 eight bit words, Wire or connectors 654 are used so that decoder 650 can become, in effect, a one-in-four decoder controlled by lines $A_{10}$, $A_{11}$. Although a certain memory arrangement is illustrated and is used in the preferred embodiment, it is not necessary for the operation of the preferred embodiment of the invention to provide for selection of different memory module connections.

As illustrated, the memory and I/O interlock lines extend from the motherboard MB through PROM module 40. If the module is connected properly, these interlock terminals provide electrical continuity. Input circuits $A_1$, $A_2$ and $A_3$ are data transfer blocks which shift data from input terminals to the internal circuitry of the module 40 to match or interface the parameters of module 40 with system A. The address on address lines $A_0$-$A_{15}$ enables module 40 and selects the data to be placed upon output lines $D_0$-$D_7$. In this manner, the eight-bit words addressed by system A can be applied to the data bus for use in processing of information in accordance with normal programmable controller technology. This module is generally used for program steps and other permanent information and data in accordance with standard control terminology.

RAM MODULE

Figure 8:
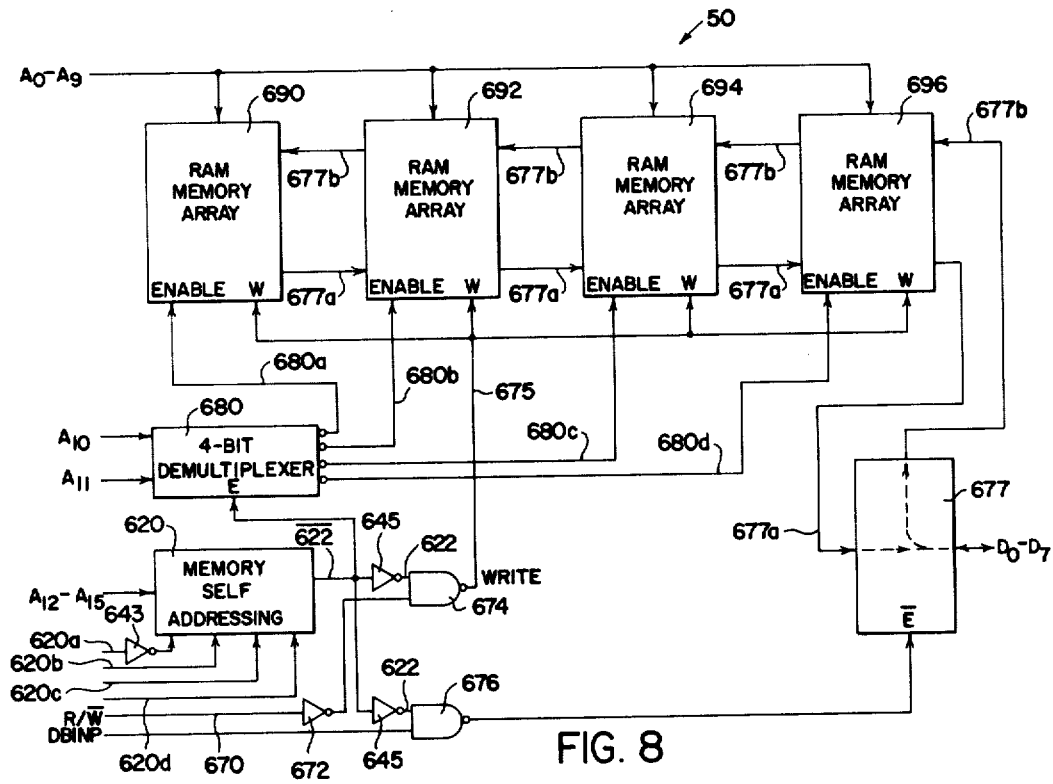
FIG. 8 is a schematic diagram illustrating a RAM module of the type contemplated for use in the preferred embodiment of the present invention.

Controller system A anticipates the use of both a read only memory (PROM) and a random access memory (RAM) which can be written into at selected addresses and read from at selected addresses. A variety of RAM memory units are available. In FIG. 8, there is a schematic representation of a RAM which can be used in system A. This RAM will be formed on module 50, as shown in FIG. 1, and includes the self-addressing network or circuit 620 previously described. This network includes switch controlled lines 620a, 620b, 620c and 620d, which are coded in the motherboard MB of system A to indicate the particular module 50. The coding on these lines is compared with the logic of address lines $A_{12}$–$A_{15}$ to produce a logic in output line $\overline{622}$. The logic of this line indicates whether the module 50 has been requested by the memory address, as shown in FIG. 2C. Other components associated with the self-addressing network 620 have functions similar to those used in module 40, as shown in FIG. 7. Since module 50 is a READ/WRITE type of memory, the R/$\overline{W}$ line is used to control the function of this module. A logic 1 on the R/$\overline{W}$ line indicates that the module is to be read. A logic 0 on this line indicates that data is to be written into an addressed location on RAM module 50. The R/$\overline{W}$ line is designated line 670 and includes an inverter 672 which is used to control the WRITE gate 674. The logic on the output 675 of this gate determines whether or not module 50 is in the WRITE or READ mode. A strobing gate 676, which is a NAND gate, is controlled by the logic on line 622, which is the selector logic, and the logic on the input DBINP strobe line. During a strobe by the DBINP line, the output of NAND gate 676 is a logic 0 to enable data transfer device or gate 677. According to the mode of operation, data is either transferred from an input line 677a to data lines $D_0$–$D_7$ or from data lines $D_0$–$D_7$ to the output logic lines 677b. These lines are multiplexed to various memory chips schematically represented as chips or units 690–696. Of course, these chips may include a plurality of separate and distinct memory units without departing from the intended spirit and scope of the illustrated disclosure. To select one of the memory circuits or chips 690–696, there is provided a four bit decoder 680 having outputs 680a–689d. This decoder is enabled when a logic 0 appears in the $\overline{622}$ line from the selector or self-addressing circuit 620. Thus, decoder 680 decodes the logic on lines $A_{10}$, $A_{11}$ to select one of the memory networks 690–696 when circuit 620 indicates that module 50 has been addressed. The logic on lines $A_0$–$A_9$ indicates the particular address or location into which data is written or from which data is read from memory units 690–696. The logic on lines 675 determines the direction of data flow to or from the random access memory module. This is obtained by decoding lines $A_{12}$–$A_{15}$ and R/$\overline{W}$ line 670. Modifications could be made in this type of RAM memory unit without departing from the illustrative nature of the disclosure shown in FIG. 8.

INPUT/OUTPUT MODULE FOR BYTE OPERATION

Module 60 shown in FIG. 1 is a device for creating eight bit binary words as input words or output words. These individual words or bytes can take a variety of forms. For instance, in the illustrated embodiment, module 60 is capable of creating two input bytes, or words, each having eight bits. The words are used to read the condition of a thumbwheel network 62, divided into two word units 62a, 62b. As shown in FIG. 9, network 62 can produce logic on lines $IA_0$–$IA_7$ as byte No. 0 from unit 62a. Byte No. 1 is the input logic on lines $IB_0$–$IB_7$ to read unit 62b of network 62. Consequently, two separate bytes, or words of data, can be read from network 62. In a similar manner, output information to a display device 64 is in the form of two bytes directed to separate units 64a, 64b. Byte No. 2 directs logic to display unit 64a by control lines $IC_0$–$IC_7$. Byte No. 3 of output information is directed to unit 64b by output lines $ID_0$–$ID_7$. Of course, other bytes or words of data can be inputted and outputted by a module of the type schematically illustrated in FIG. 9. Bytes Nos. 2 and 3 can be read also.

In module 60, a decoding network 700 is similar to the previously described network 620. This particular module selector network includes switches SW4–SW7 in motherboard MB of controller system A. Lines 700a–700d contain the logic which is coded into the motherboard position for module 60, as shown in FIG. 9. Address lines $A_0$–$A_3$ are directed through inverters 702a–702d to a network of comparing EXCLUSIVE OR gates 704a–704d. The output of these gates is lines 706a–706d which contain logic indicating the comparison between the address being processed by system A and module 60. These output lines control NAND gates 710, 712, the former of which is the reading gate and the latter of which is the writing gate. Gate 712 corresponds generally to gate 334 of the schematic illustration in FIG. 15. Inverters 710a, 710b and 333 control gates 710, 712 together with the logic from the selector or decoding network 700. The outputs 714a, 714b control inverters 716, 718 to produce selected logic in lines 720, 722. The logic in line 720 controls the logic or data transfer gate 724. A logic 1 in line 720 directs logic or data from gate 724 to display devices 64a, 64b through line 734a, 734b.

When the address on lines $A_0$–$A_3$ selects module 60, gates 710, 712 are activated. If a READ mode is being processed, a logic 0 appears in the output of gate 333. This disables gate 712. A logic 1 at the DBINP pulse produces a logic 1 at the output of inverter 710b. This pulses gate 710 to produce a logic 0 at output 714a. Thus, a logic 1 is directed through the READ line 722. Inverter 722a then activates decoder 740. Lines 720, 722 control input/output transfer device or gate 724. A logic 1 in line 722 transfers logic from the input of device 724 into the data line $D_0$–$D_7$. The data accumulators 730–736 have data which can be read by lines 730a, 732a or read and/or loaded by lines 734a, 736a. In the READ mode, data from line 730a, 732a, 734a and 736a is directed through data transfer device 724 for use on data lines $D_0$–$D_7$. The coding on lines $A_8$–$A_{10}$, as shown in FIG. 2A, controls the output of byte decoder 740. A negative logic on one of the output lines 740a–740d activates a selected one of the four bytes, so that the byte can be either read or written. In the READ mode, bytes No. 0 to No. 3 may be read. It is apparent that the system shown in FIG. 9 could be expanded to have eight input words to be read and eight output words to be written, or any combination thereof.

In the WRITE mode of operation, the output of inverter 333 is a logic 1. This activates gate 712. Gate 710 is not activated becuse there is no DBINP pulse during a write instruction. Line 720 steers transfer device 724 for writing information from the $D_0$–$D_7$ line into the data accumulators 734, 736 of bytes No. 2 and No. 3, respectively. Again the selected written byte is determined by the logic on lines 740a-740d from byte decoder 740, which is controlled by the logic of address lines $A_8$-$A_{10}$.

Data can be placed onto lines $D_0$-$D_7$ or outputted from these lines to units 64a, 64b, in accordance with the logic on lines $\overline{R/W}$ and DBINP.

Module 60 must be selected before the addressed byte is selected by decoder 740. The byte decoder may be energized by a logic 0 on address $A_{12}$, as shown in FIG. 2A, when there is a select logic 0 at the $\overline{E}$ terminal. These conditions indicate that the decoder 740 is operative, i.e. module 60 has been selected, and the byte mode of operation is being used. As discussed in connection with FIG. 17, some chassis output modules, such as the one shown in FIG. 9, can be provided with a BIT mode of operation, which is controlled by logic on address line $A_{12}$. In the BIT mode of operation, module 60 may include output terminals $\overline{B_0}$-$\overline{B_7}$. During the writing operation, i.e. output, a bit latch 742 writes selected information or data appearing on the $D_0$ line into a selected one of $B_0$-$B_7$ outputs. This can be accomplished by the circuitry shown schematically in FIG. 15 and superimposed in a somewhat abbreviated form on the structure of FIG. 9. The decoder 742 is enabled by line 720 when module 60 is enabled and in a write mode. Latch 742 corresponds basically to the addressable latch or decoder 332 of FIG. 15. According to the logic on lines $A_8$-$A_{10}$, latch 742 transfers the logic at the output of inverter 330 onto one of the output terminals 742a-742h. These correspond to the outputs $B_0$-$B_7$, as shown in FIG. 15. Thus, during a BIT mode of operation for a byte module, such as module 60, the data above the selected $D_0$ line is transmitted to a selected one of eight separate output terminals and latched therein by latch 742. These separate output terminals $\overline{B_0}$-$\overline{B_7}$ are a fifth byte of module 60, as shown in FIG. 9, and can be selected by logic on 740a-740b to read into line $D_0$-$D_7$. This byte logic is directed to the CPU module when selected and a bit selection is made at that module as previously discussed. If the byte from lines $B_0$-$B_7$ is to be operated in the normal byte type of operation, a standard data transfer device 746 is used. This device is activated by line 744a and READ line 722. This device may be activated or addressed by decoded information on lines 740a-740d from byte decoder 740. Thus, the fifth byte of information may be operated in the byte mode as well as being written into the bit latch 742. If a BIT mode of input is requested, the selection is made by the circuitry on module 10, as best shown in FIG. 4.

The circuitry of FIG. 9 illustrates the ability to provide a circuit on an output module 60, having an address such as shown in FIG. 2A, whereby a single bit of logic or data may be written into a given output location. Thus, even though a byte mode of operation is standard for a given output module, such as module 60 shown in FIG. 9, it can be addressed in certain instances for a bit output into a certain bit of an output byte. Various modifications could be incorporated using bit processing of output data in a byte input/output module, such as module 60.

INPUT/OUTPUT SYSTEM FOR BIT INFORMATION MODULE

Figure 10:
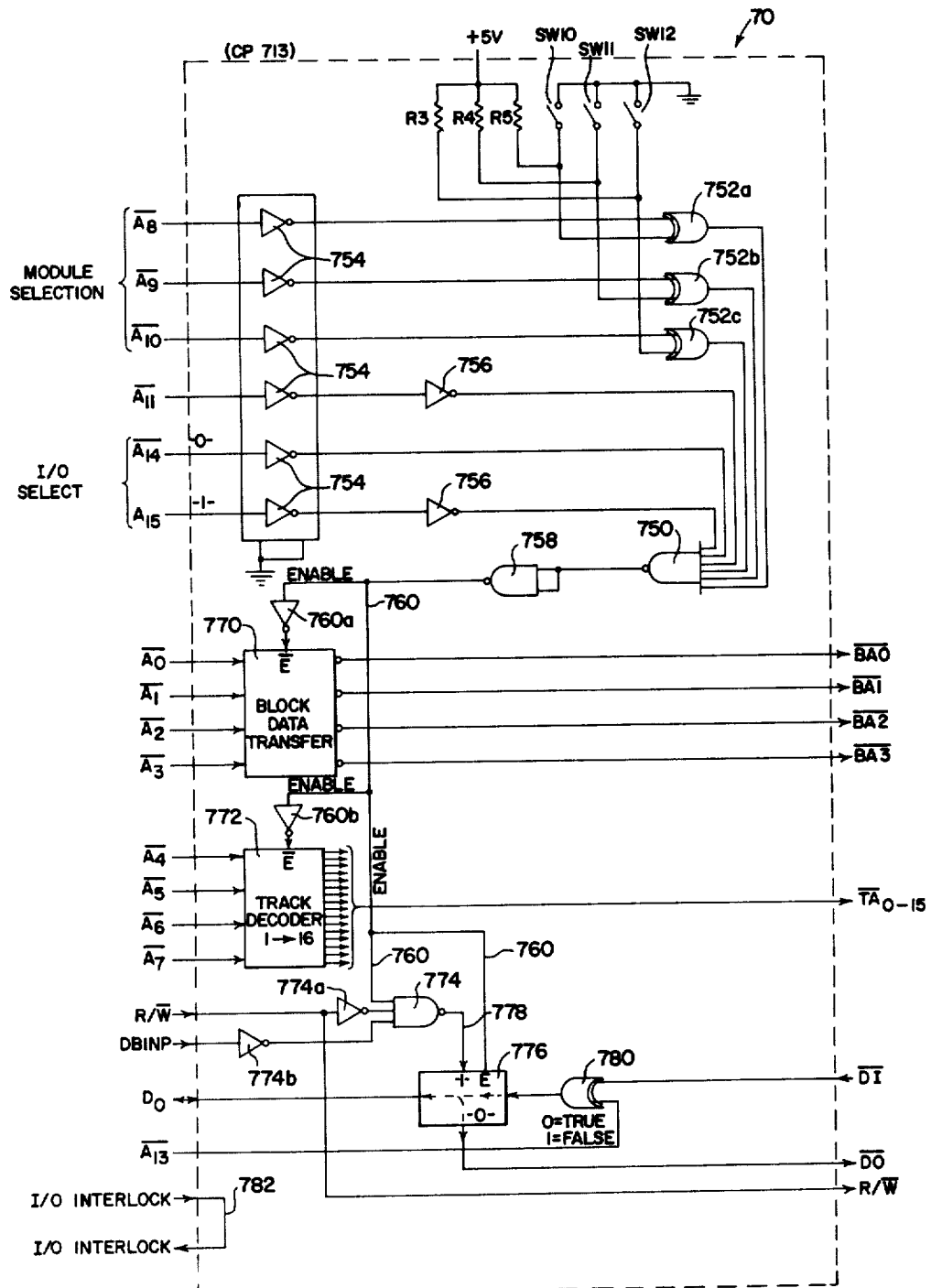
FIG. 10 is a schematic logic diagram showing a bit input/output module driver for addressing several external input and/or output terminals.

Referring now to FIG. 1, modules 80 each include a series of output or input terminals. These terminals are controlled by a single I/O driver module, shown as module 70, and illustrated in more detail in FIG. 10. In this illustrated embodiment of the input/output (I/O) bit driver type module, there is provided a selector NAND gate 750 which is controlled by comprising the logic of switches SW10, SW11 and SW12, on the module, with the logic on address lines $A_8$-$A_{10}$. EXCLUSIVE OR gates 752a-752c are used for performing the logic comparison and directing the results onto the input side of selector gate 750. Inverters 754 invert the logic on address lines $\overline{A_8}$ to $\overline{A_{14}}$ and line $A_{15}$. Since module 70 controls I/O tracks or modules 80, an address, such as that shown in FIG. 2B, is used when module 70 is addressed to drive a particular input or output terminal on a selected module 80. When module or driver 70 is addressed, this is a track I/O and a logic 0 appears in line $A_{11}$, as shown in FIG. 2B. This produces a logic 1 at the input of one inverter 754. A second inverter 756 on the line connected to the address line $A_{11}$ produces a logic 1 at the input of gate 750. As previously mentioned, when an I/O track is being addressed, a logic 1 appears at both $A_{14}$ and $A_{15}$. Thus, a logic 0 appears in $\overline{A_{14}}$. As shown in FIG. 10, these lines are decoded and the logic of line $A_{15}$ is reinverted by a second inverter 756 to produce a logic 1 at the input of gate 750. When the logic on lines $A_8$-$A_{15}$ corresponds to the module 70 all inputs to gate 750 are at a logic 1. When this happens during a machine cycle, a logic 0 appears at the input of inverter 758. This produces a logic 1 at the output 760. Inverters 760a, 760b control the block data transfer device 770 and the track decoder or selector 772. Thus, when all inputs to selector gate 750 are a logic, 1, transfer device 770 and track decoder 772 are enabled. In the illustrated embodiment, the logic at block selector lines BA0-BA3 is the inverted form of the logic on lines $\overline{A_0}$-$\overline{A_3}$ and can select one of sixteen different circuits. Thus, lines $A_0$-$A_3$ address a particular block or input/output circuit or terminal. The block, as used herein is an input or an output circuit or unit on one of the modules or tracks 80. Line BA0-BA3 can contain sixteen different binary codes. It is appreciated that this block decoder arrangement is used to select one out of sixteen different blocks on each module or track. Address lines $A_4$-$A_7$ are used to produce aa logic 0 in one of the sixteen track or module selector lines $\overline{TA_0}$-$\overline{TA_{15}}$. Thus, decoder 772 produces an enabling signal in one of the sixteen track lines $\overline{TA_0}$-$\overline{TA_{15}}$.

Figure 11:
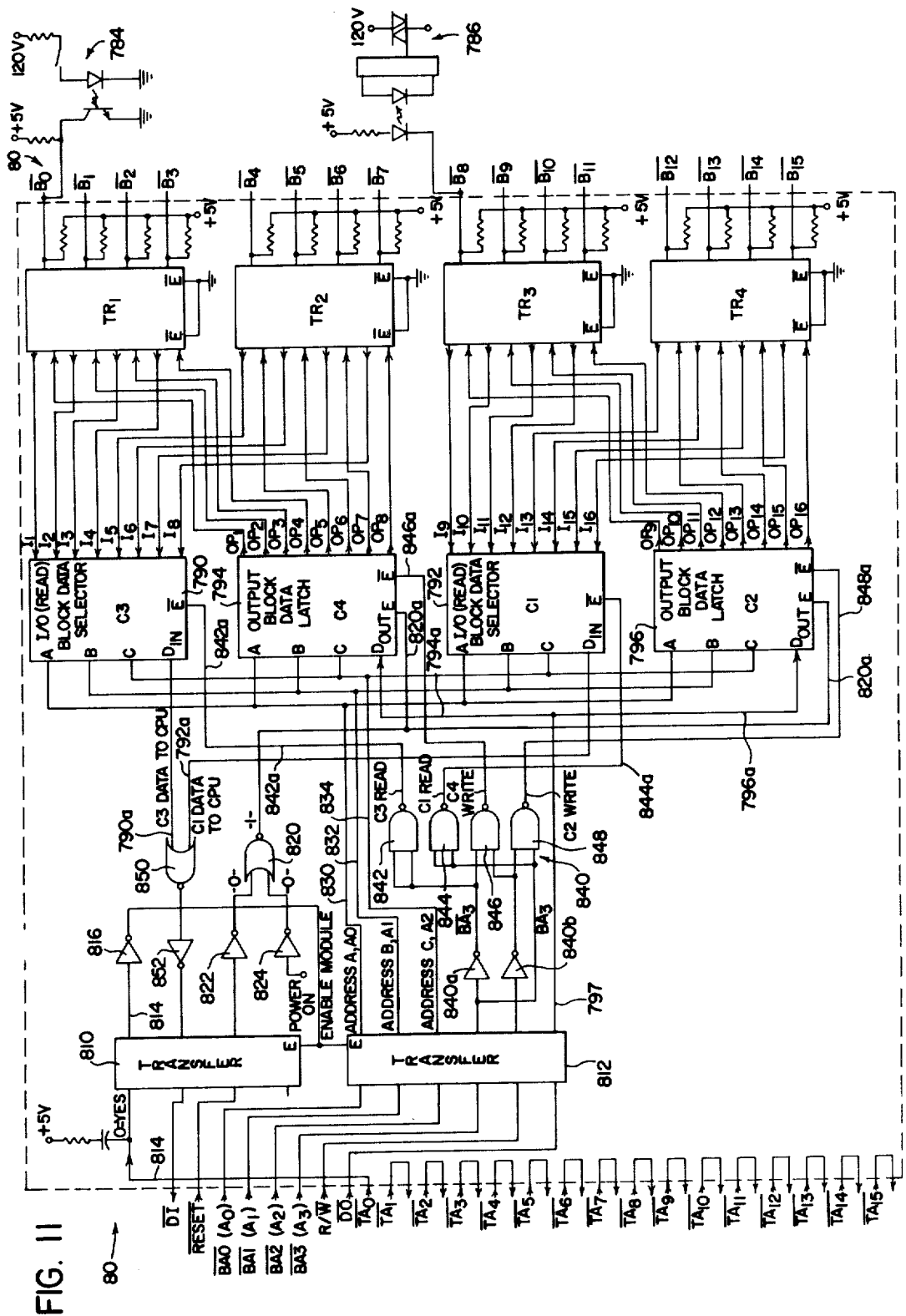
FIG. 11 is a single input/output module of the type addressed by the module shown in FIG. 10 and as contemplated in the preferred embodiment of the present invention.

As so far described, one of sixteen blocks addressed by lines BA0-BA3 is called by device 770 and one out of sixteen tracks or modules is called by the decoder 772. To direct information to and from the selected circuit or block on a selected track or module, there is provided a data gate 774 which is enabled by a logic 1 in module select line 760. Thus, gate 774 is enabled whenever module 70 has been selected. Gate 774 is also controlled by the logic on the $\overline{R/W}$ line and the DBINP line. This logic is inverted by inverter 774a, 774b, respectively. A data transfer device 776 is controlled by the logic on line 778, which is the output of gate 774. A logic 1 in line 778 directs a single bit of data from the right to the left of transfer device 776, as indicated by the arrows. A logic 0 in line 778 directs a single bit of logic from the left to the lower terminal of transfer device 776, as indicated by the arrows. Consequently, if the machine cycle being processed is a READ cycle, a logic 1 is applied to inverter 774a. This produces a logic 0 at one input of gate 774. Consequently, a logic 1 appears in line 778. This directs logic from line $\overline{DI}$ to the data line $D_0$. Thus, module 70 is in the reading mode and reads the logic on the $\overline{DI}$ terminal from a selected circuit of a module 80, shown in FIG. 1 and, in more detail, in FIG. 11. If the machine cycle is a WRITE or output cycle, a logic 0 appears at the input side of inverter 774a. Thus, a logic 1 is directed to gate 774. Since DBINP is a logic 0 when writing, a logic 1 appears at the output of inverter 774b. These logic conditions, with the logic 1 enabling pulse in line 760, produces a logic 0 in line 778. A logic 0 at the direction terminal of transfer device 776 directs data from the $D_0$ line to the $\overline{D0}$ line. In this manner, a single data bit is written into a given input/output location of a selected one of modules 80, as shown in FIG. 11. An EXCLUSIVE OR gate 780 transfers inverted or non-inverted data from the $\overline{DI}$ line to the data transfer device 776 in accordance with the logic on address line $A_{13}$. Thus, either a true or false data transfer can be inputted from a selected external location or terminal. This hardwire conversion concept is very helpful in logic processing when inverted logic is to be loaded into the microprocessor MP.

In summary, FIG. 10 shows a circuit for requesting information from a $\overline{DI}$ line or for applying data to a $\overline{DO}$ line. The $\overline{DI}$ and $\overline{DO}$ lines are connectable to a specifically addressed data external terminal or location. This information is multiplexed with respect to all modules 80. Only the addressed module 80, which may number as high as sixteen modules, can accept or provide data.

The interlock line 782 is used to assure that I/O driver or module 70 is in place. A variety of structures could be used for this purpose; however, a simple interconnecting line as shown in FIG. 10 is sufficient and preferred.

In practice the module shown in FIG. 10 is operated in byte mode and simulates bit mode of operation by reading and writing to single bit logic terminals with a single input and output data line $D_0$. This module simulates bit mode because of the conflict of definition in the effect of address lines $A_8$, $A_9$ and $A_{10}$. The CPU module assumes that address lines $A_8$, $A_9$ and $A_{10}$ are used for bit selection when in bit mode. Thus, a complete byte is used to input bit information and the CPU module makes the data selection.

INPUT/OUTPUT LOGIC TERMINALS

The I/O driver or module of FIG. 10 controls several separate modules 80 which are addressed by the track address lines $TA_0$-$TA_{15}$. In FIG. 11, one of these modules 80 is schematically illustrated. A logic 0 on one of sixteen output leads $\overline{B_0}$-$\overline{B_{15}}$ indicates that the terminal or location corresponding to the lead is at a "true" or "on" state. This situation exists whether or not the terminal is an output or an input terminal. In other words, a logic 0 on the output terminals, shown in FIG. 11, indicates that the terminal is active. The circuitry of FIG. 11 is used to set various output devices connected to the terminals $B_0$-$B_{15}$ and to read a condition of the terminals whether they are connected to an input device 784 or on output device 786. Both of these devices are "on" or true with a logic 0 at the connected line, shown as lines $\overline{B_0}$ and $\overline{B_8}$, respectively. These input and output devices are representative and show how a logic 0 can correspond to an "on" condition for both an input unit and an output unit, so that the lines $\overline{B_0}$-$\overline{B_{15}}$ are universal and can be used with either an input or an output. The block address is coded on lines $BA_0$-$BA_3$. These lines correspond essentially to address lines $A_0$-$A_3$. In accordance with the disclosure shown in FIG. 11, two logic devices 790, 792 are used for "reading" logic from selected output or input terminals $B_0$-$B_{15}$. These reading units include input lines $I_1$-$I_8$ connected to the input side of circuit or block selector 790 and input lines $I_9$-$I_{16}$ connected to the input terminals of circuit or block selector 792. According to the code received upon terminals A, B and C, these two selectors output binary logic on lines 790a, 792a. Thus, according to the logic received at the A, B and C terminals, the enabled one of the two selectors 790, 792 outputs logic information on either line 790a or line 792a, respectively. Thus, the logic at any line $\overline{B_0}$-$\overline{B_{15}}$ can be read by lines 790a, 792a.

The track or module 80 shown in FIG. 11 includes memory devices 794, 796 which create data or logic at output terminals $OP_1$-$OP_{16}$. This output data or logic is the current reading of sixteen separate memory addresses. The addresses are determined by the logic on input terminals A, B and C. Until a different logic is written in a selected memory address, the logic on lines $OP_1$-$OP_{16}$ remains constant. To write at the various memory addresses, an input binary logic condition is received at lines 794a, 796a from input line 797 connected to the $\overline{D_0}$ line from the driver circuit 70, shown in FIG. 10. The memory addresses are obtained from the code on lines $BA_0$-$BA_3$.

Figure 11A:
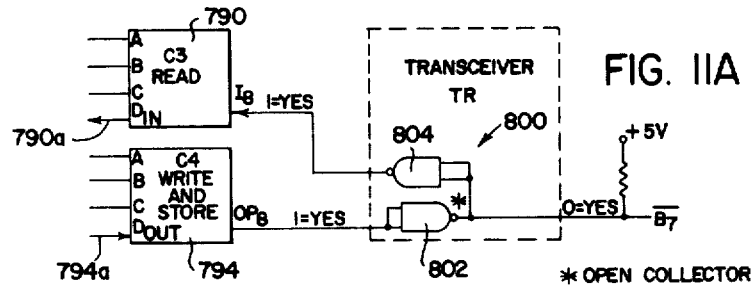
FIG. 11A is a schematic diagram showing the transceiver function employed in the preferred embodiment of the present invention and in the circuit shown in FIG. 11.

The input lines $I_1$-$I_{16}$ and the output line $OP_1$-$OP_{16}$ are connected to transceivers $TR_1$-$TR_4$. These transceivers, which control logic or data to and from the lines or terminals $\overline{B_0}$-$\overline{B_{15}}$, may be a variety of forms. However, in accordance with one aspect of the invention, the circuit schematically illustrated in FIG. 11A is used in the preferred embodiment. As previously mentioned, a logic 0 at lines or terminals $\overline{B_0}$-$\overline{B_{15}}$ indicates a "yes" or "on" condition, whether or not the terminal is an input or an output terminal. Thus, the terminals may be used for driving either an input circuit, illustrated as unit 784 attached to line $\overline{B_0}$, or an output device or circuit, illustrated as unit 786 attached to lines $\overline{B_{15}}$. These circuits can be either D.C. or A.C. and still operate on the basis of a logic 0 indicating a "yes" condition. Referring now to FIG. 11A, the transceiver circuit TR is illustrated for one controlled line or terminal, in this instance line or terminal $\overline{B_7}$. As can be seen, the single channel transceiver logic circuit 800 connects input line $I_8$ to output line $OP_8$. Power inverters 802, 804 are used in this circuit to provide sufficient driving power. Thus, the logic at output terminal $OP_8$ can be read by data selector 790 when a selected address is received on decoding terminals A, B and C. Selector 790 must be activated to apply this single bit of logic onto $D_{IN}$ terminal. A logic 1 on the $OP_8$ line indicates a "yes" condition. If the logic terminal $\overline{B_7}$ is an output, the terminal is made active by the logic 1 on the output line $OP_8$. If the logic on terminal $\overline{B_7}$ controls an input unit, when the unit is "on" a logic 0 from the unit takes precedence over the $OP_8$ logic. A logic 0 at the logic terminal $B_7$ when it is an input, holds the terminal at a logic 0. By this arrangement, system A can be debugged without actually connecting the various terminals $\overline{B_0}$-$\overline{B_{16}}$. By setting a given logic in the memory devices 794, 796, system A operates in accordance with preselected pattern terminal information. Thus, a simulated activated input can be accomplished by writing a logic 1 at the addressed position or location in one of the memory devices 794, 796. In this manner, there is no need to connect these controlled logic terminals $\overline{B_0}$-$\overline{B_{15}}$ to either an input or an output for debugging or other preliminary review of controller system A. A logic 0 at the output of a gate or inverter 802 for a given terminal indicates that that terminal is in the "yes" condition. If the terminal is to be used for an input, there is no need to connect an input unit to accomplish this internal setting. It can be seen that by using the circuit shown in FIG. 11A, together with the circuitry shown in FIG. 11, the system A can be operated without connecting the system to the various input and output devices.

Referring again to FIG. 11, logic transfer devices 810, 812 are activated by logic 1 at the respective E terminals. This is accomplished by a "yes", i.e. logic 0 signal, at the $\overline{TA_0}$ line. The $TA_0$-$TA_{15}$ lines are self-addressing lines which are interconnected with motherboard MB and arranged in stairstep fashion so that the particular signal energized by track decoder 772 of module 70 shown in FIG. 10 energizes a specific module 80. In the preferred embodiment, if the first output terminal of decoder 772 is activated, i.e. is at a logic 0, the first external track or module 80 is energized. This sequencing is continued through sixteen different tracks 80. Each module 80 is activated by an internal network such as line 814 through inverter 816. The module 80 shown in FIG. 11 is activated by $\overline{TA_0}$. The next module is activated by $\overline{TA_1}$. This could be done by wiring on the module or by advancing the lines $\overline{TA_1}$-$\overline{TA_{15}}$ at each separate location of a module 80 by a motherboard connection and keeping the addressing circuits of module 80 the same.

To assure that the system A is not in a reset condition and that there is operating power, a control gate 820 is used. This gate has input logic received from inverters 822, 824. As long as a logic 0 is introduced into gate 820 by both of these inverters, NOR gate 820 has a logic 1 output in line 820a, which enables memory devices or data latches 794, 796. Consequently, memory units 794, 796, which are RAM units, are activated when there is no reset or power failure.

Assuming that an address being processed by system A addresses the module 80 shown in FIG. 11, the addresses at lines $BA_0$-$BA_3$, which are address lines $A_0$-$A_3$, are directed by lines 830, 832 and 834 to the input terminals A, B and C of selectors 790, 792 and memory devices or data latches 794, 796. Thus, the addresses are multiplexed to all input and output devices shown in FIG. 11. During this processing, a control logic network 840 determines which of the units shown in FIG. 11 is active. This control network decodes the logic on line $BA_3(A_3)$ and the R/$\overline{W}$ line. The first line includes an inverter 840a, and the second line includes an inverter 840b. Reading NOR gates 842, 844 have output terminals 842a, 844a connected to the enabling lines $\overline{E}$ of block data selectors 790, 792, respectively. In a like manner, the WRITE gates 846, 848 have output lines 846a, 848a, which are directed to the enabling terminals $\overline{E}$ of data latches 794, 796, respectively. Thus, the logic on the R/$\overline{W}$ line and the $A_3(BO_3)$ line determines the active condition of the circuit shown in FIG. 11.

Assuming that data is to be read, i.e. inputted, a logic 1 appears in the R/$\overline{W}$ line. This produces a logic 0 at the output of an inverter 840b. This deactivates the WRITE gates 846, 848. Thus, no information can be written into the latches 794, 796. According to the address on line $A_3(BA_3)$, either READ gate 842 or READ gate 844 is active. Thus, the address on $A_3$ produces a selection between data selector 790 and data selector 792. The coding on terminals A, B and C of the selector activated determines the logic on lines $I_1$-$I_{16}$ which is directed from terminals $D_{OUT}$ by line 790a or line 792a to gate 850 and then to input line $\overline{DI}$. Of course, a single selector could be used with four separate decoding terminals to produce a selected output according to the sixteen different logic conditions possible on four binary coded lines. Whichever selector 790, 792 is active according to the address on line $A_3$, the selected logic decoded by lines 830, 832 and 834 appears in output 790a or 792a. The other inputs are at a logic 0. Thus, the inverted logic appears at the output of a reading gate 850. This logic is again inverted by inverter 852 and is applied to the $\overline{DI}$ terminal shown in FIG. 11. As indicated in FIG. 11A, the logic at the input of either selector 790 or selector 792 is in the inverted form. Thus, the logic at the output terminal $\overline{DI}$ is in the inverted form. In this manner, the logic from the various input terminals $I_1$-$I_{16}$ can be read and directed to module 70 on the $\overline{DI}$ line.

To write at a given terminal $\overline{B_0}$-$\overline{B_{15}}$ of module 80, the R/$\overline{W}$ line is shifted to a logic 0. This is inverted by inverter 840b to activate gates 846, 848. The address on line $A_3$ determines which of these WRITE gates is active. According to the active gate, the information from the $\overline{DO}$ line in line 797 is written at a selected address in either output data latch 794 or output data latch 796. Thus, the output lines $OP_1$-$OP_{16}$ include the desired logic pattern for the various logic terminals $B_0$-$B_{15}$. This pattern can be updated during a "write" command at an address in data latches 794, 796. This writing function does not affect the existing logic on non-addressed locations in latches 794, 796. The existing data at the sixteen addressable locations is latched into lines $OP_1$-$OP_{16}$. If the terminals are used to control outputs, this logic controls the state of the output. If these terminals are inputs, then the input data takes precedent over the logic on lines $OP_1$-$OP_{16}$, as previously described in connection with the circuitry shown in FIG. 11A.

SUMMARY

The programmable controller system A has been described in connection with the several components illustrated basically in FIG. 1. Each of these components perform the functions and operations discussed in connection with each of the separate modules. It is appreciated that various modules can be interchanged and additional modules can be used or modules can be removed according to the needs of a particular programmable controller system A which employs the microprocessor and CPU circuitry as best shown in FIG. 4.

As a microprocessor processes the program generally contained in the PROM module 40, various inputs and outputs are reviewed in accordance with a preselected software instruction. Outputs are set in accordance with desired preprogrammed logic in the programmable controller. In addition, interrupt conditions which may be switches or other terminals can interrupt the programmable controller by placing microprocessor MP in the interrupt condition and then jump to a subroutine which may be stored at a selected position in one of the various memory units or modules. System A, shown in FIG. 1, includes the basic modules making up the preferred embodiment of the present invention. Of course, additional interrupt modules could be used, additional input/output modules 80 could be provided to increase the logic terminals capabilities and a variety of bit or byte modules 70 could be employed. This system can be adapted for controlling several inputs and outputs and for processing a variety of information anticipated when using a programmable controller.

Having thus defined the invention, it is claimed:

1. In a programmable controller including a microprocessor having address terminals, address lines connectable to said address terminals, bi-directional data terminals, data lines connectable to said data terminals, and an actuatable means for shifting said microprocessor when actuated by an interrupt initiating signal from a program sequence being processed to a selected subroutine program at a selected memory location addressed by a selected coded memory address received on said data lines; a plurality of interrupt request devices for creating any one of several interrupt requesting signals and interrupt means responsive to each of said requesting signals for creating an interrupt initiating signal for said actuatable means, the improvement comprising: an interrupt expansion module including a memory means for storing a number of separate and distinct coded memory addresses each corresponding to a given one of several external interrupt request inputs connected to said module; external interrupt means responsive to actuation of any one of said several external interrupt request inputs for energizing a selected one of said interrupt request devices whereby said actuatable means is actuated; and, said external interrupt means also responsive to actuation of a selected one of said several external interrupt request inputs for directing the coded memory address corresponding to said selected one of said several external interrupt requests from said memory means on said module through connecting lines to said bi-directional data lines whereby the subroutine program at said directed coded memory address is used to control the operation of said controller.

2. The improved programmable controller as defined in claim 1 including means responsive to energization of a interrupt request device other than said selected one for applying a predetermined memory address having fixed logic bits corresponding to said energized interrupt request device onto said data lines.

3. The improved programmable controller as defined in claim 1 wherein there are less than nine of said interrupt request devices.

4. A programmable controller including a microprocessor having address terminals, address lines connectable to said address terminals, bi-directional data terminals, data lines connectable to said data terminals, and actuatable means for shifting said microprocessor when actuated by an interrupt initiating signal from a program being processed to a selected subroutine program at a selected memory location addressed by a selected coded memory address received by said microprocessor on said data lines; a decoding means for receiving a given number of interrupt request signals on a number of input terminals, said number of input terminals not less than said interrupt request signals; said decoding means driving an interrupt means having an output connected to said actuatable means for actuating said actuatable means upon receipt of any one of said interrupt request signals directed to said decoding means; an auxiliary interrupt network including several input means for creating additional interrupt signals, memory means for storing selected memory address codes and first output means for directing on a plurality of lines a different one of said address codes from within said memory means and onto said data lines in response to a selected actuation of one of said several input means; second output means in said auxiliary network responsive to actuation of one of said several input means for directing a selected one of said interrupt request signals to said decoding means irrespective of which of said several input means is actuated and logic transfer means responsive to said selected one of said interrupt request signals for transferring said address code from said data lines to said data terminals.

5. A programmable controller as defined in claim 4 including means for creating an interrupt acknowledge signal in response to a selected one of said interrupt request signals; and, means responsive to said interrupt acknowledge signal for enabling said logic transfer means.

6. A programmable controller as defined in claim 4 including a priority selector means for selectively disabling the decoding of certain of said interrupt requesting signals by said decoding means.

* * * * *

UNITED STATES PATENT AND TRADEMARK OFFICE
CERTIFICATE OF CORRECTION

PATENT NO. : 4,200,916
DATED : April 29, 1980
INVENTOR(S) : William H. Seipp

It is certified that error appears in the above-identified patent and that said Letters Patent are hereby corrected as shown below:

In the drawings, Sheet 2, FIG. 3, in Column $T_1$ under STATUS INFORMATION, the entry "$A_{16-0}$" should read -- $A_{15-0}$ --; Sheet 5, FIG. 4B, the reference numeral 374 should be applied to the triangular block-indicated inverter labeled "IN + OUT" and from which lines 259 and 372 extend, the reference numeral 380 should be applied to the block-indicated gate labeled "$\overline{R/W}$ OR DBIN", and located below gate 370; Sheet 7, FIG. 6, the reference numerals 30a and 30x should read 32a and 32x, respectively; Sheet 8, FIG. 6A, the legend "LOGIC NETWORK" should be applied to the box designated 524; Sheet 14, FIG. 14, the reference designation $\overline{D_7}$ below the NAND gate 320-7 should read -- $D_7$ --; Sheet 15, FIG. 20, the reference numeral 380 should be applied to the block-indicated gate to which the lines 196 and 204 are connected and which is connected to the $E_2$ terminal of decoder 150. Column 1, line 5, after "division" delete the comma (,) and in line 60, "step" should read -- stop --. Column 2, line 52, "microprossor" should read -- microprocessor --. Column 3, line 1, "bid-directional" should read -- bi-directional --; line 26, "micrprocessor" should read -- microprocessor --; line 48, "hinderance" should read -- hindrance --. Column 4, line 29, after "by" insert -- which --. Column 6, line 41, after "made" insert -- up --. Column 11, line 53, delete "a". Column 13, line 23, "$\overline{\phi 2}$" should read -- $\phi 2$ --. Column 14, lines 11 and 27, "HOLD REQUEST" should read -- $\overline{\text{HOLD REQUEST}}$ --; line 25, "and $\phi 1$ of" should read -- of $\phi 1$ and --; lines 48-49, "RESET REQUEST" should read -- $\overline{\text{RESET REQUEST}}$ --. Column 15, line 64, after "real" insert -- time --. Column 16, lines 26-27, "outputs" should read -- output --.

UNITED STATES PATENT AND TRADEMARK OFFICE
CERTIFICATE OF CORRECTION

PATENT NO. : 4,200,916
DATED : April 29, 1980
INVENTOR(S) : William H. Seipp

It is certified that error appears in the above-identified patent and that said Letters Patent are hereby corrected as shown below:

Column 18, lines 22-23, "$A_1$-2-$A_{15}$" should read -- $A_{12}$ - $A_{15}$ --. Column 19, line 2, "Sometime" should read -- Sometimes --; line 47, "in" should read -- In --. Column 20, line 32, "OUT1" should read -- $\overline{\text{OUT 1}}$ --. Column 21, line 57, "intergrated" should read -- integrated --. Column 22, line 61, "from" should read -- form --. Column 23, line 68, "electromagnet" should read -- electromagnetic --. Column 25, line 20, "130" should read -- 310 --; line 45, after "for" insert -- converting --. Column 26, line 33, "gates" should read -- gate --; and "regulate" should read -- regulates --; line 54 (actual), "gate data" should read -- data gate --. Column 27, line 17, "$\overline{\text{MEN INT}}$" should read -- $\overline{\text{MEM INT}}$ --; line 34, "but" should read -- bus --. Column 28, line 40, after "instance" insert a comma (,). Column 29, line 22, after "address" insert -- a --; line 60, "maping" should read -- mapping --. Column 33, line 49, "line" should read -- lines --. Column 34, line 12, "OUT2" should read -- $\overline{\text{OUT2}}$ --. Column 35, line 50, "line" should read -- lines --. Column 36, line 6, "OUT2" should read -- $\overline{\text{OUT2}}$ --; line 10, "flip-flip" should read -- flip-flop --. Column 37, line 22, "INTO" should read -- INT 0 --. Column 38, line 26, after "invention" delete the period (.); line 51, "30-30x" should read -- 32a-32x --. Column 39, lines 8-9, "requesting" should read -- request --; line 23, "on" should read -- in --; lines 25, 55 and 66, "30a-30x" should read -- 32a-32x --. Column 40, line 20, "$D_0$-$D_7$" should read -- $D_0$-$D_7$ --. Column 41, line 7, "line" should read -- lines --; line 27, "32-34" should read -- 30-34 --. Column 42, line 56, after "terminals" insert a comma (,); line 65, "The" should read -- This --; line 67, "line"

UNITED STATES PATENT AND TRADEMARK OFFICE
CERTIFICATE OF CORRECTION

PATENT NO. : 4,200,916
DATED : April 29, 1980
INVENTOR(S) : William H. Seipp

Page 3 of 3

It is certified that error appears in the above-identified patent and that said Letters Patent are hereby corrected as shown below:

should read -- lines --. Column 43, line 22, "line" should read -- lines --; line 53, "mdoule" should read -- module --. Column 46, lines 38, 49, 52 and 67, "line" should read -- lines --; line 38, "734b" should read -- 736a --; line 49, "into" should read -- onto --. Column 47, line 39, "line" should read -- lines --; line 42, "$B_0\text{-}B_7$" should read -- $\overline{B_0}\text{-}\overline{B_7}$ --. Column 48, line 4, "comprising" should read -- comparing --; line 39, "Line" should read -- Lines --; line 43, "aa" should read -- a --; line 56, "inverter" should read -- inverters --. Column 49, line 47, "$TA_0\text{-}TA_{15}$" should read -- $\overline{TA_0}\text{-}\overline{TA_{15}}$ --; line 58, "on" should read -- an --. Column 50, line 26, "line" should read -- lines --; line 38, "lines $\overline{B}_{15}$" should read -- line $\overline{B}_8$ --; line 56, "$B_7$" should read -- $\overline{B}_7$ --; line 59, "$\overline{B}_{16}$" should read -- $\overline{B}_{15}$ --. Column 51, line 12, "$TA_0\text{-}TA_{15}$" should read -- $\overline{TA_0}\text{-}\overline{TA_{15}}$ --. Column 52, line 1, "$D_{OUT}$" should read -- $D_{IN}$ --.

Signed and Sealed this

Seventh Day of June 1983

[SEAL]

Attest:

DONALD J. QUIGG

Attesting Officer

Acting Commissioner of Patents and Trademarks